US006809724B1

(12) United States Patent
Shiraishi et al.

(10) Patent No.: US 6,809,724 B1
(45) Date of Patent: Oct. 26, 2004

(54) DISPLAY APPARATUS AND PORTABLE INFORMATION PROCESSING APPARATUS

(75) Inventors: Atsushi Shiraishi, Suwa (JP); Roy Nakashima, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/484,714

(22) Filed: Jan. 18, 2000

(51) Int. Cl.[7] .......................... G09G 5/00; G09G 5/08; G09G 5/20

(52) U.S. Cl. .................. 345/169; 345/157; 345/788; 345/792; 345/798; 345/884

(58) Field of Search .................. 345/472, 963, 345/970, 184, 771, 724, 725, 726, 723, 864, 901, 934, 660, 611, 665, 788, 798, 800, 158, 440, 169, 671, 684, 739, 775, 784, 792, 801, 815, 866, 157, 161, 163, 164, 167, 824, 189, 789

(56) References Cited

U.S. PATENT DOCUMENTS

| | | | |
|---|---|---|---|
| 4,794,388 A | * 12/1988 | Matthews | 340/731 |
| 5,612,931 A | * 3/1997 | Sato et al. | 368/67 |
| 5,825,353 A | * 10/1998 | Will | 345/184 |
| 6,054,990 A | * 4/2000 | Tran | |
| 6,128,006 A | * 10/2000 | Rosenberg et al. | 345/163 |
| 6,271,488 B1 | * 8/2001 | Sasaki | 200/4 |
| 6,535,615 B1 | * 3/2003 | Zachmann et al. | 382/100 |

OTHER PUBLICATIONS

Microsoft Outlook with computer system, 1995–1999.*
WIndows for Dummies, 1992, IDG Books Worldwide, pp. 106–107.*
Plam HAndbook for the palm series, 1998–1999, pp. 6,72, 73,82, and front cover.*
Palm HAndbook, 1998–1999, Palm, pp. 74 and 82.*

* cited by examiner

Primary Examiner—Mark Zimmerman
Assistant Examiner—Scott Wallace

(57) ABSTRACT

A display apparatus has a display unit for displaying, on a display screen, a display image containing a time axis formed so as to extend at least in a first direction. The display apparatus also has an input operation device for physically moving at least the time axis in the first direction. The display apparatus further has a controlling device for controlling the display screen based on an operational input given by an operation of the input operation device. The input operation device includes a rotational operating unit having an axis of rotation extending in second directions which cross the first direction. The rotational operating unit is arranged such that a rotational operation of the rotational operation unit by a first physical amount causes a physical movement of at least the time axis by a second physical amount corresponding to the first physical amount.

20 Claims, 71 Drawing Sheets

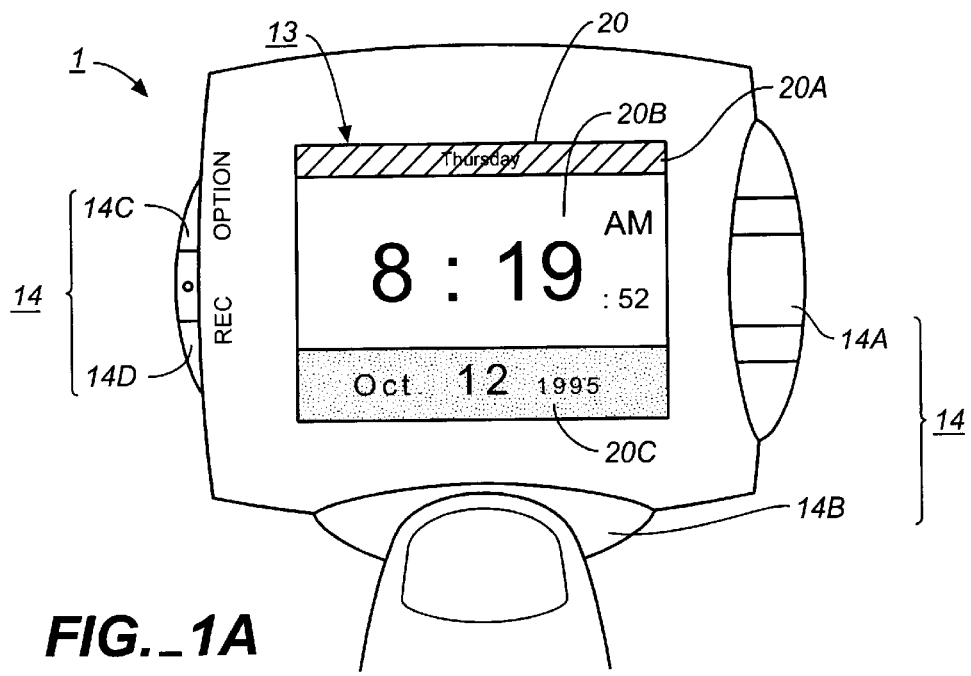
FIG._1A
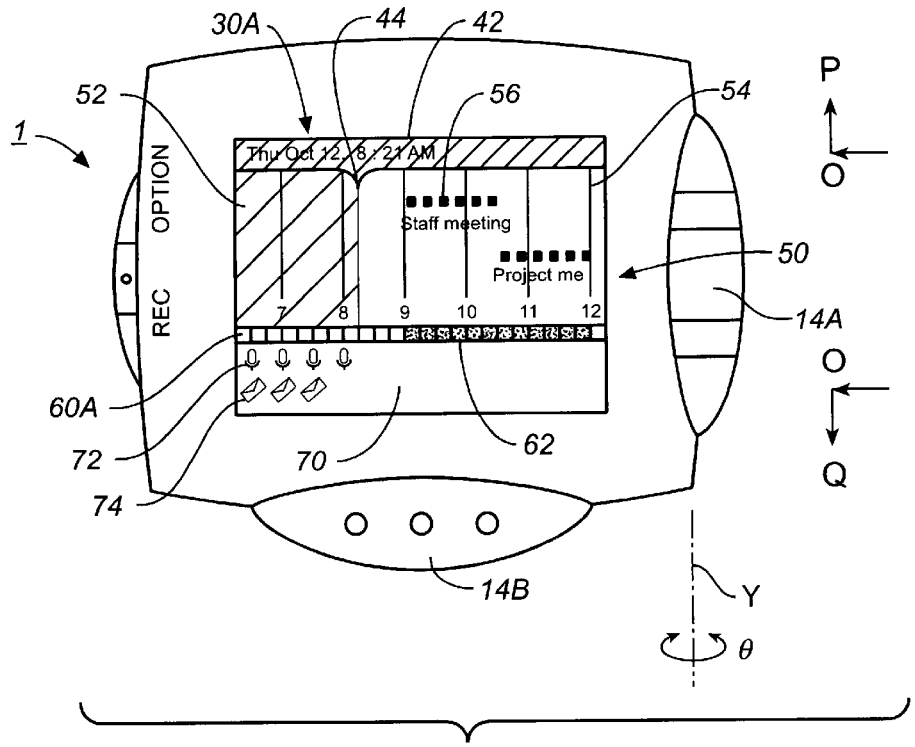
FIG._1B

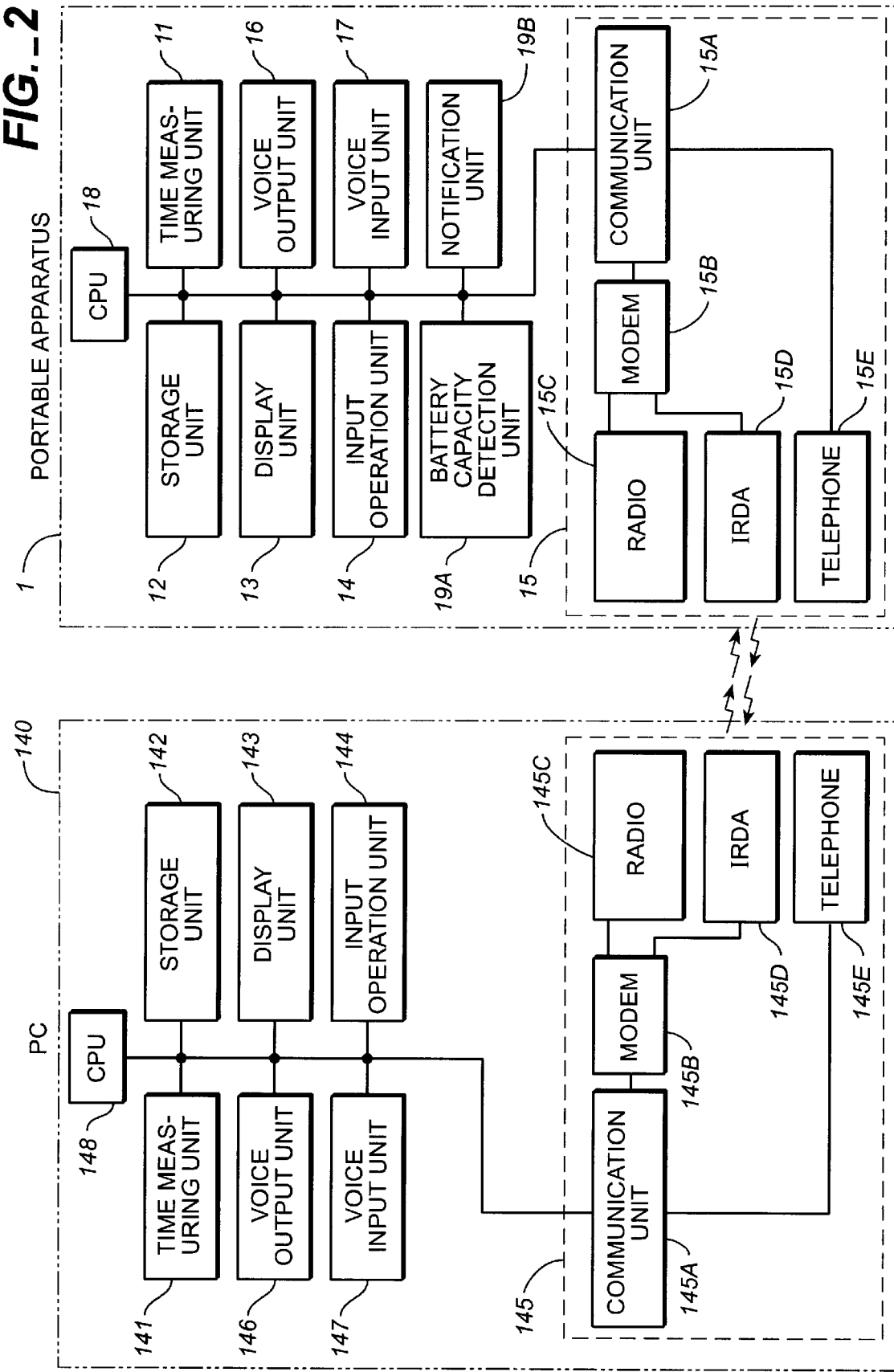

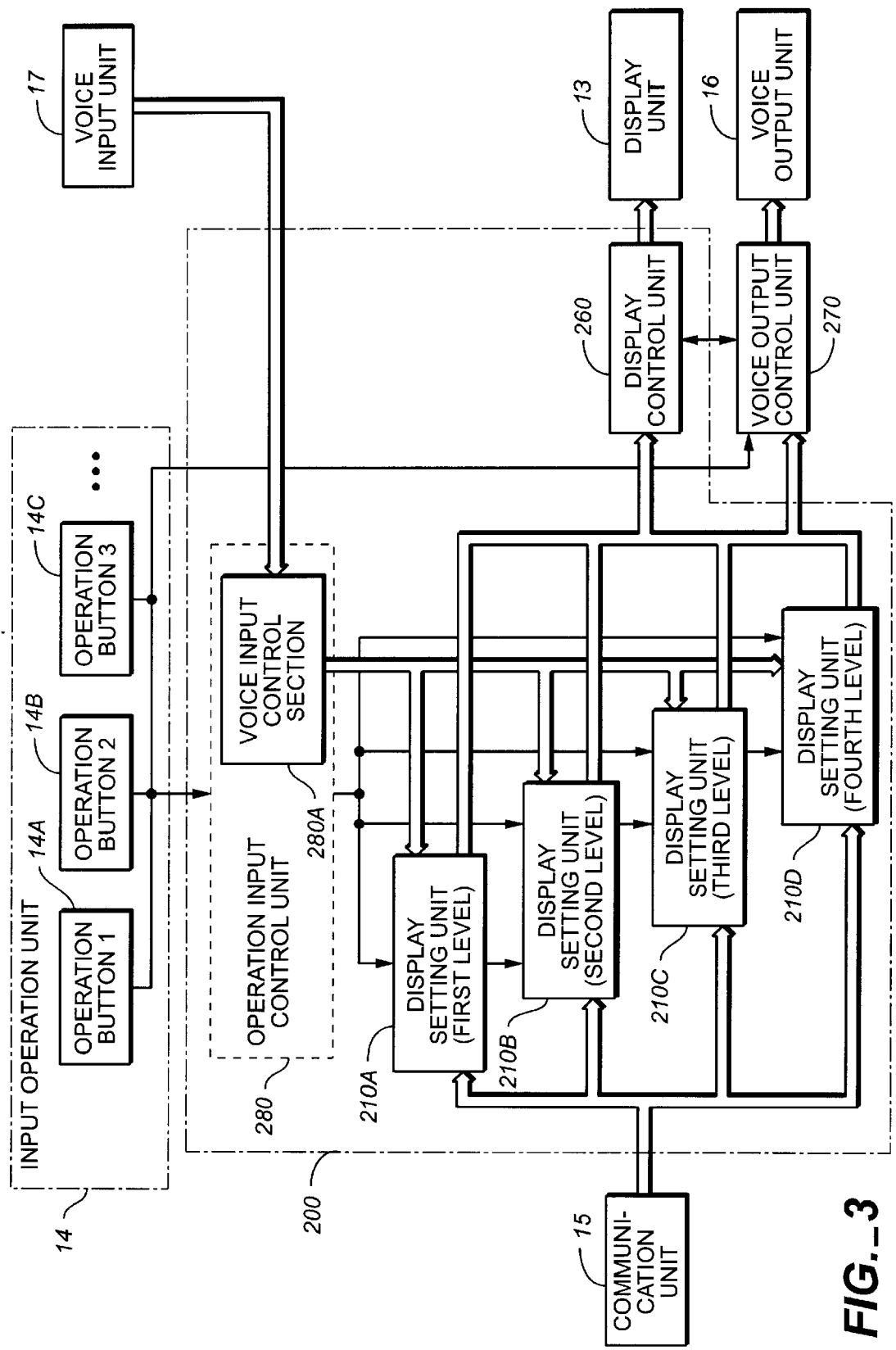
FIG._3

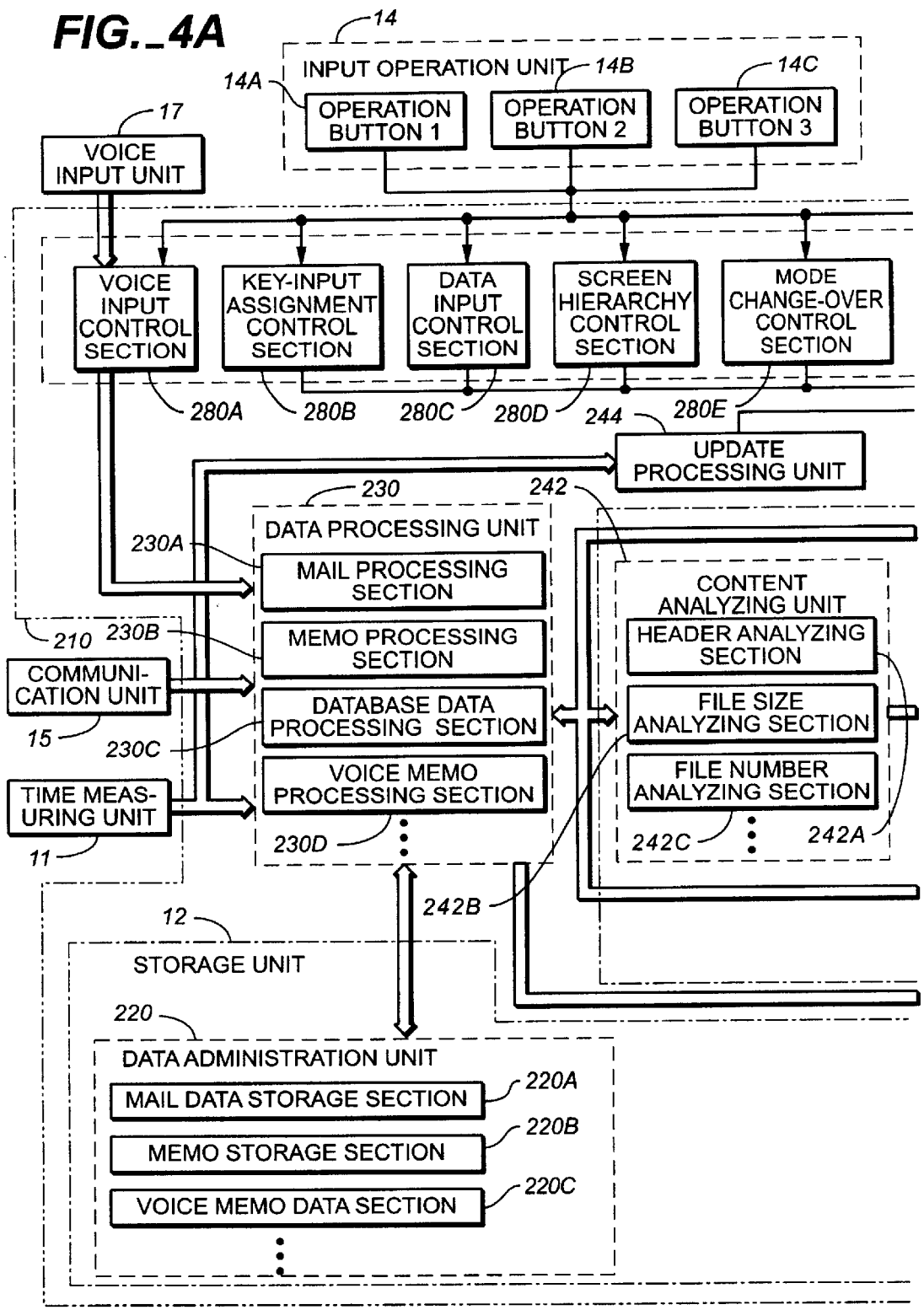
FIG._4A

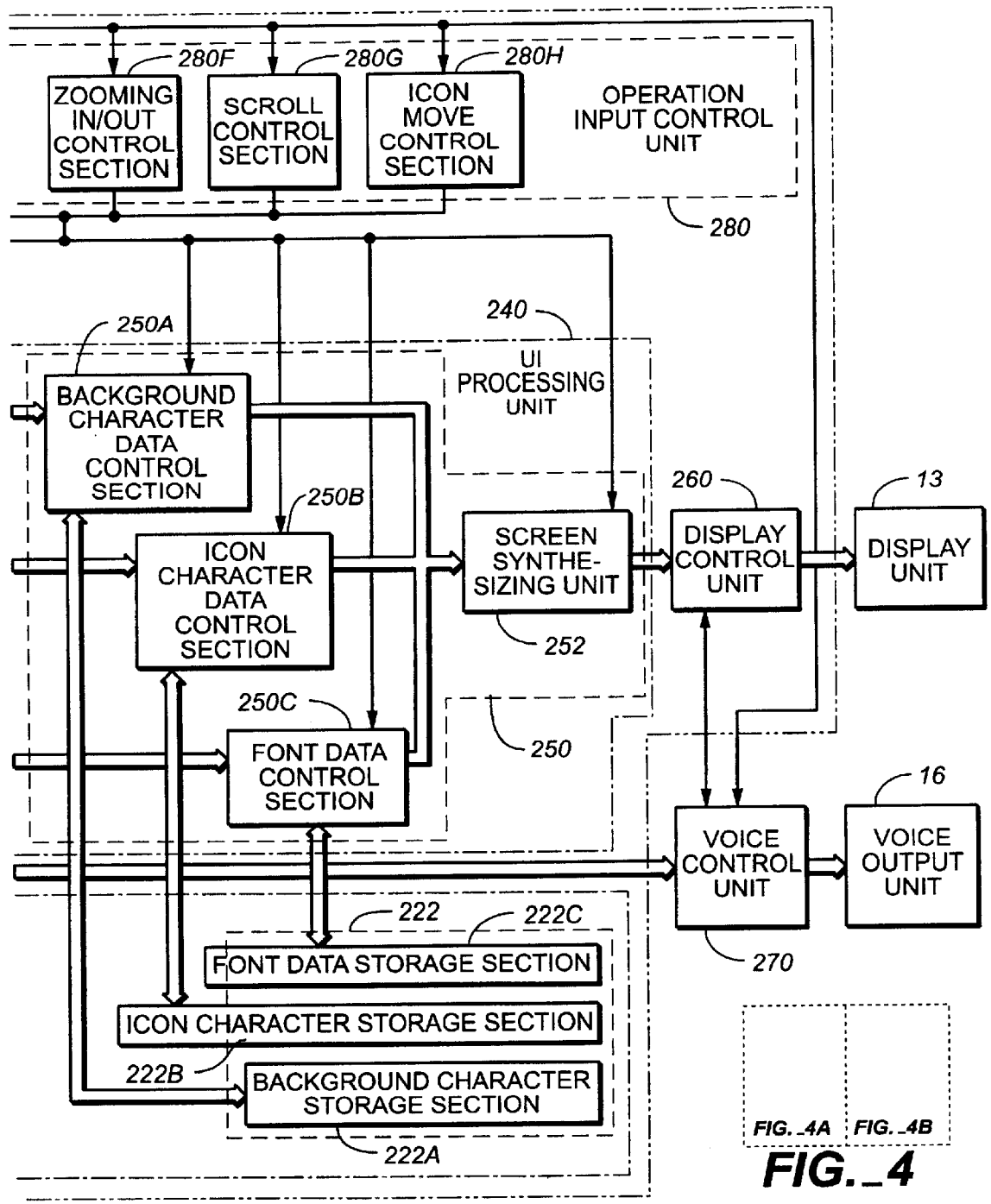

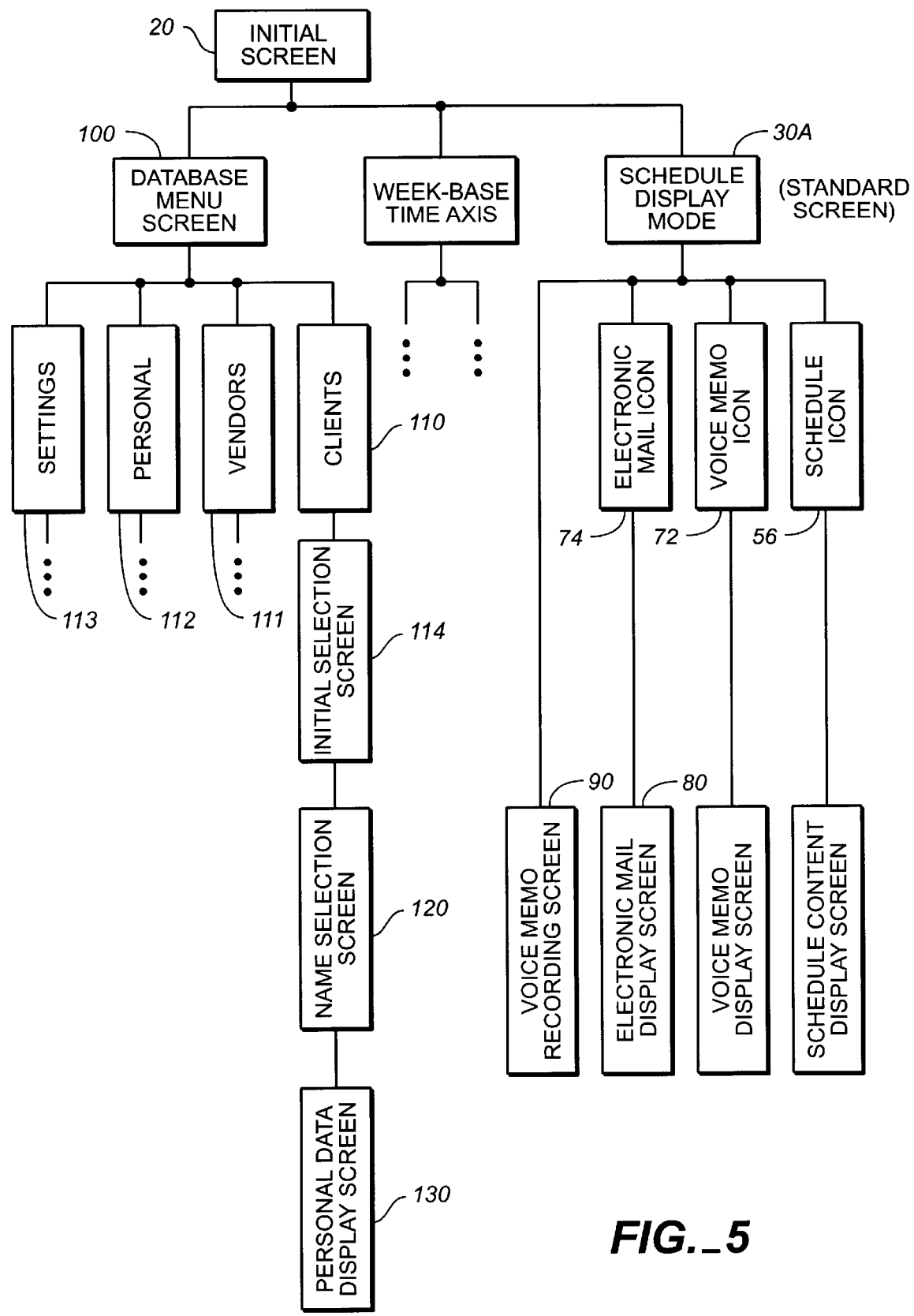
FIG._5

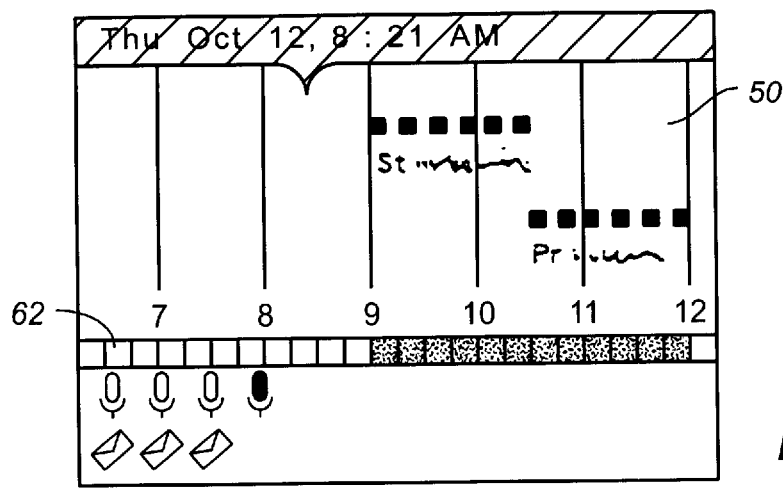
FIG._6A
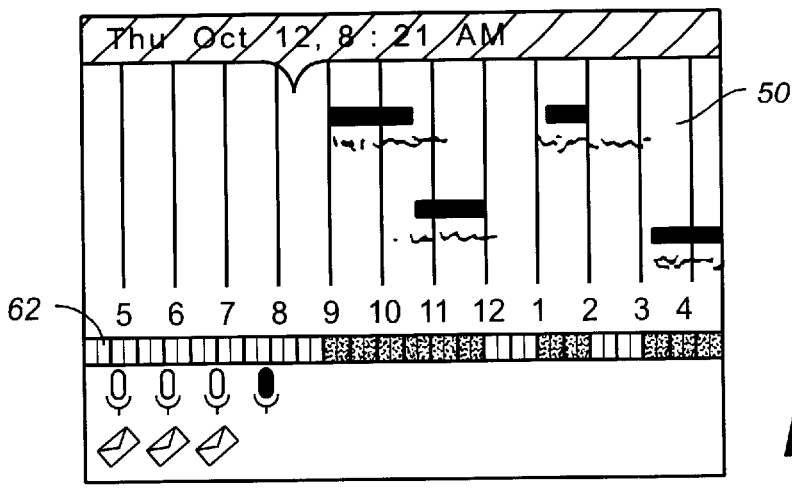
FIG._6B
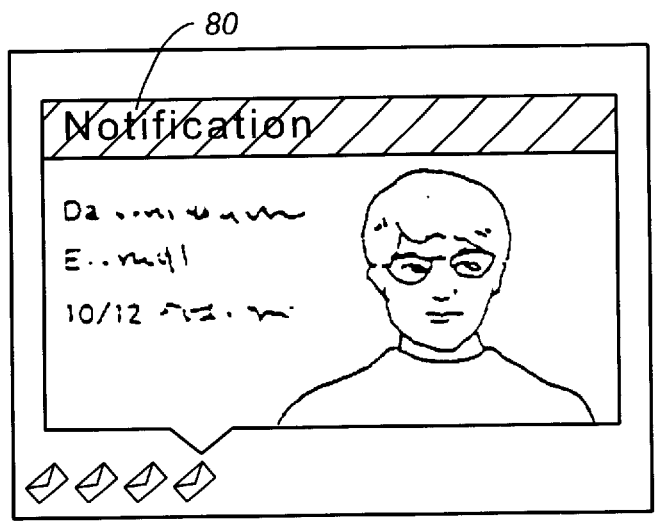
FIG._6C

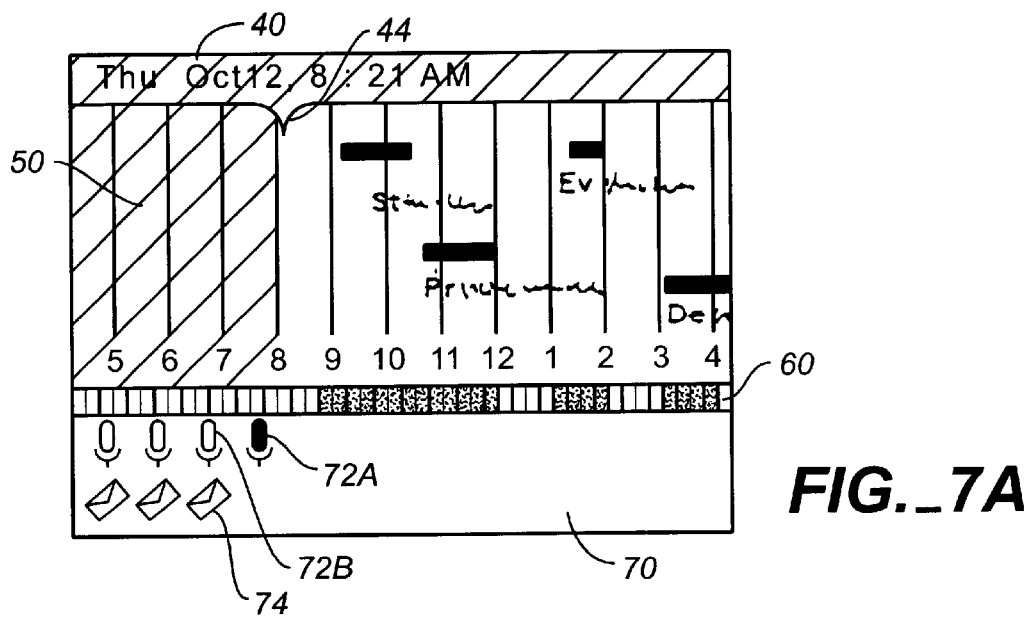
FIG._7A
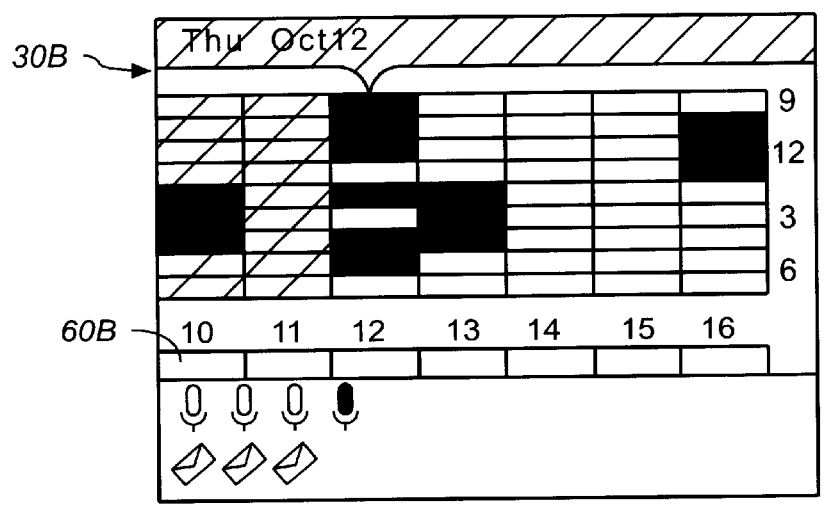
FIG._7B

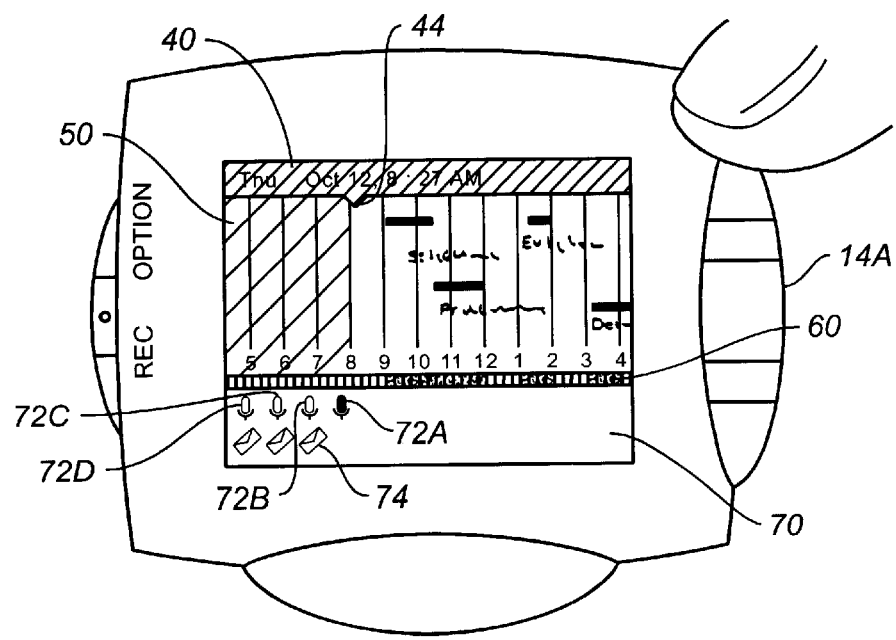
FIG._8A
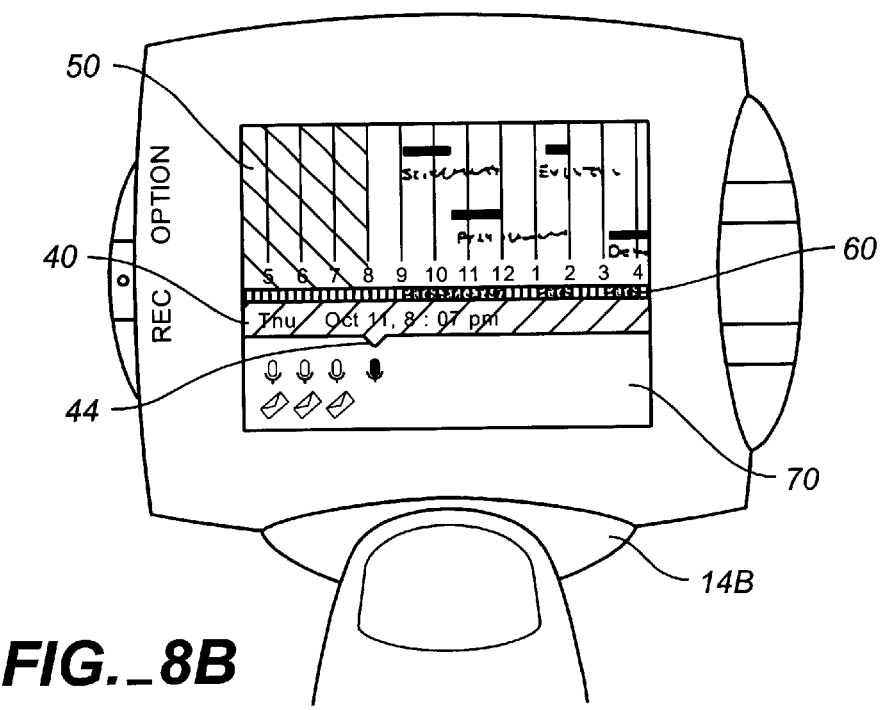
FIG._8B

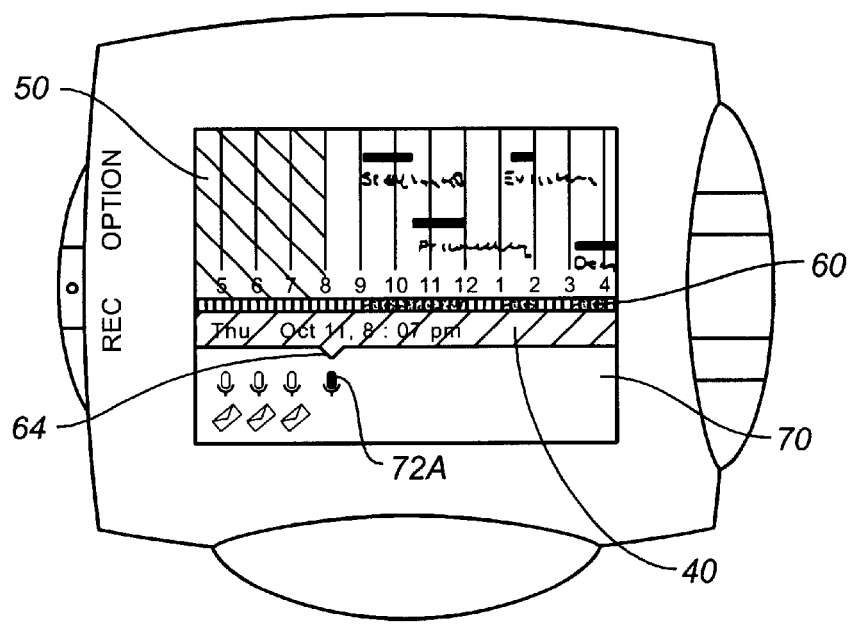
FIG._8C
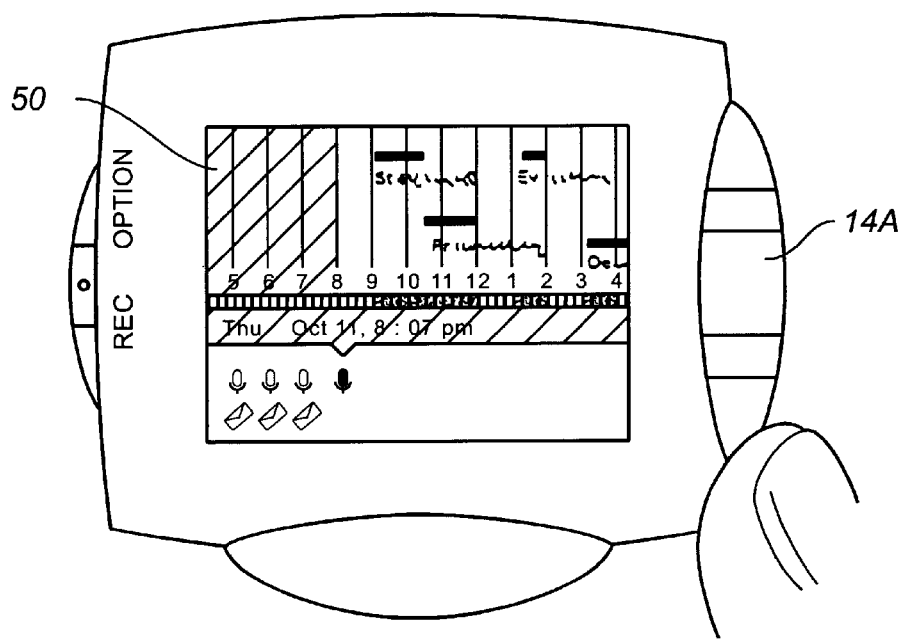
FIG._9A

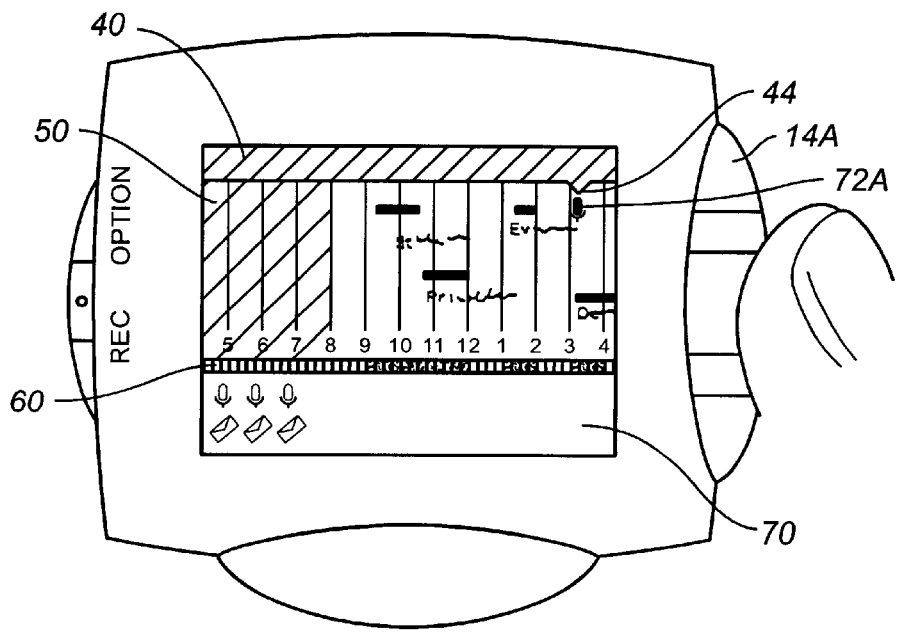
FIG._9B
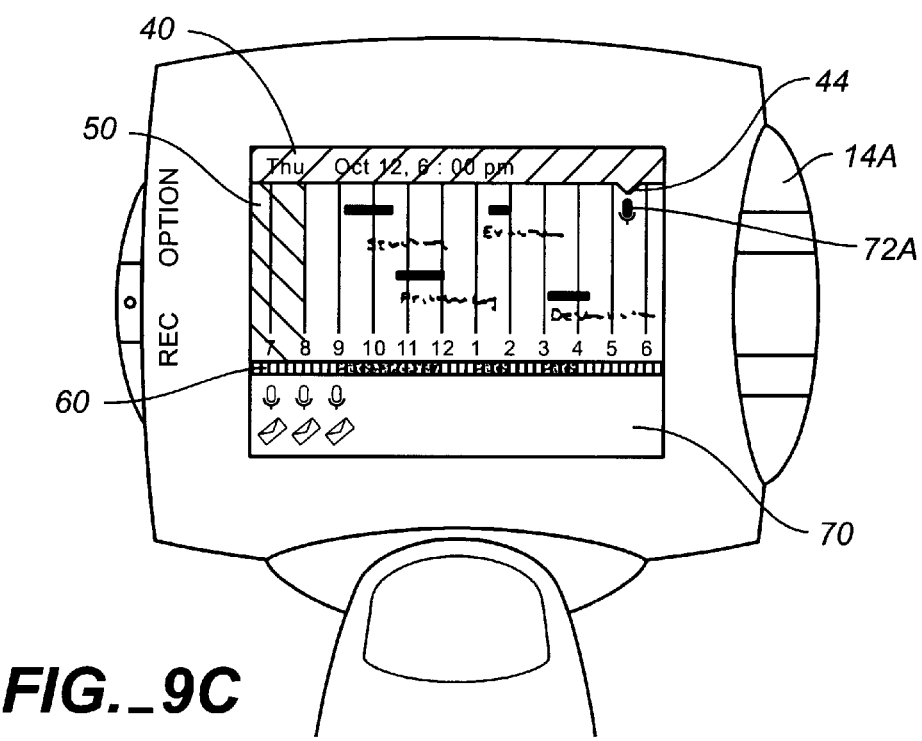
FIG._9C

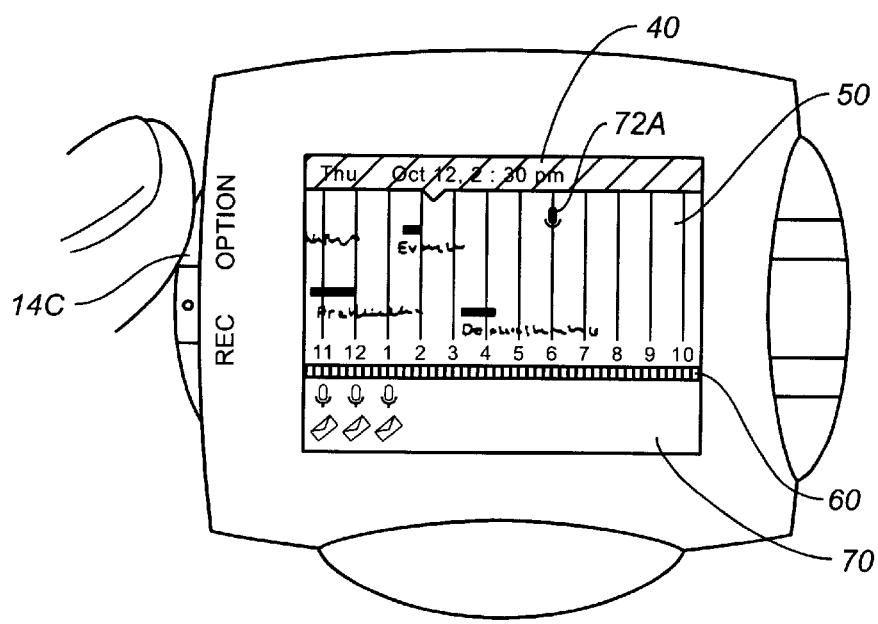
FIG._10A
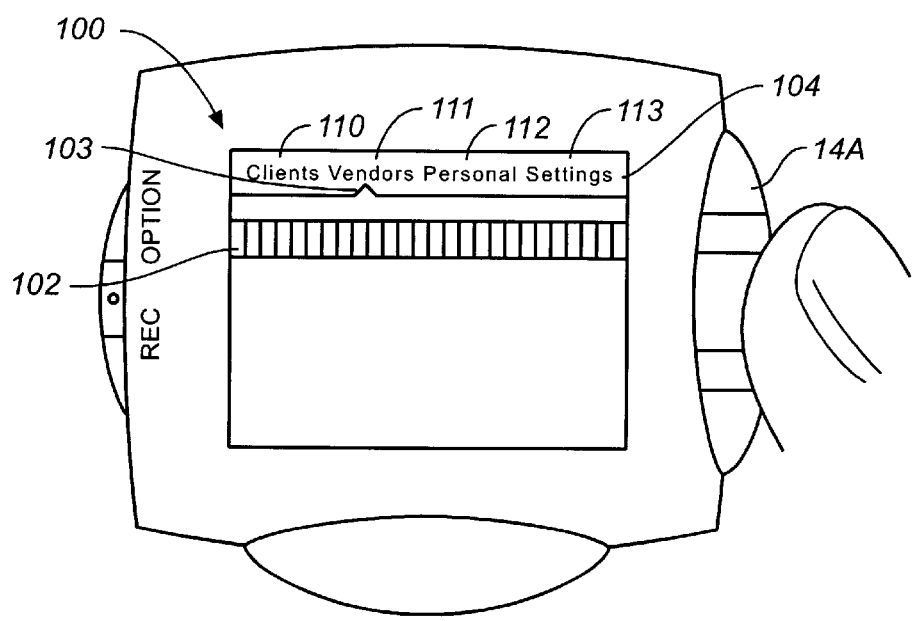
FIG._10B

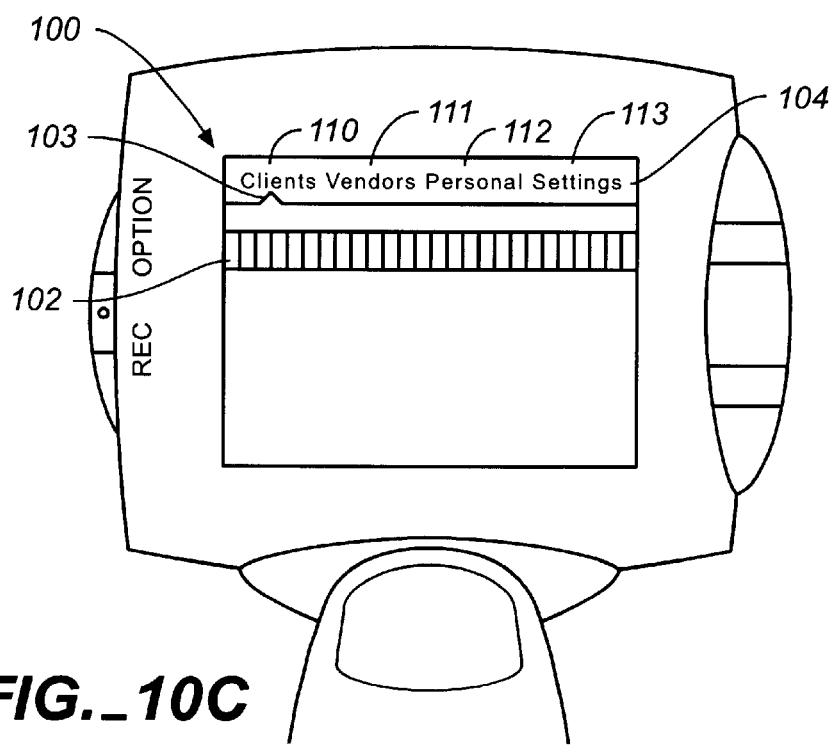
FIG._10C
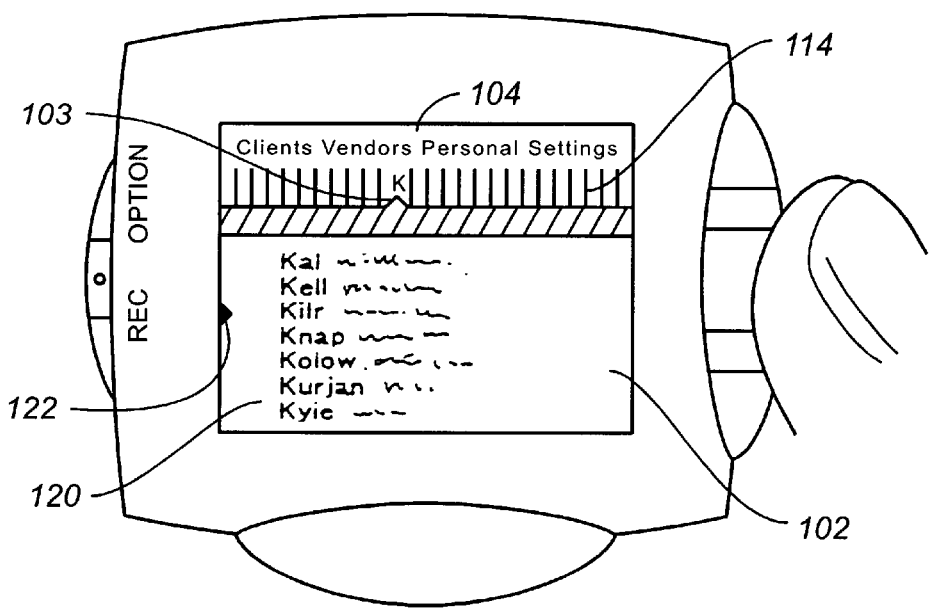
FIG._11A

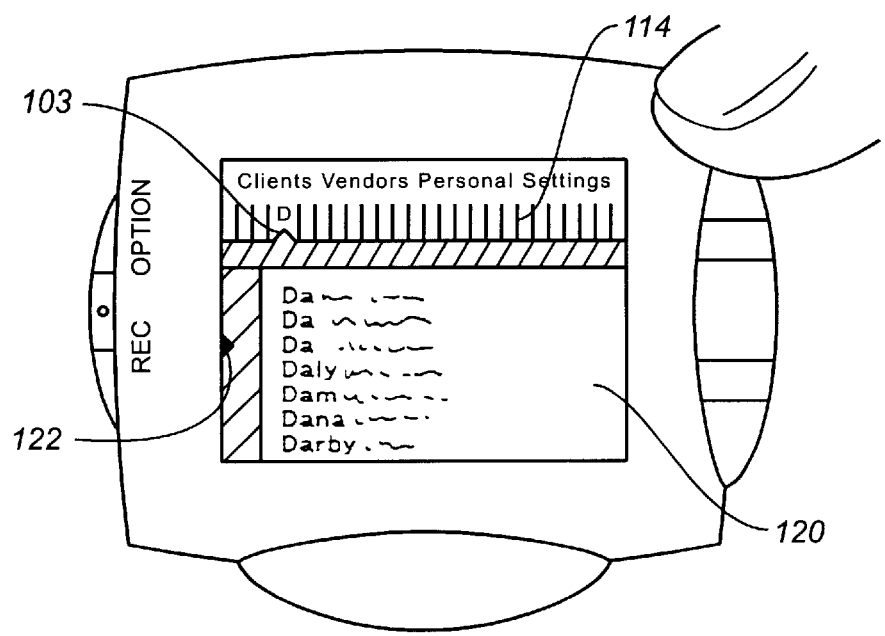
FIG._11B
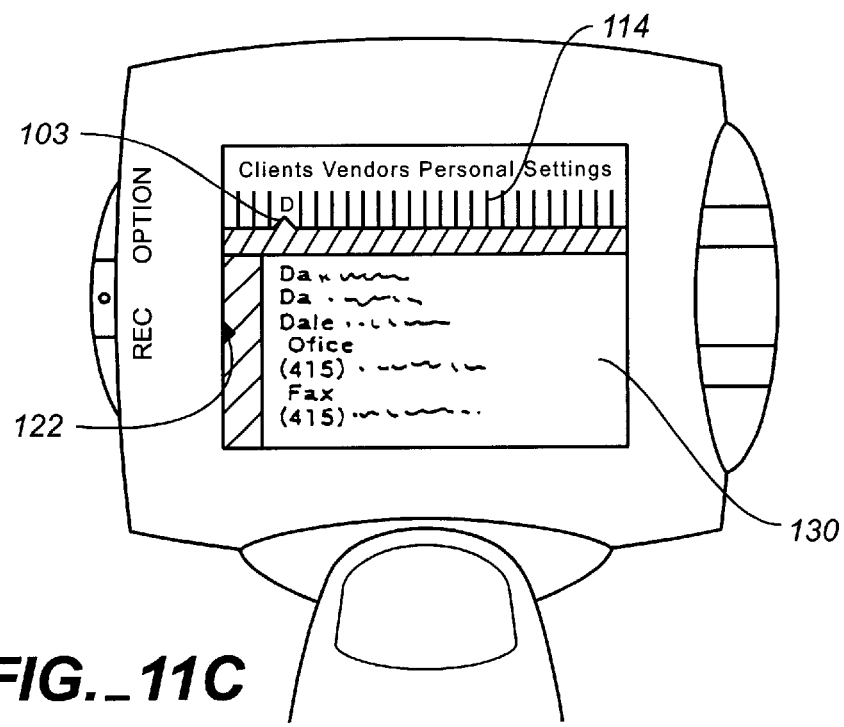
FIG._11C

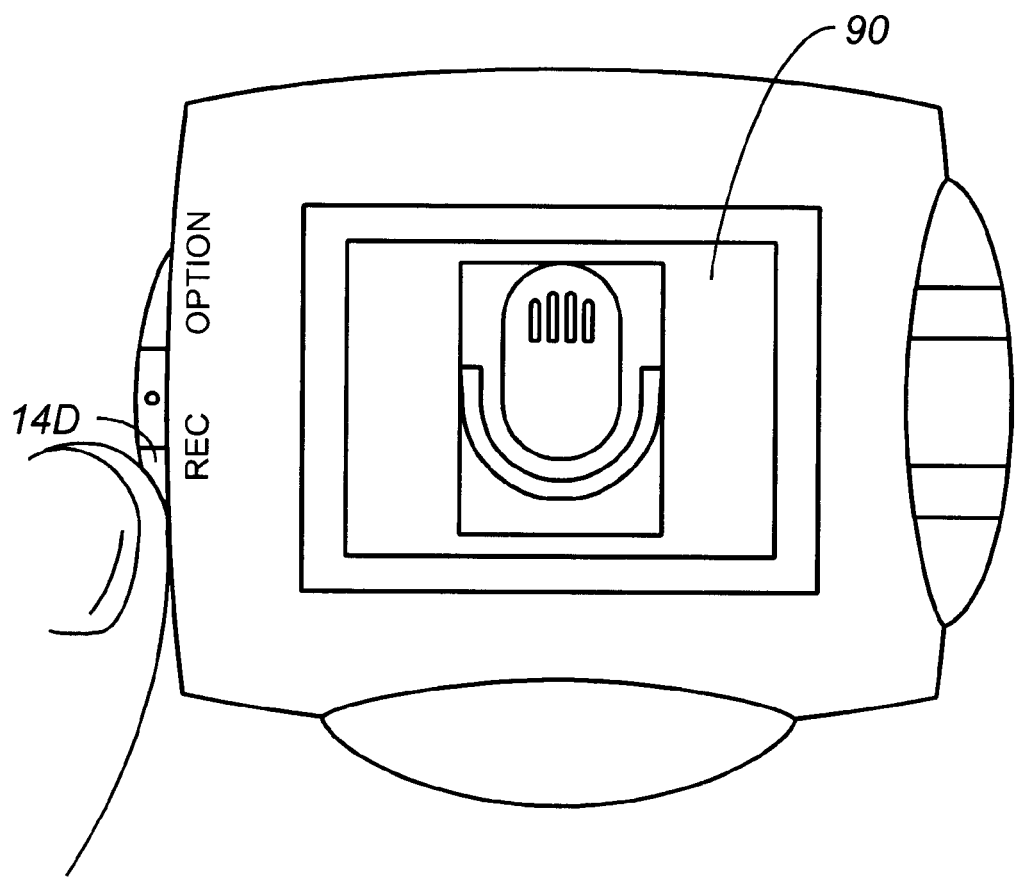
FIG._12

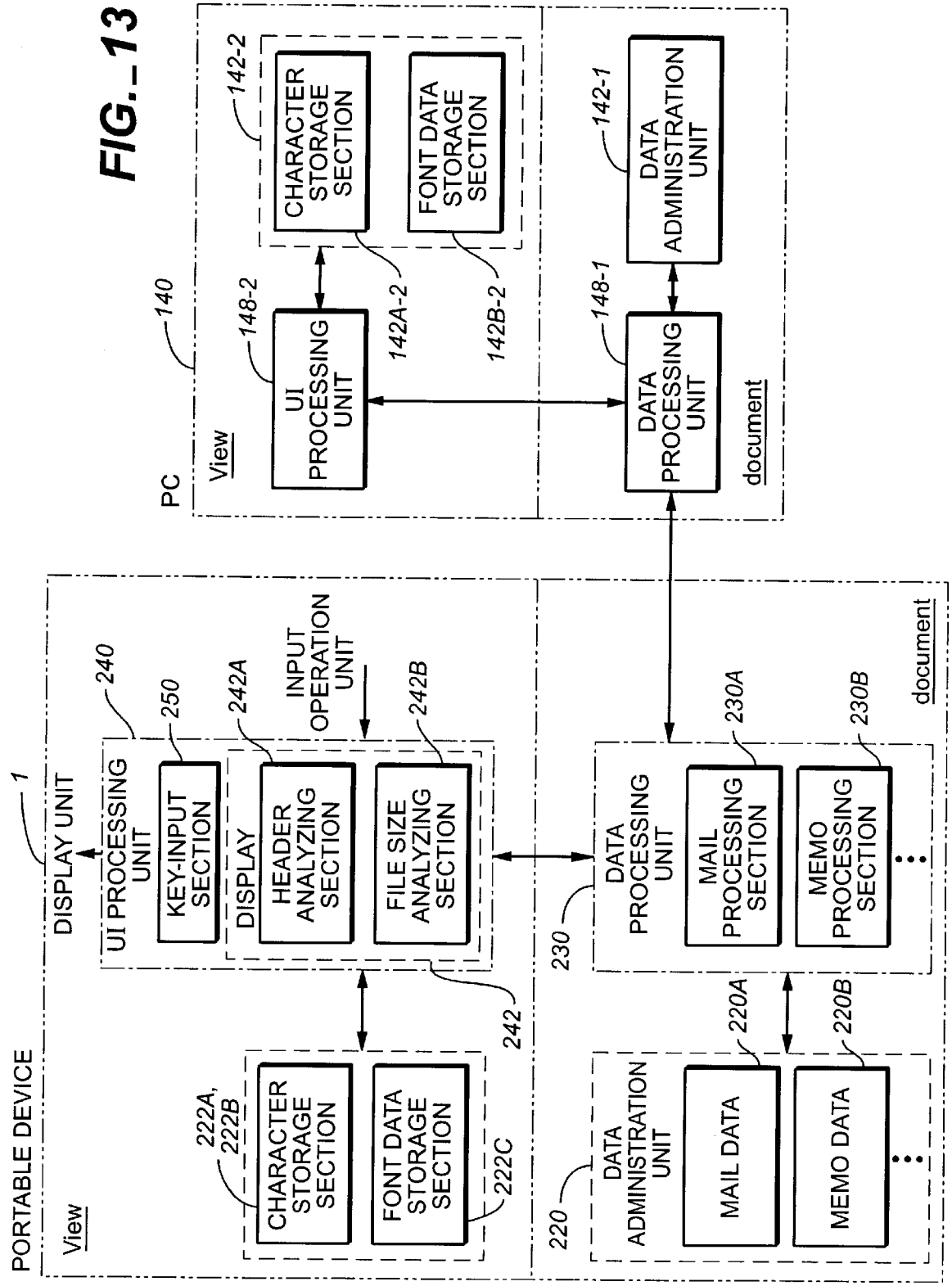
FIG._13

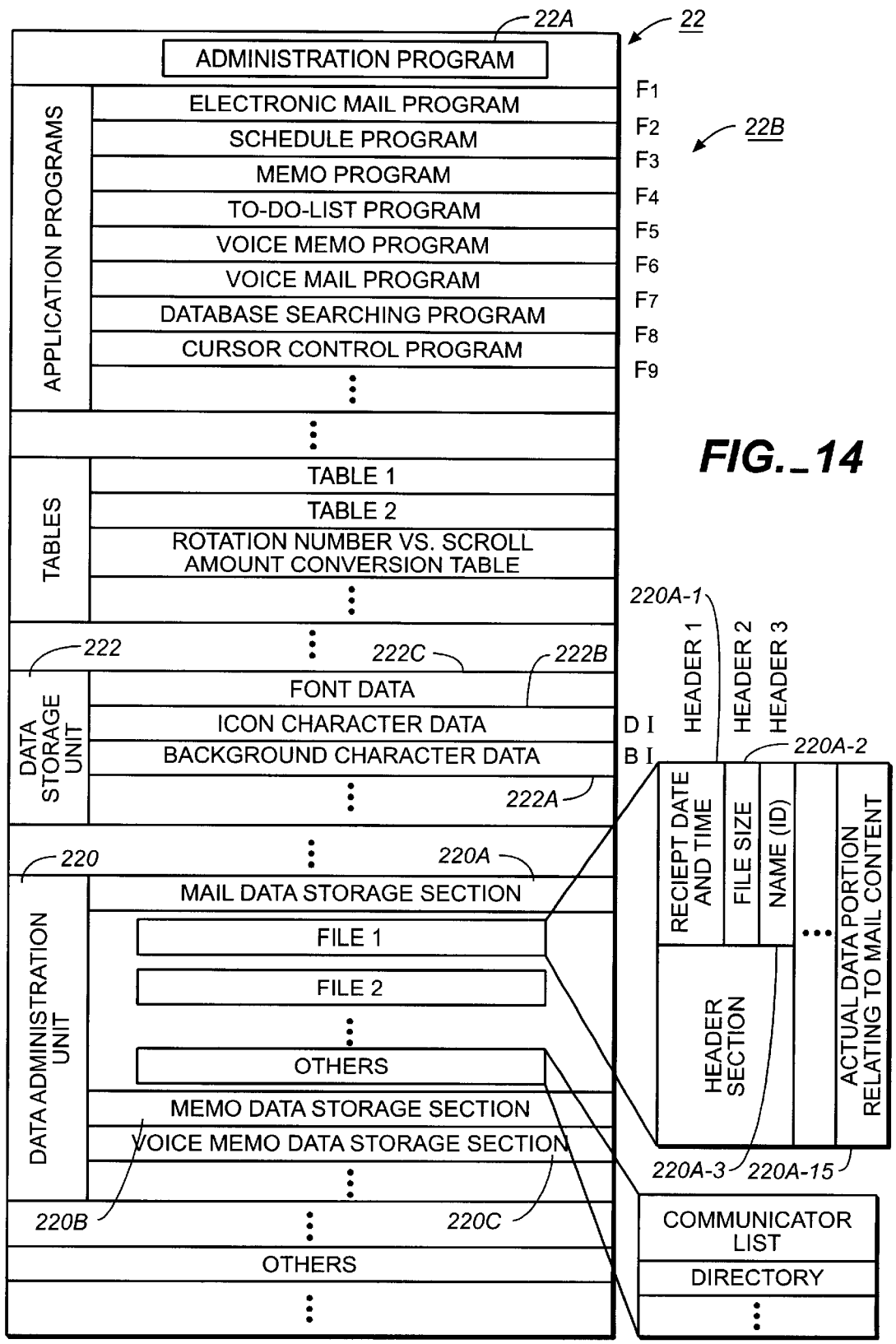
FIG._14

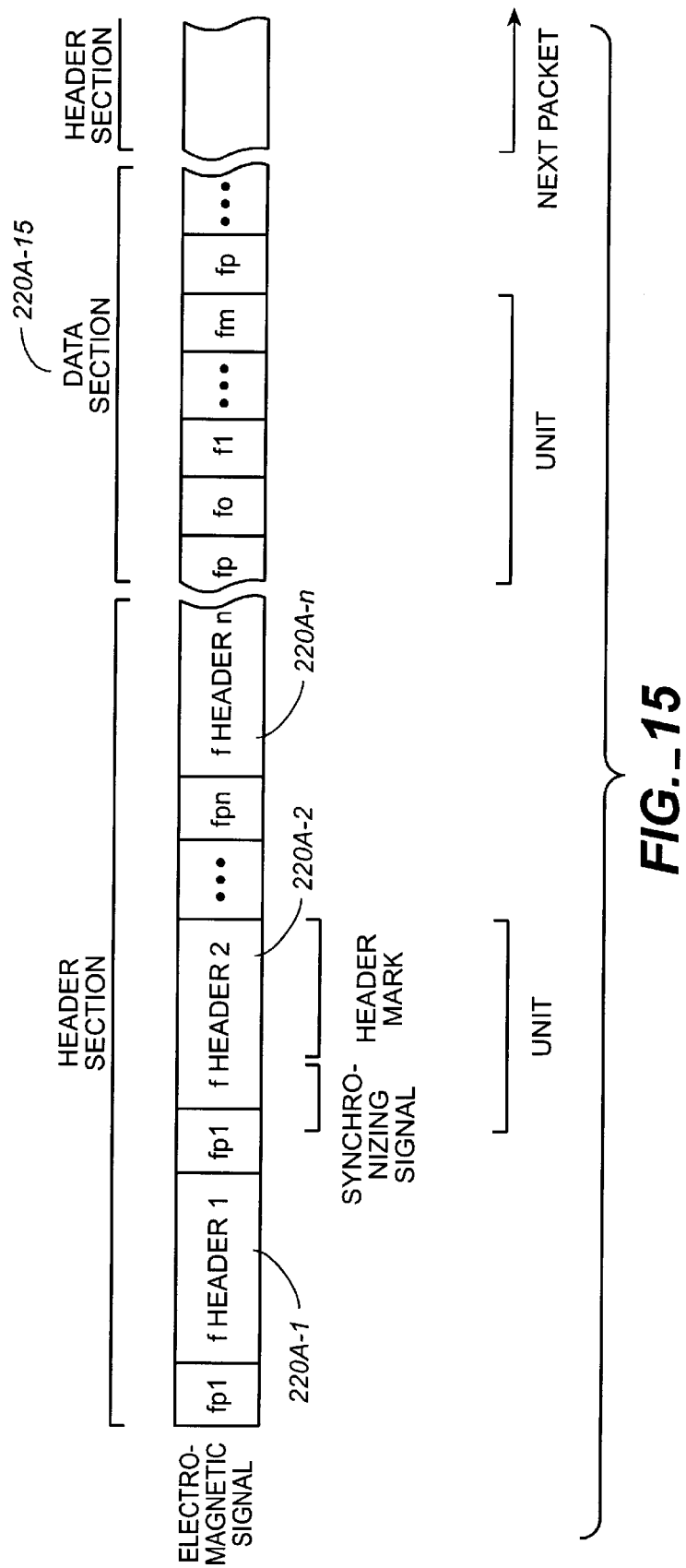
FIG._15

Table 1

| FUNCTION NAME | ICON CHARACTER DATA POINTER | FUNCTION PROGRAM POINTER |
|---|---|---|
| ELECTRONIC MAIL | DI1 | F1 |
| ELECTRONIC MAIL | DI2 | F1 |
| VOICE MEMO | DI3 | F5 |
| VOICE MEMO | DI4 | F5 |
| SCHEDULE | DI5 | F2 |
| SCHEDULE | DI6 | F2 |
| ... | ... | ... |

*FIG._16A*

Table 2

| MENU NAME | MENU FORM | DISPLAY SCREEN CHARACTER POINTER | ICON POSITION | |
|---|---|---|---|---|
| CLOCK MODE | POP-UP | BI2 | | |
| SCHEDULE MODE | ENTIRE AREA | BI3 | SCHEDULE | $(X_0, Y_0)$ |
| | | | SCHEDULE | $(X_1, Y_1)$ |
| | | | ... | |
| COMMUNICATION MODE | ENTIRE AREA | BI4 | ELECTRONIC MAIL | $(X_m, Y_m)$ |
| | | | VOICE MEMO | $(X_s, Y_s)$ |
| | | | ... | |
| DATABASE MODE | POP-UP | BI5 | | |
| SCHEDULE ZOOM MODE | ENTIRE AREA | BI6 | ELECTRONIC MAIL | ( , ) |
| | | | VOICE MEMO | ( , ) |
| | | | ... | |
| ELECTRONIC MAIL MODE | POP-UP | BI7 | | |
| ... | ... | ... | ... | |

*FIG._16B*

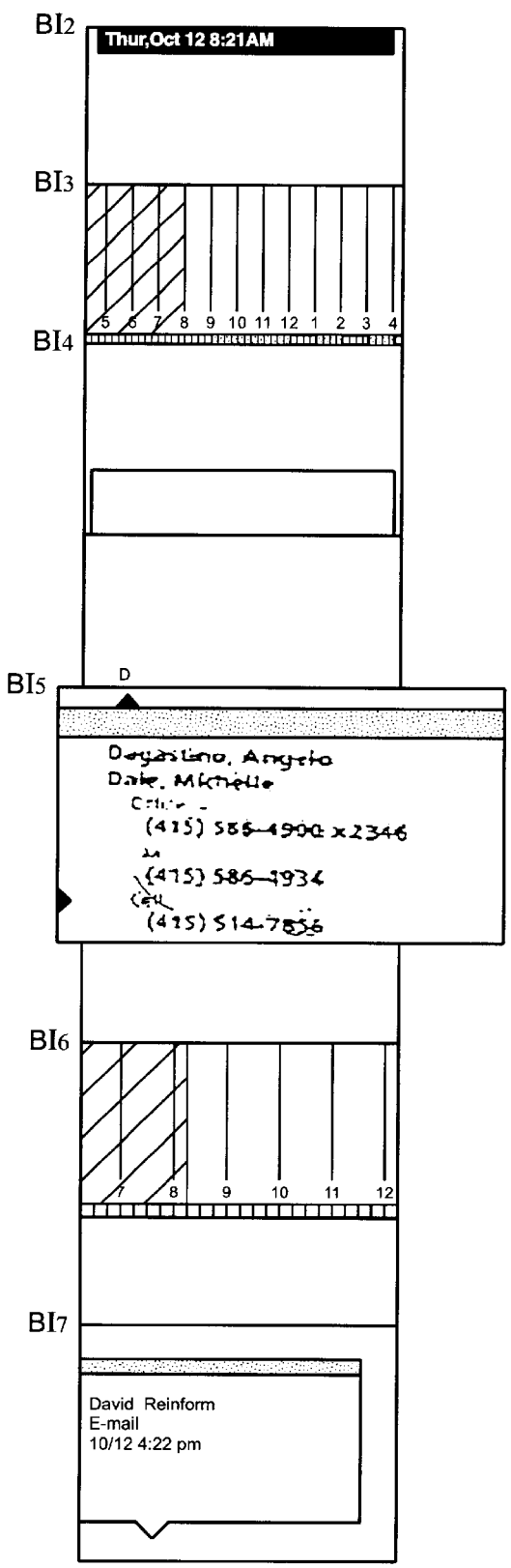
FIG._17B
FIG._17A

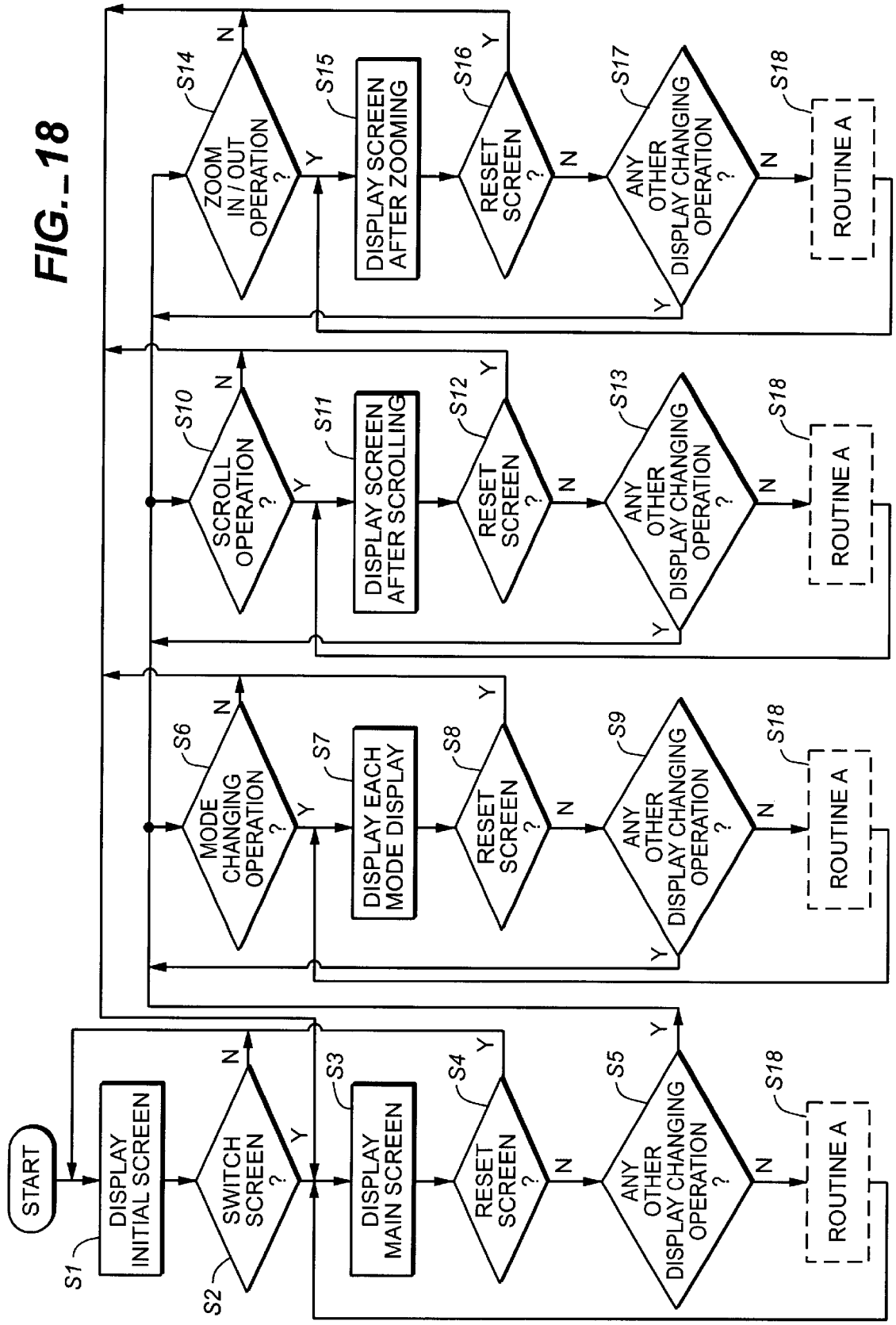
FIG._18

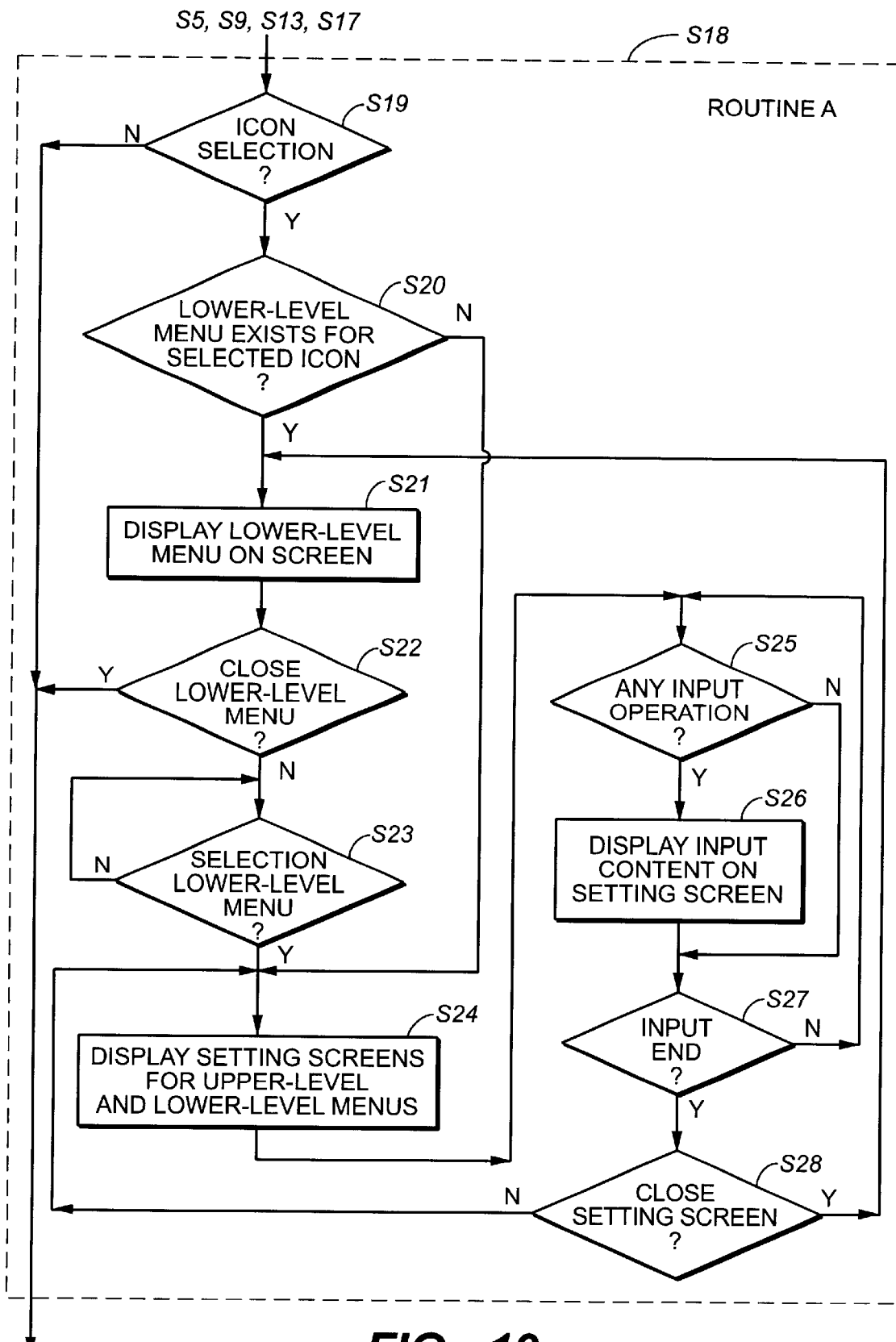
FIG._19

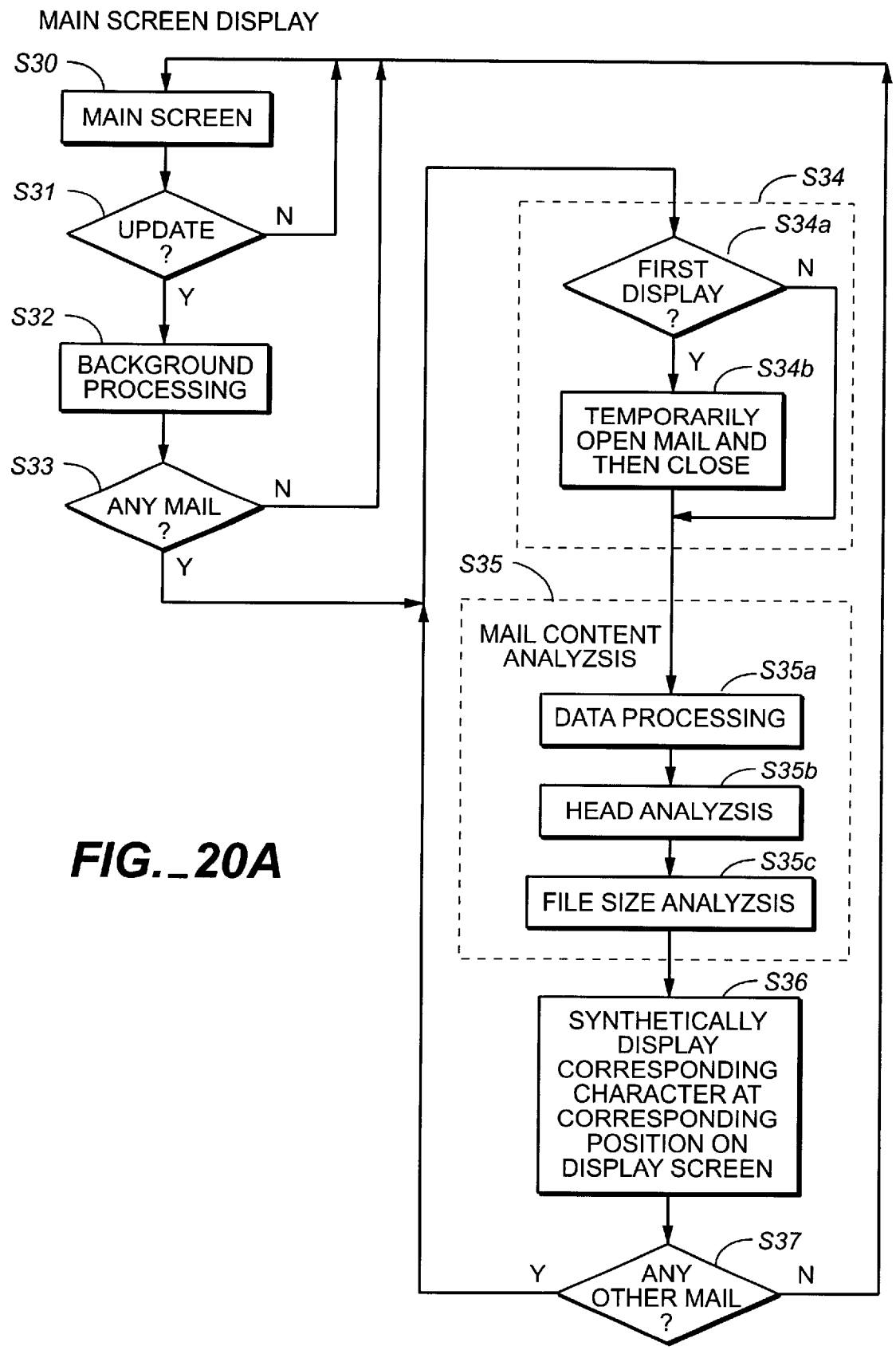
FIG._20A

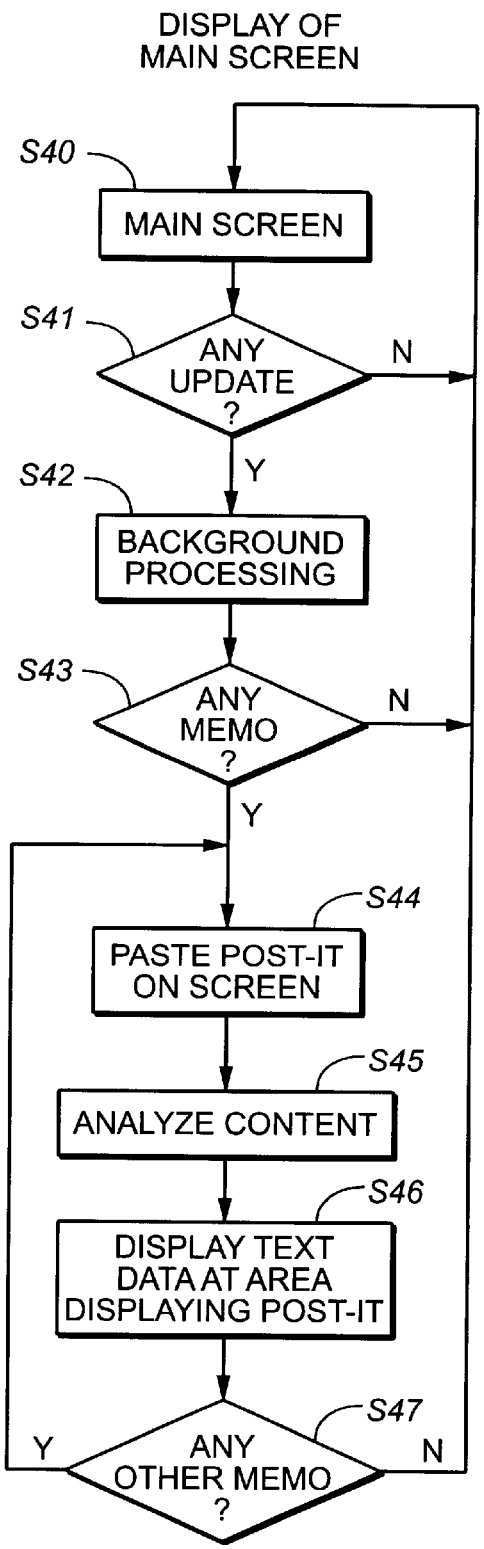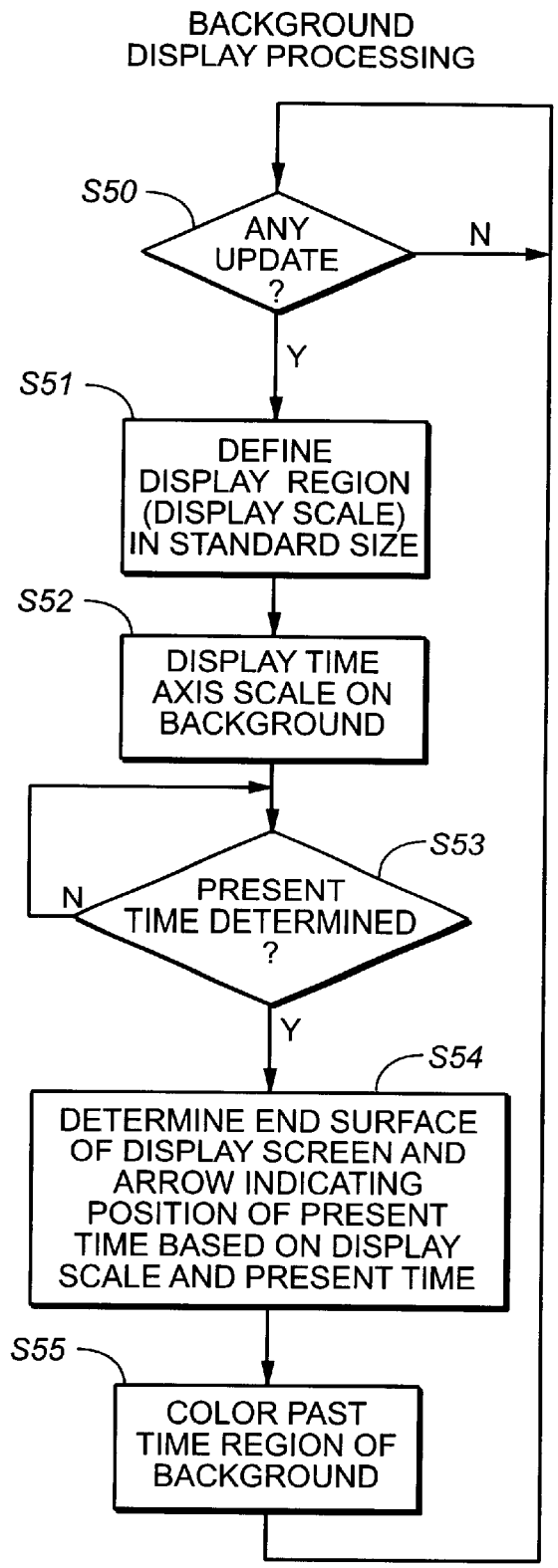
FIG._20B  FIG._21A

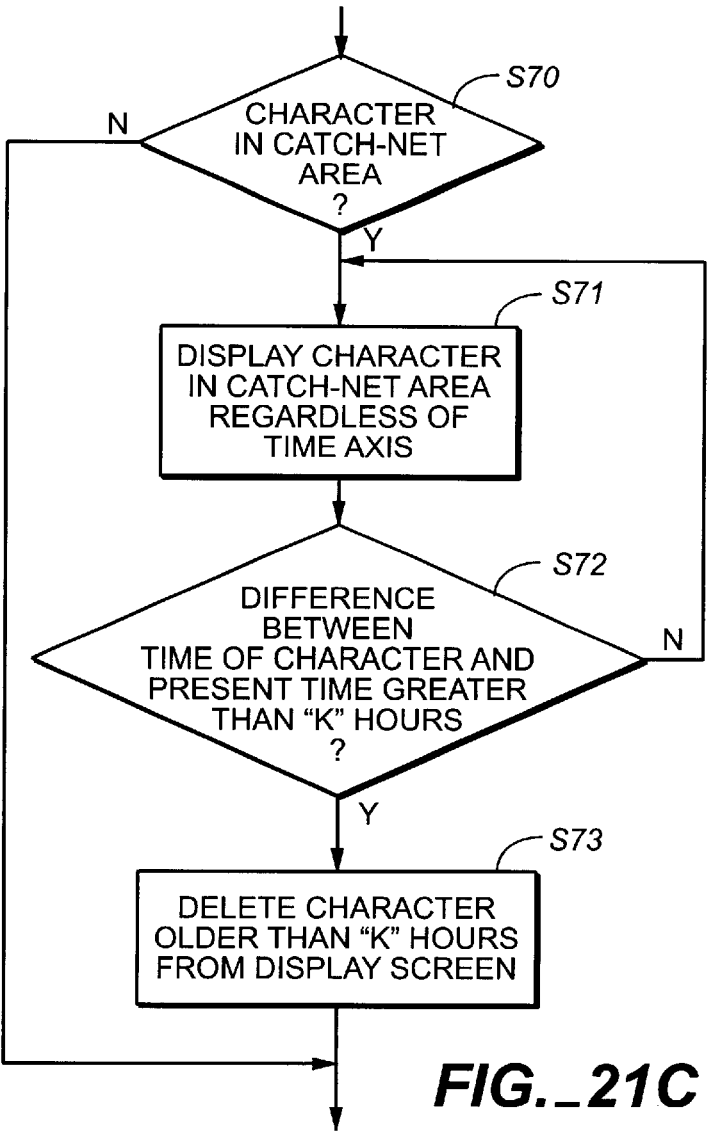

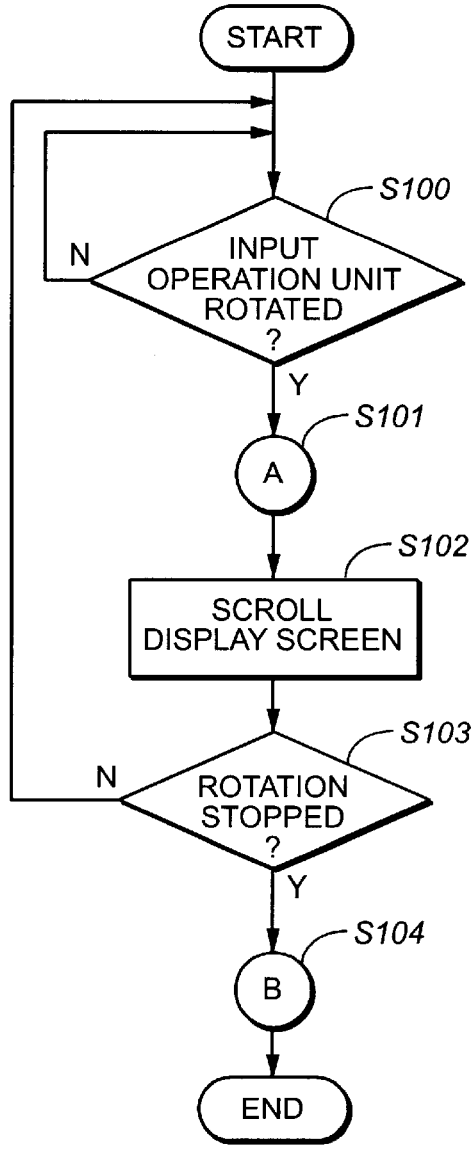
FIG._22A
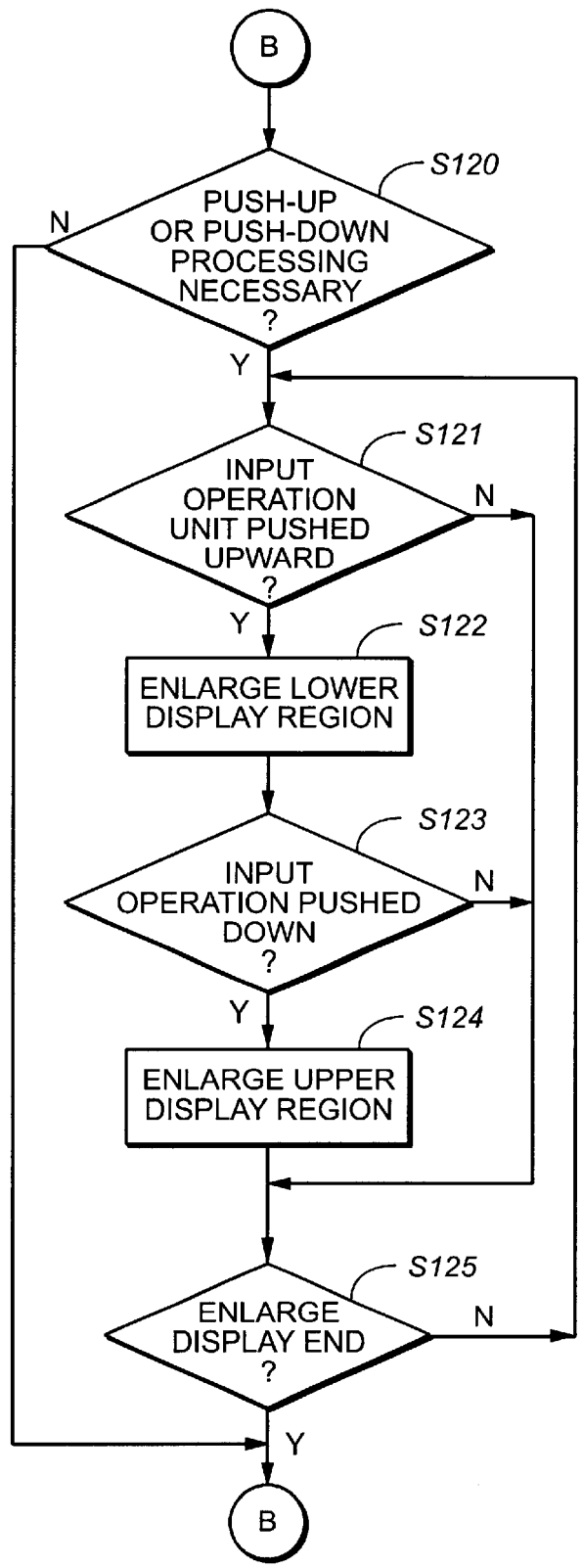
FIG._22C

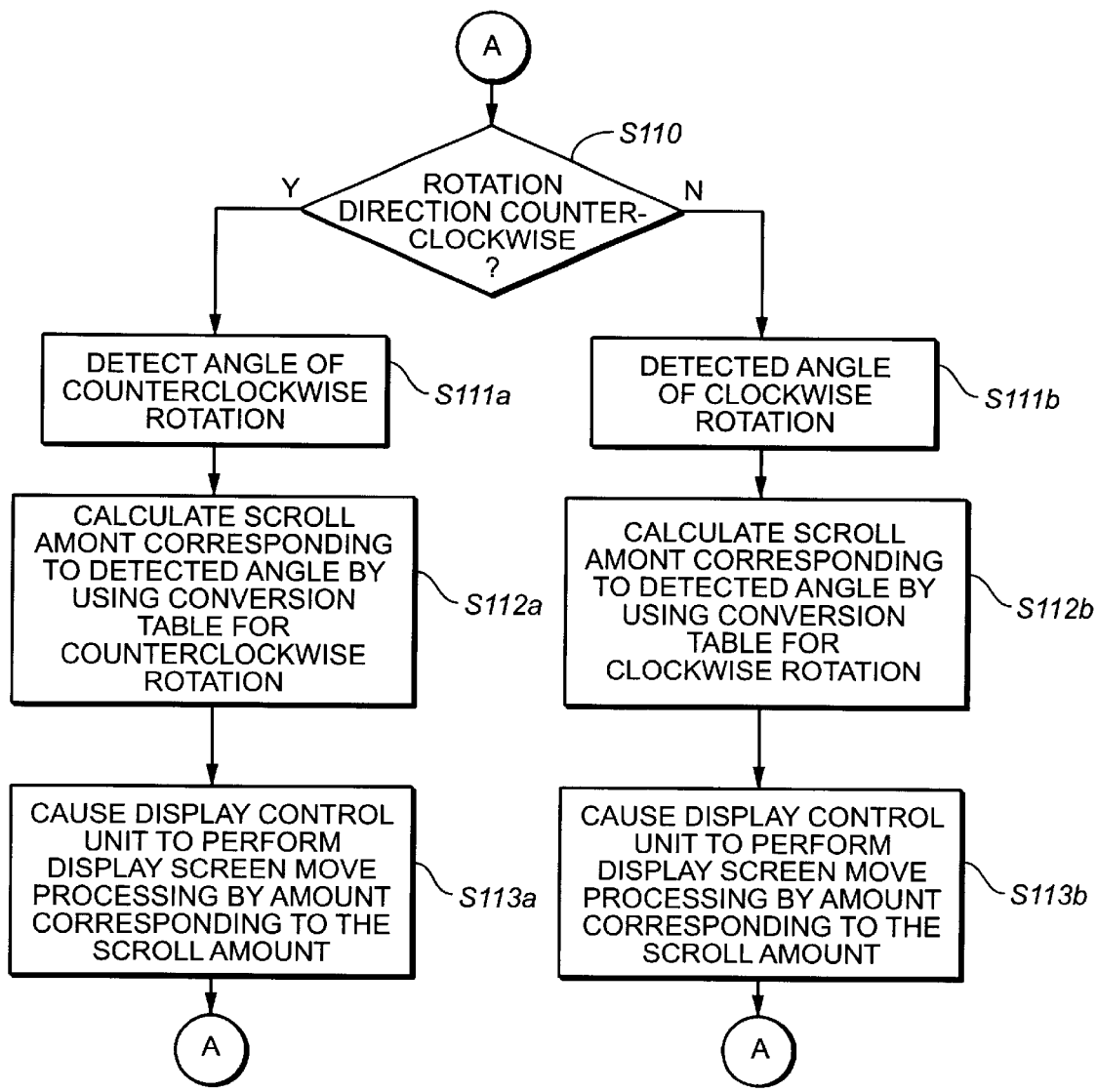
FIG._22B

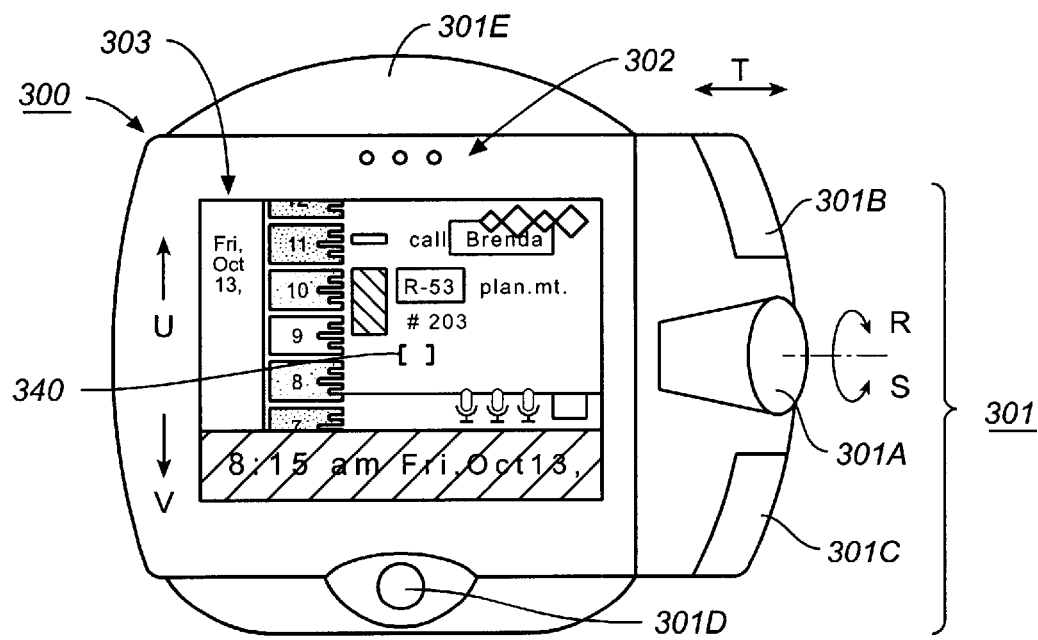
FIG._23A
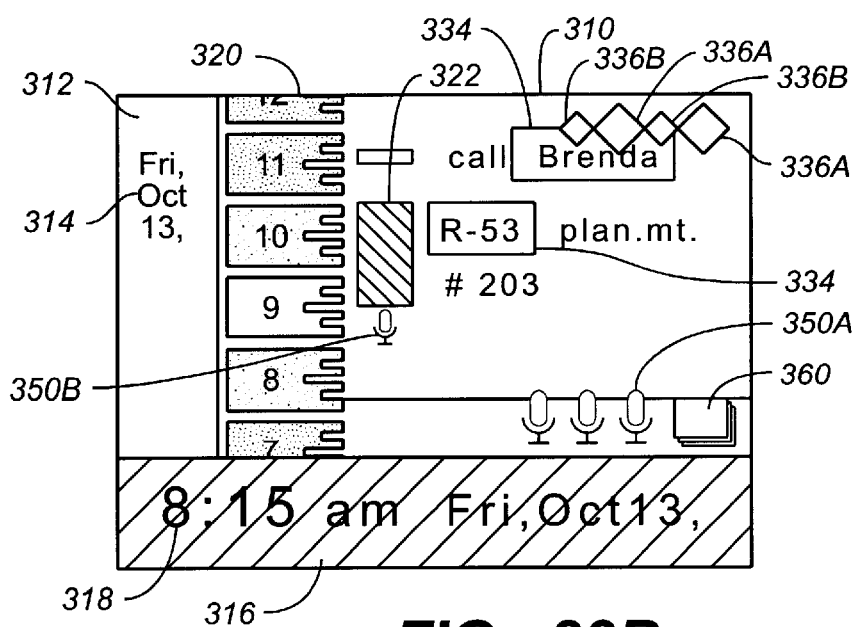
FIG._23B

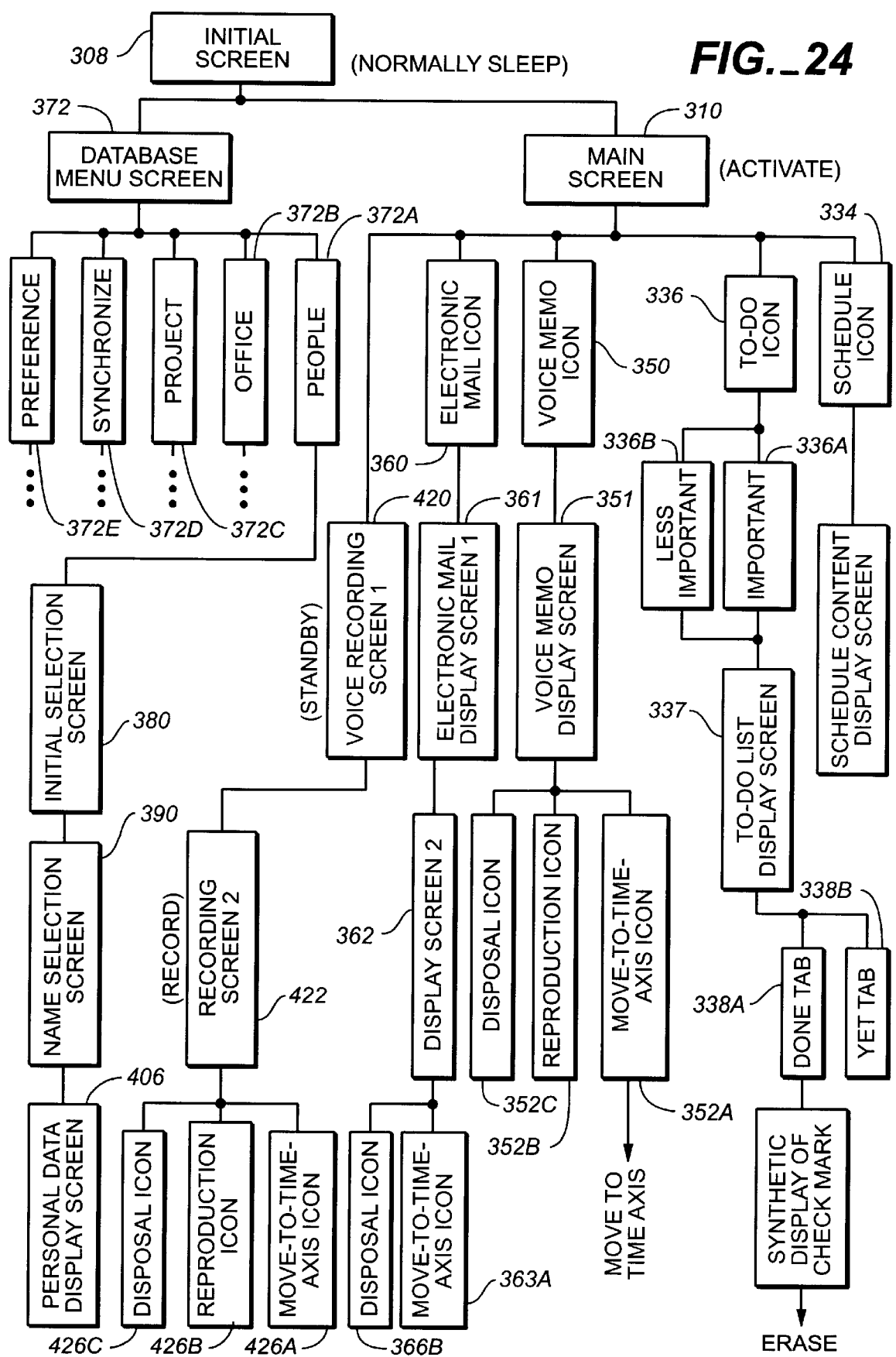
FIG._24

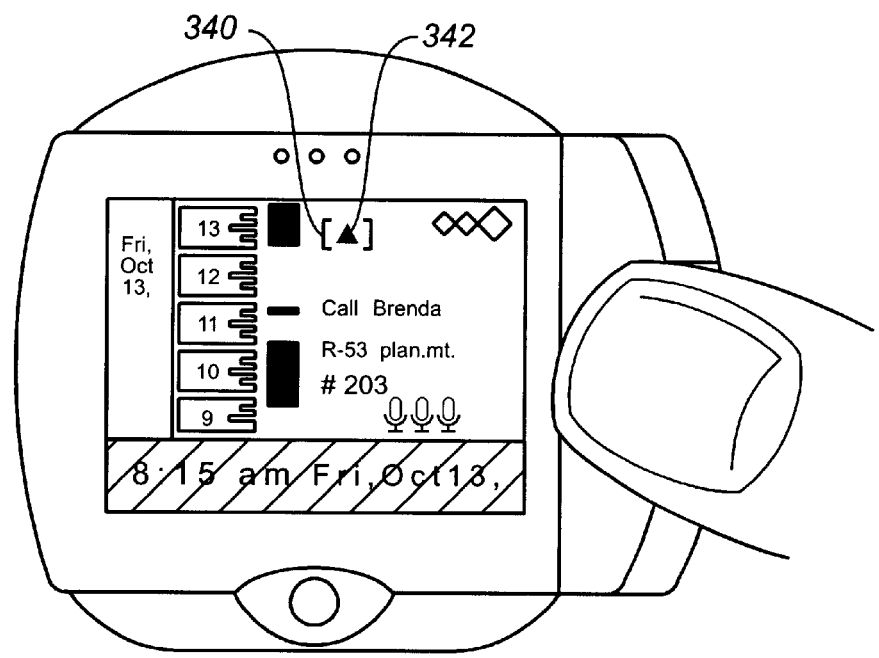
FIG._25
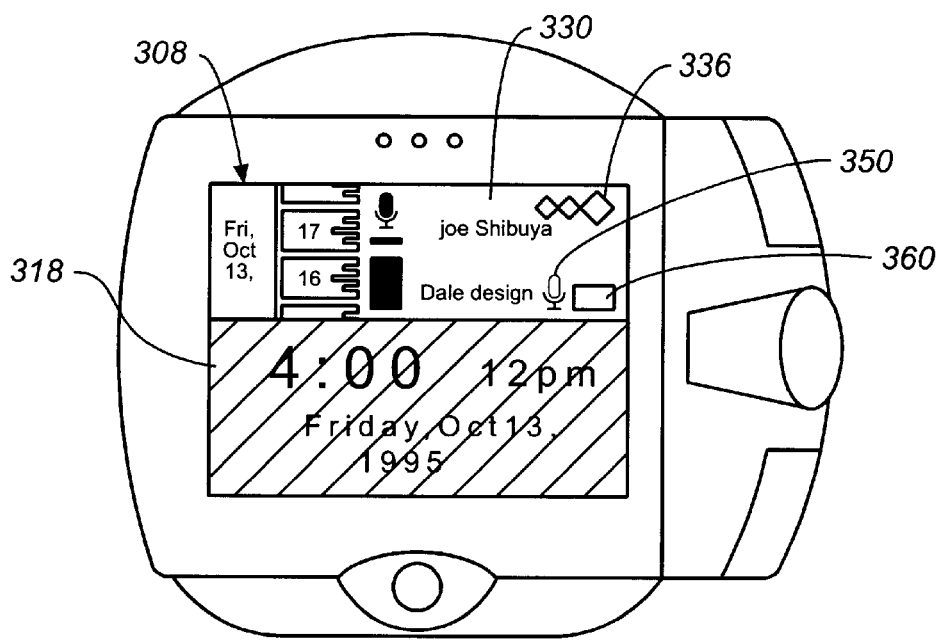
FIG._28

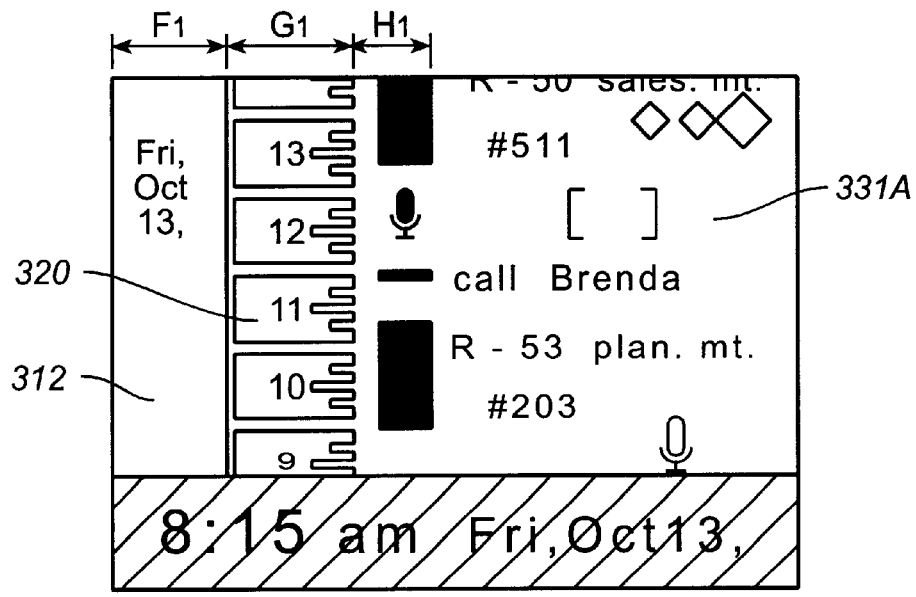
FIG._26A
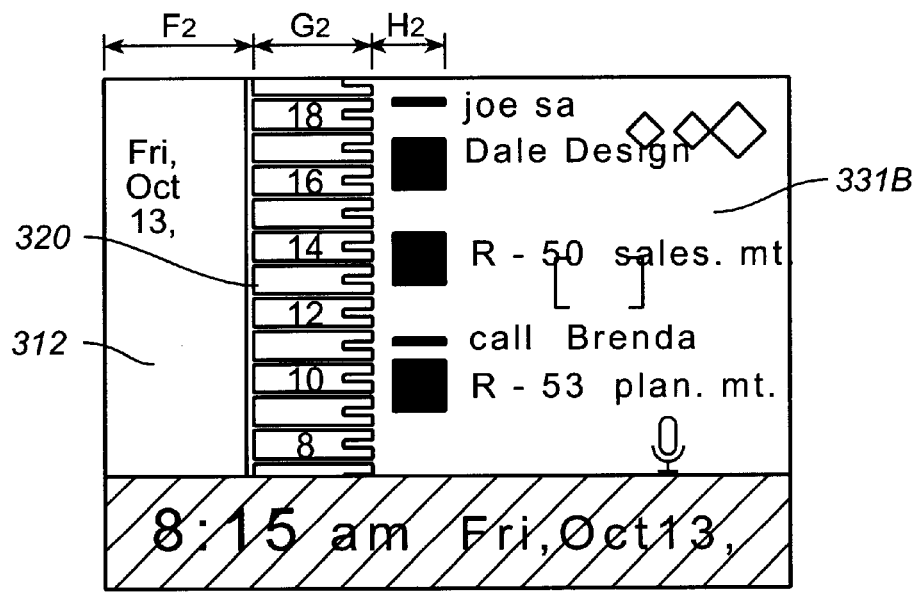
FIG._26B

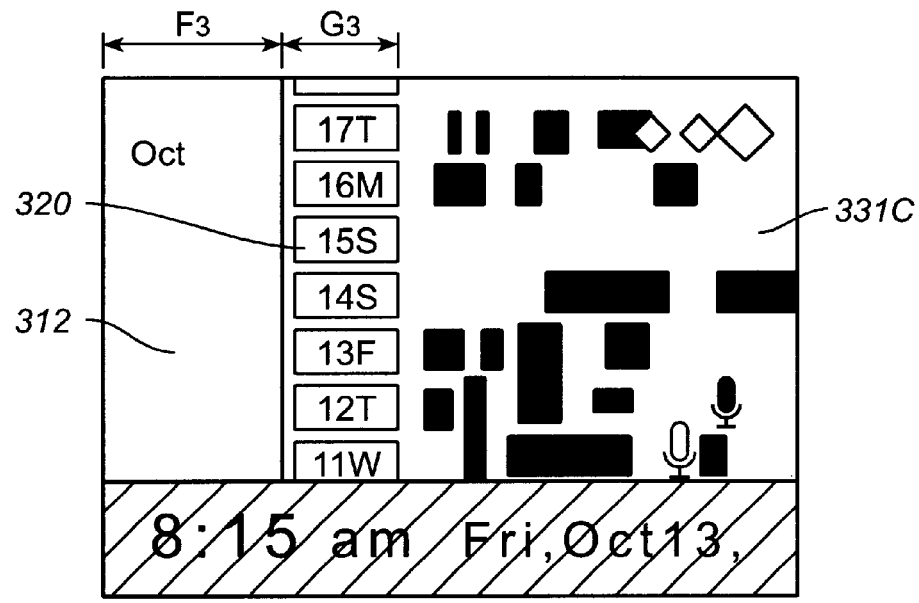
FIG._26C
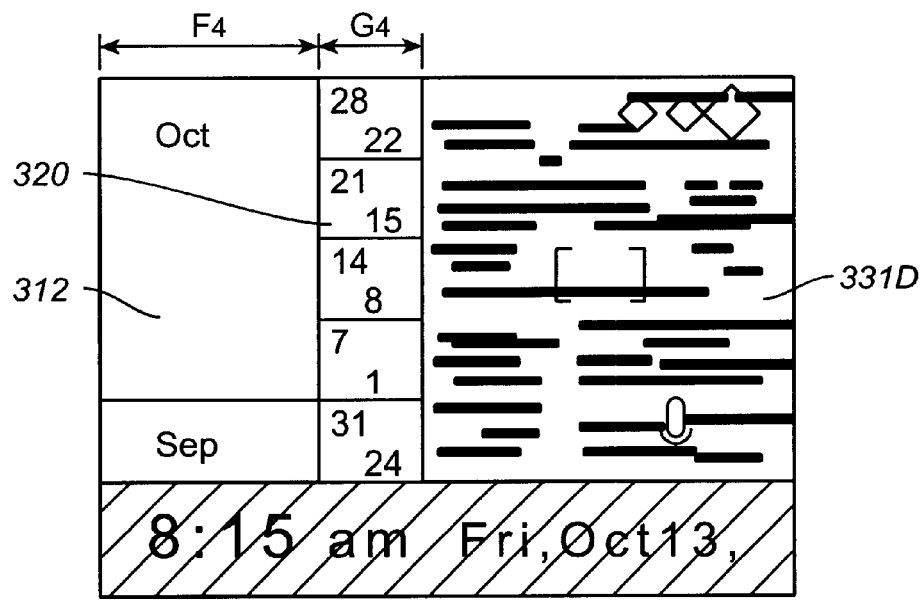
FIG._26D

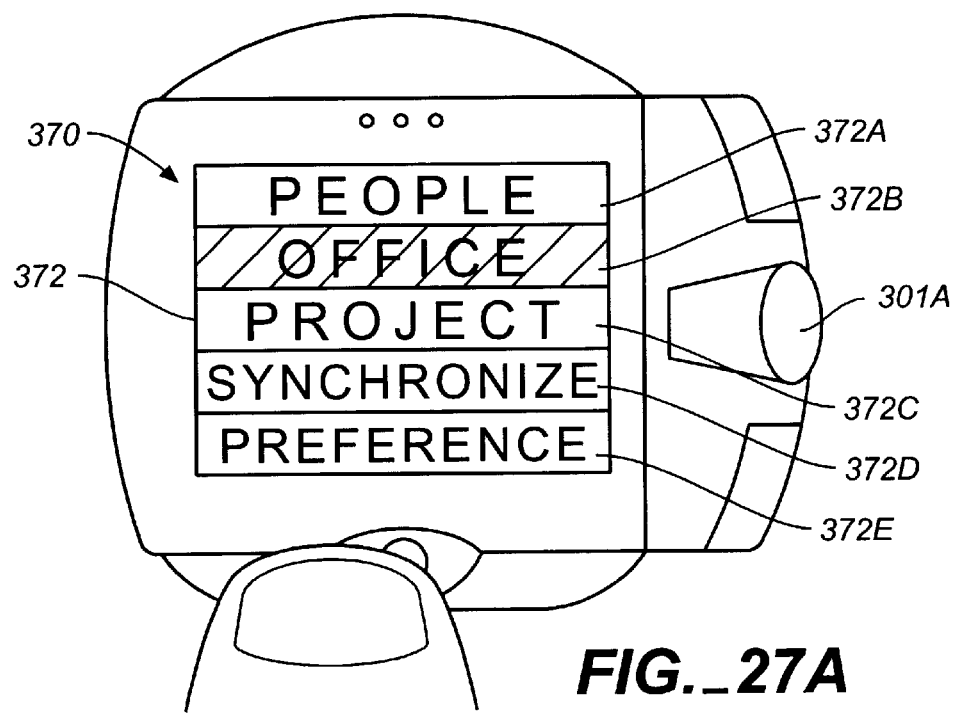
FIG._27A
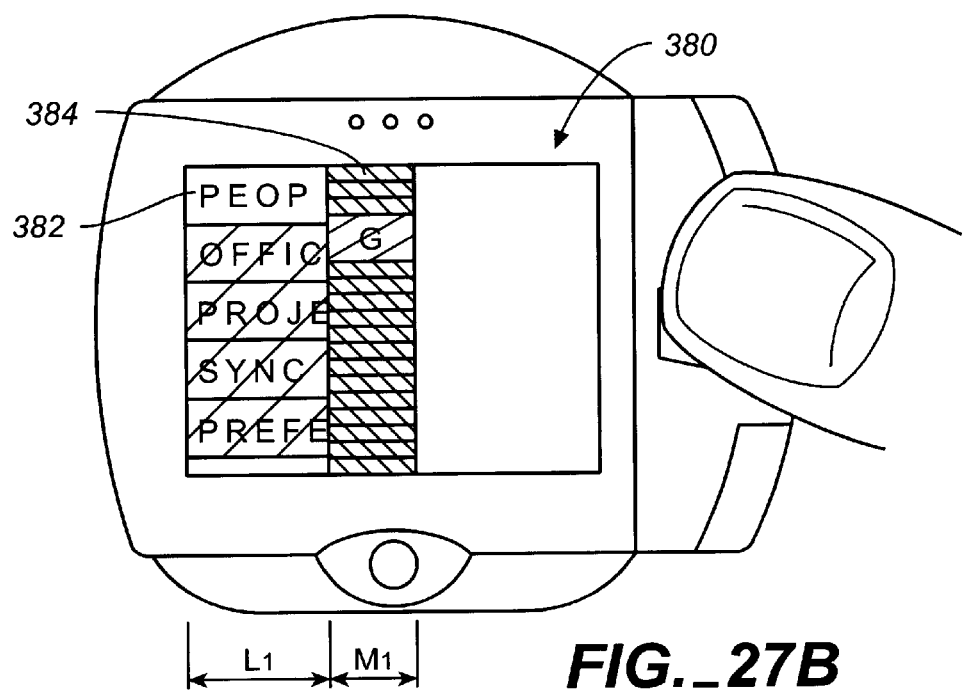
FIG._27B

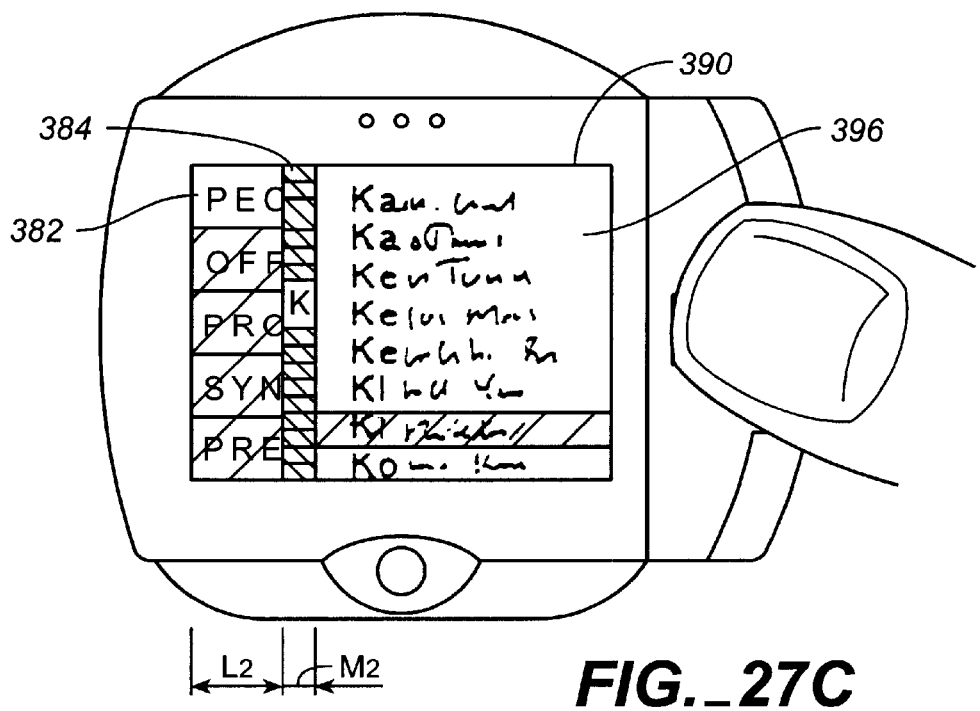
FIG._27C
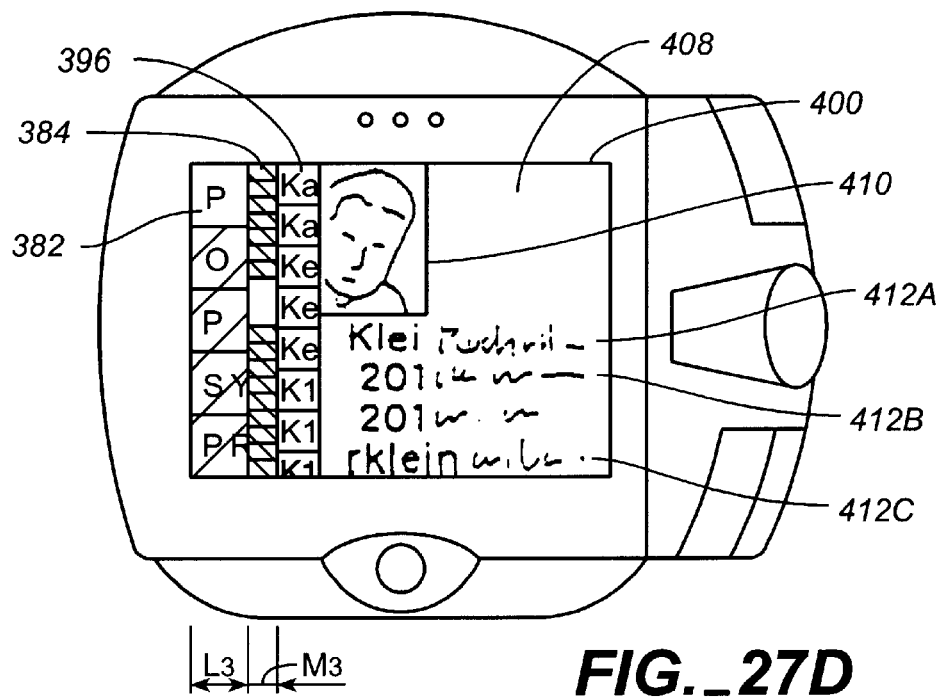
FIG._27D

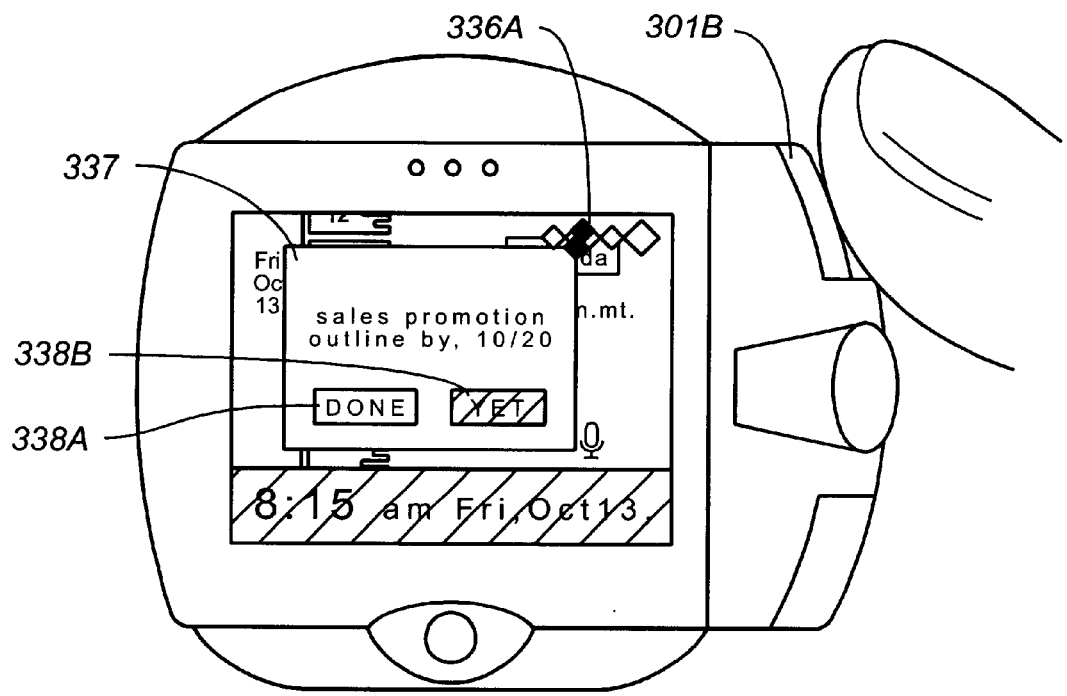
FIG._29A
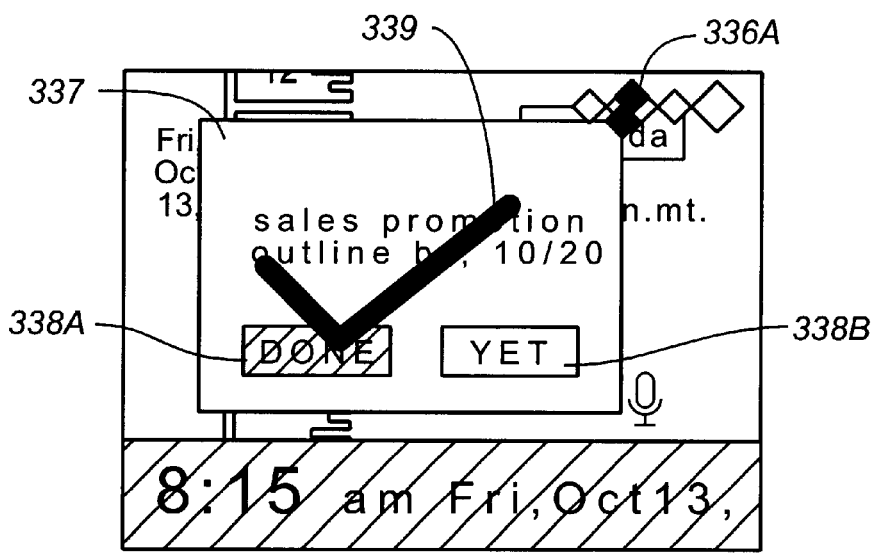
FIG._29B

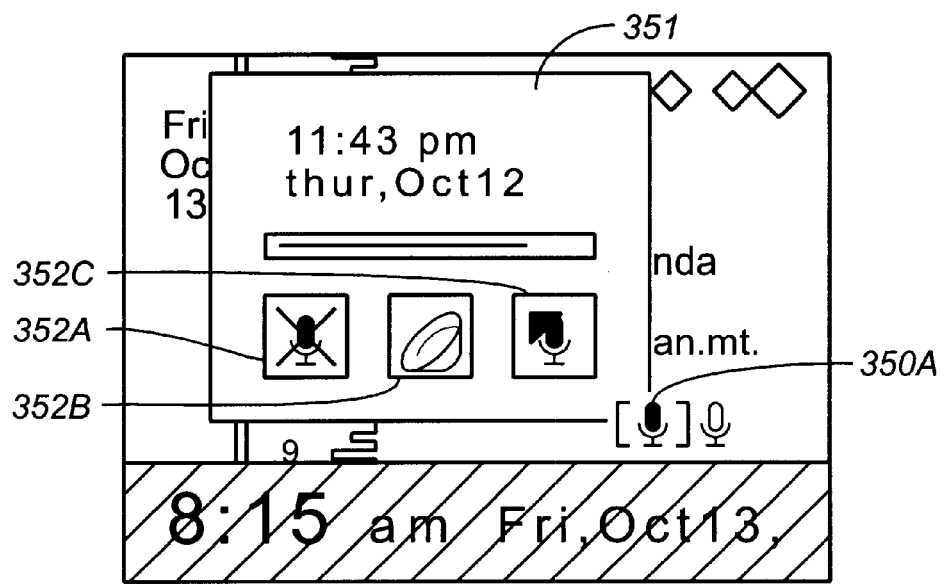
FIG._30A
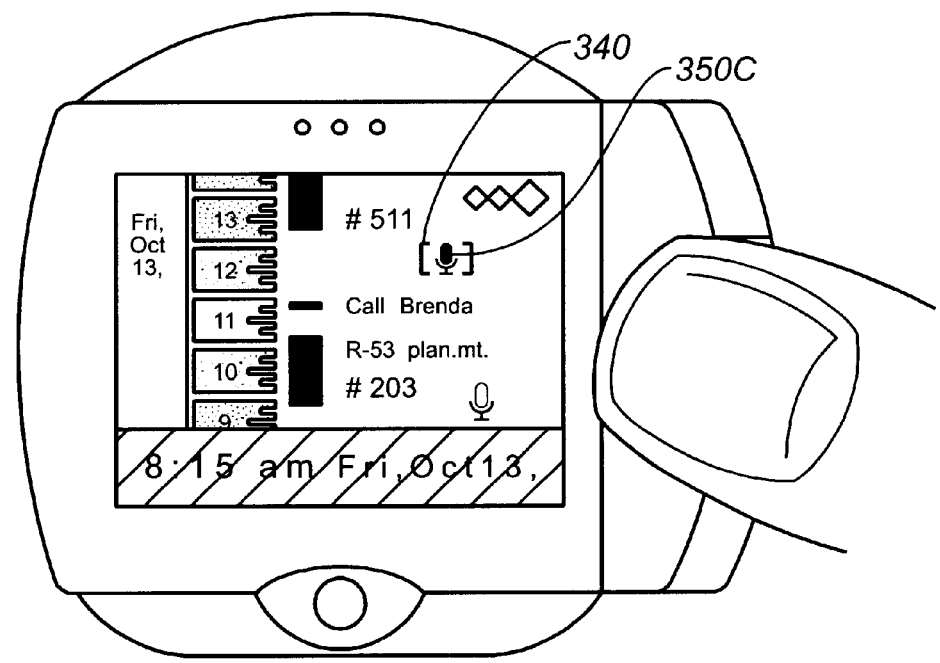
FIG._30B

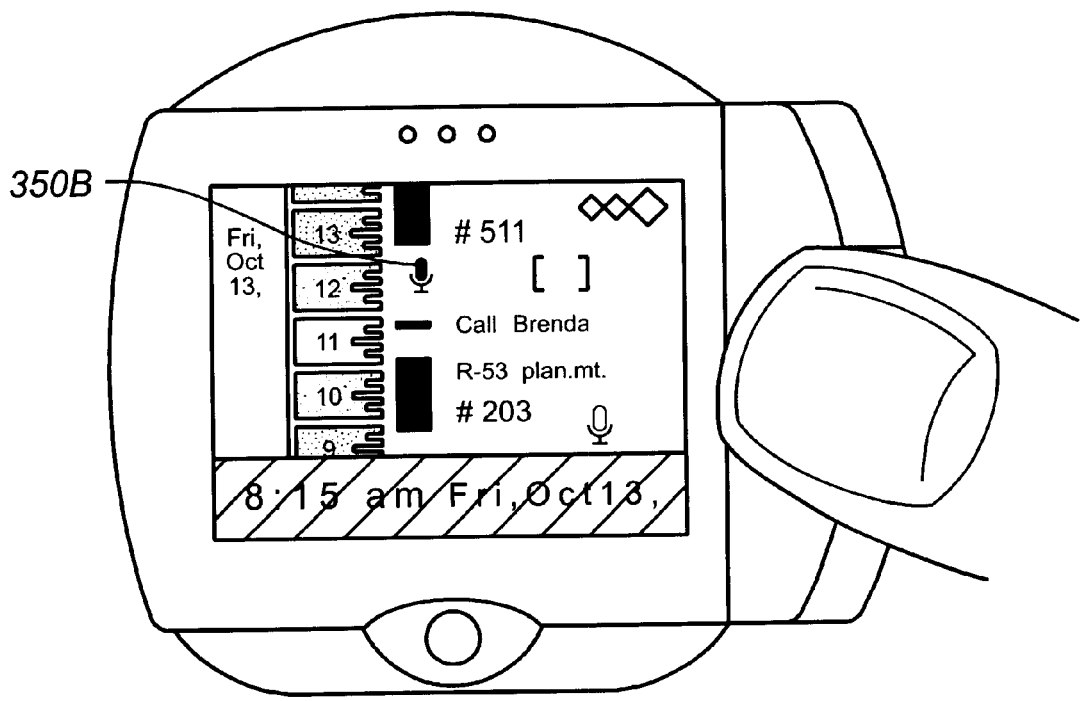
FIG._30C
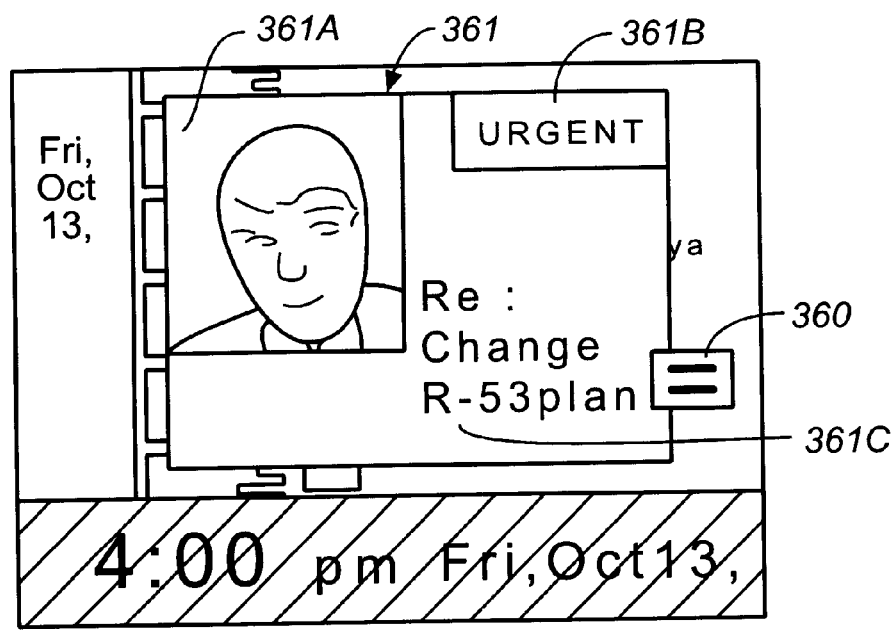
FIG._31A

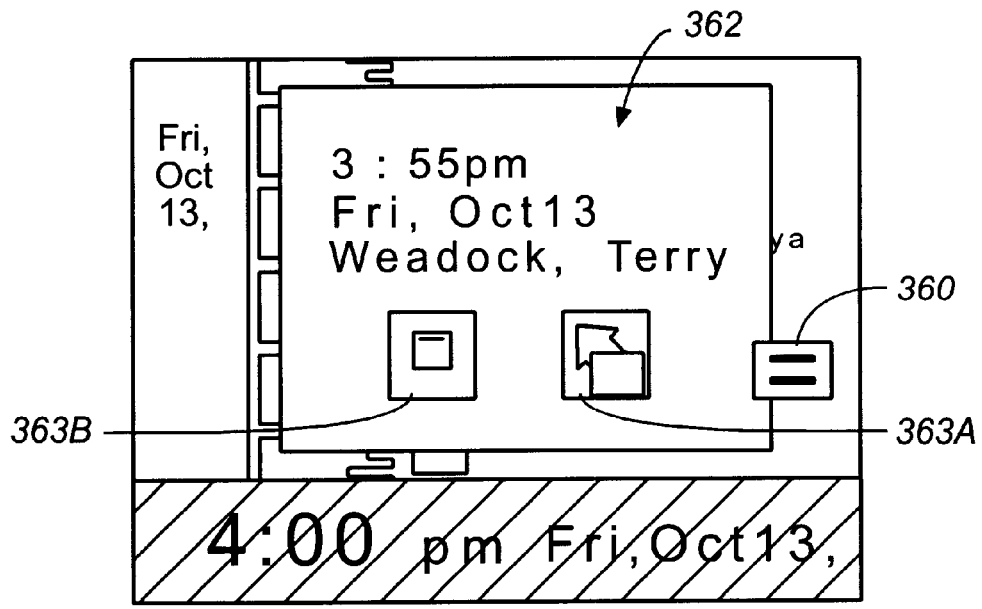
FIG._31B
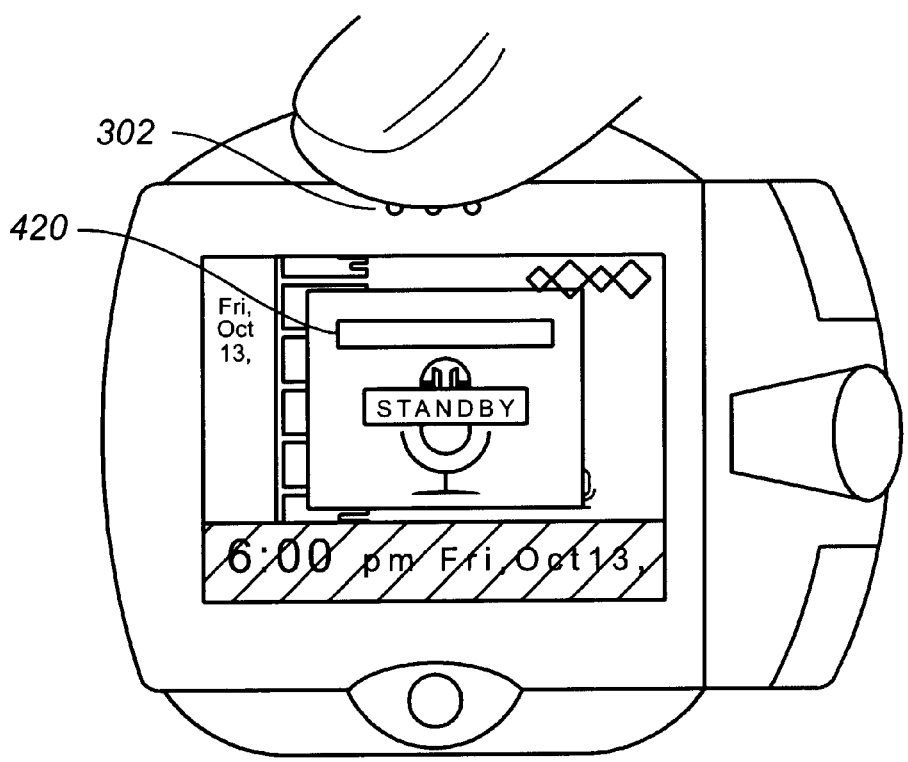
FIG._32A

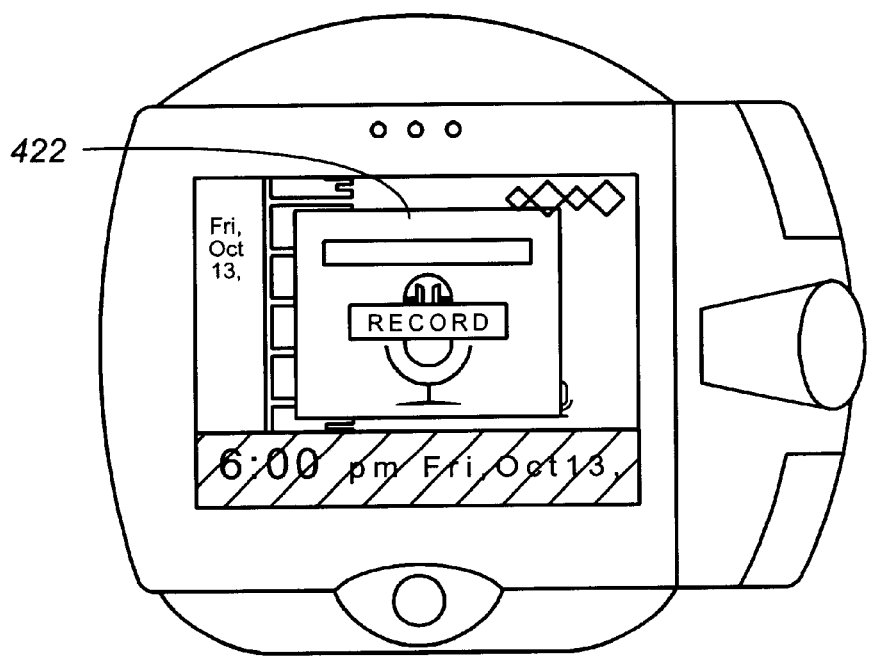
FIG._32B
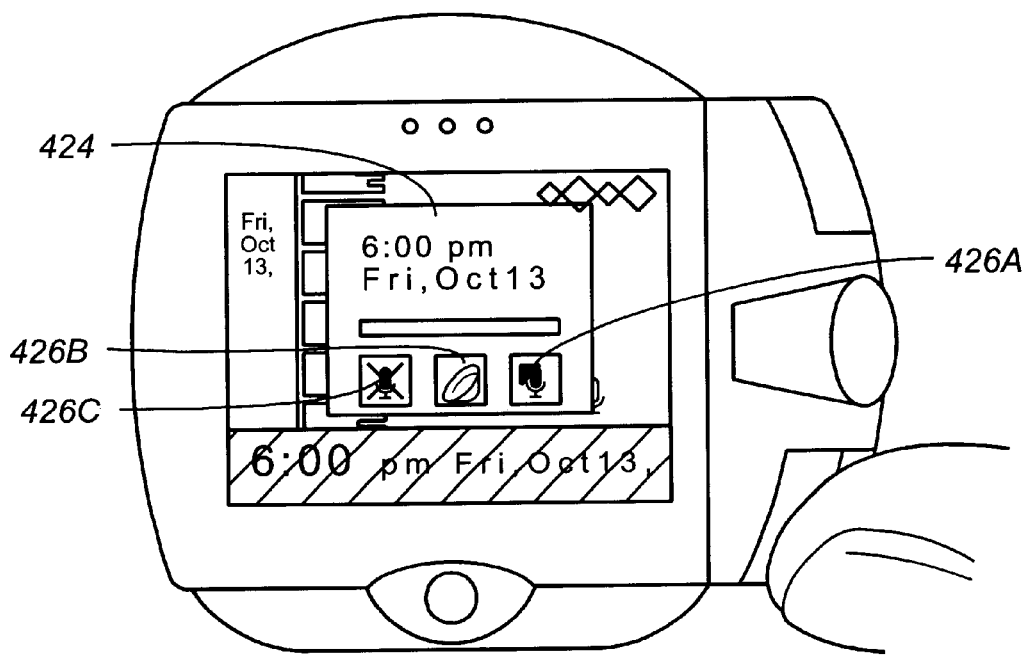
FIG._32C

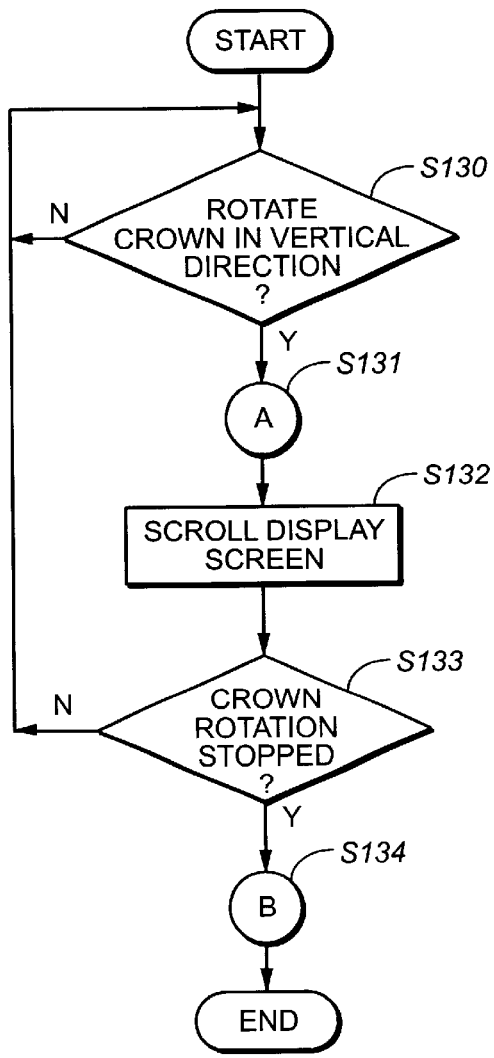
FIG._33A
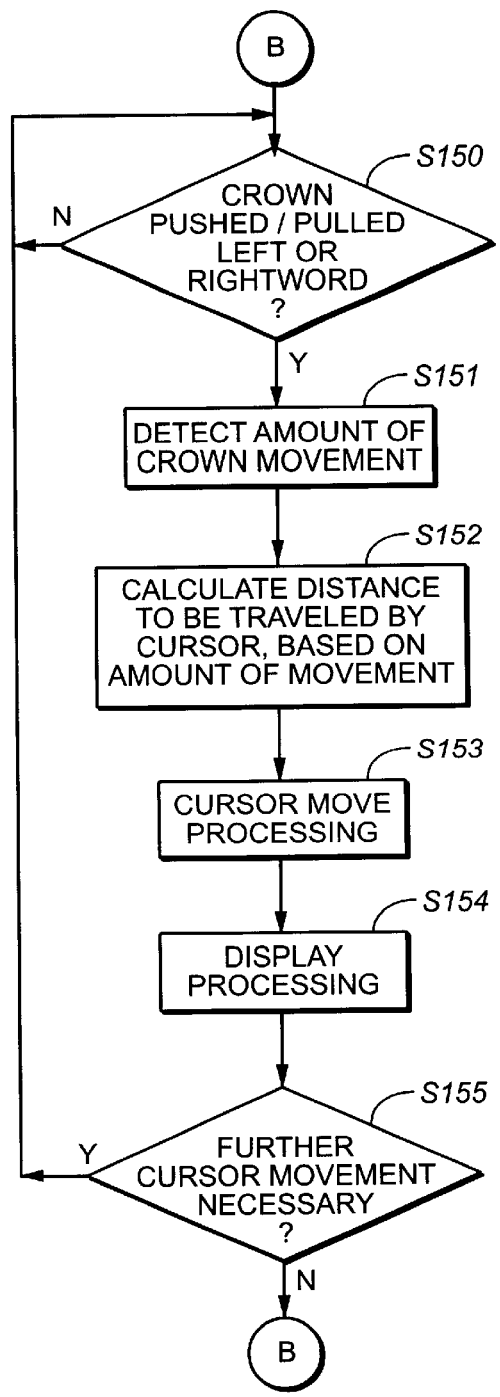
FIG._33C

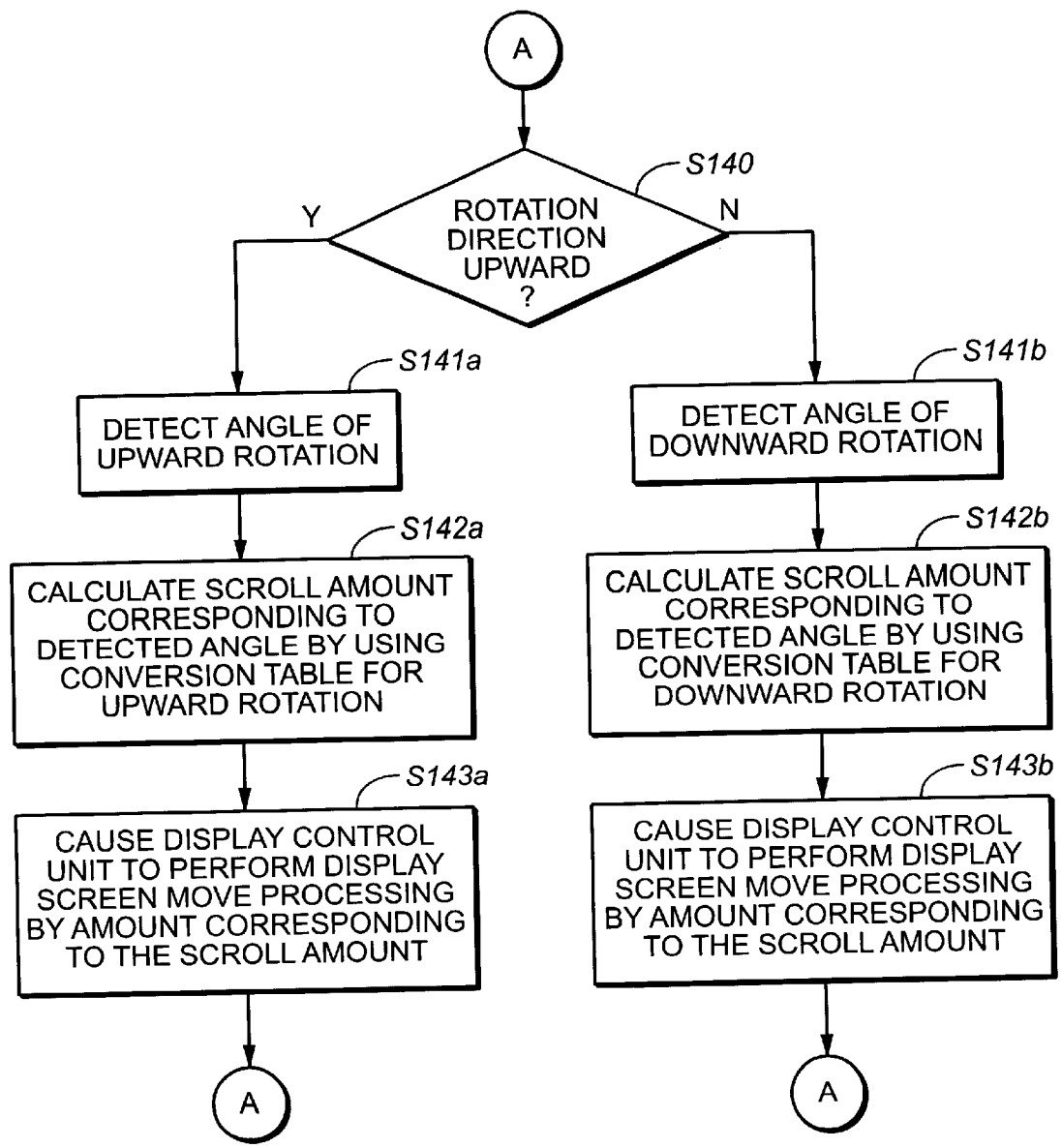
FIG._33B

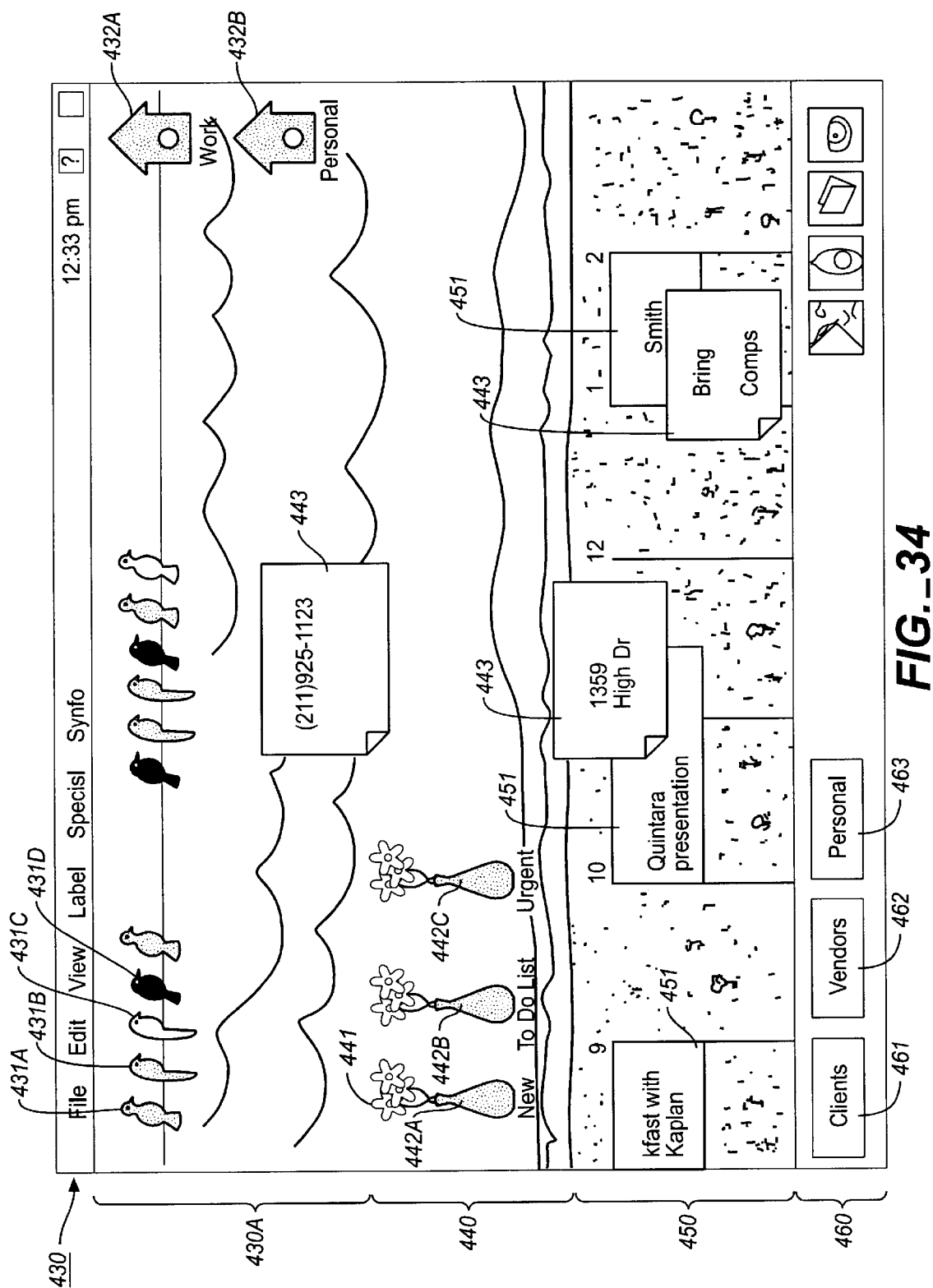
FIG._34

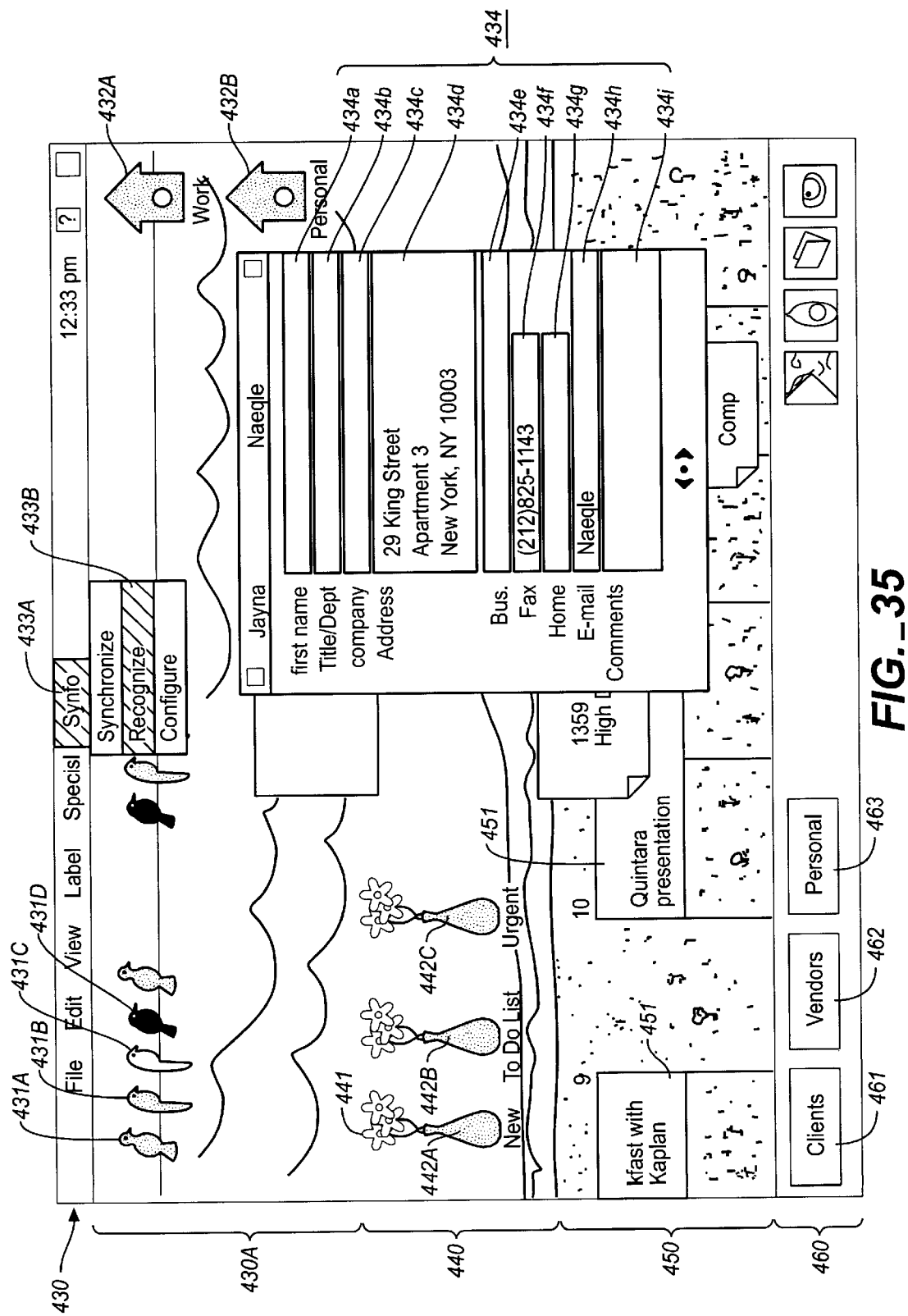
FIG._35

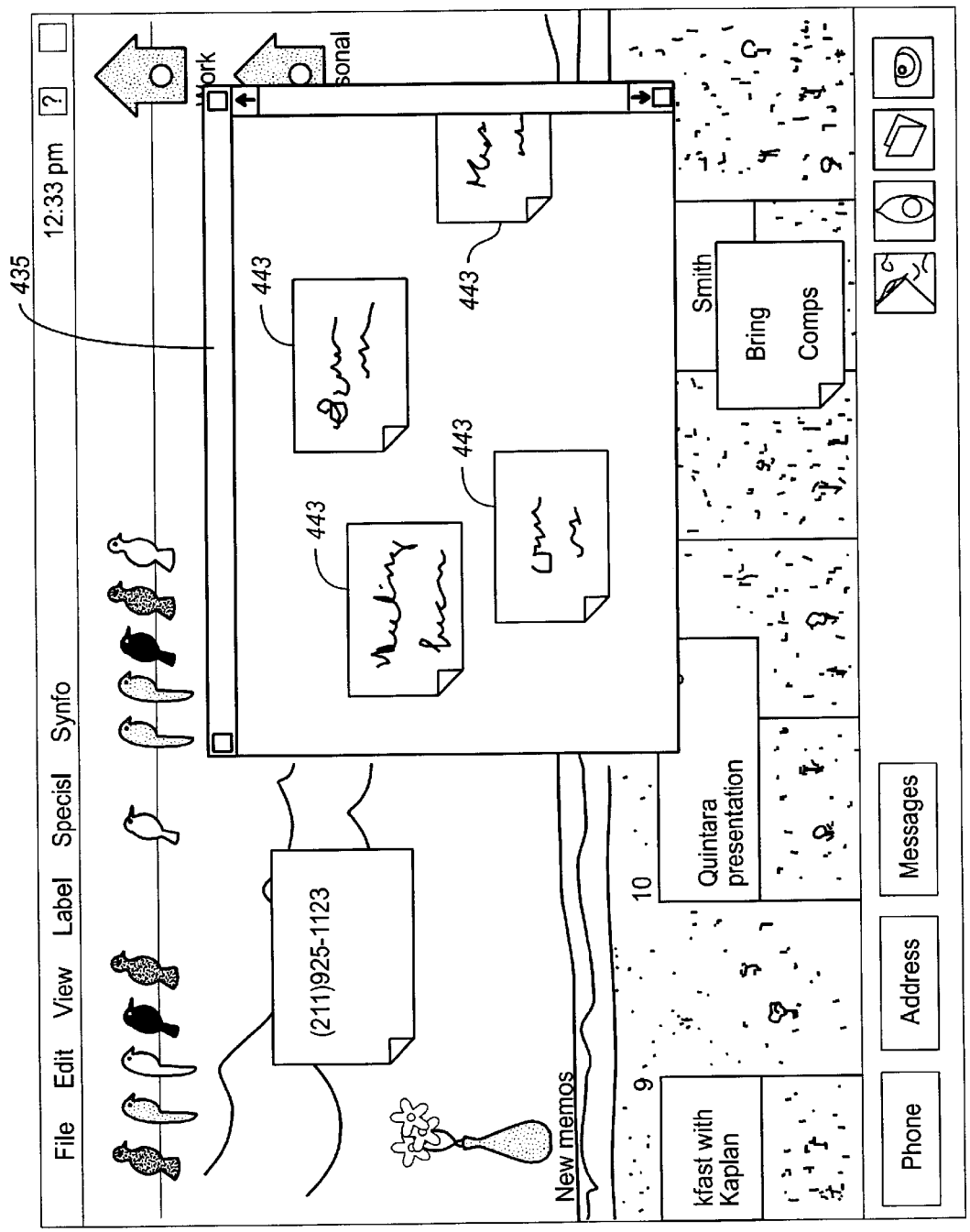
FIG._36

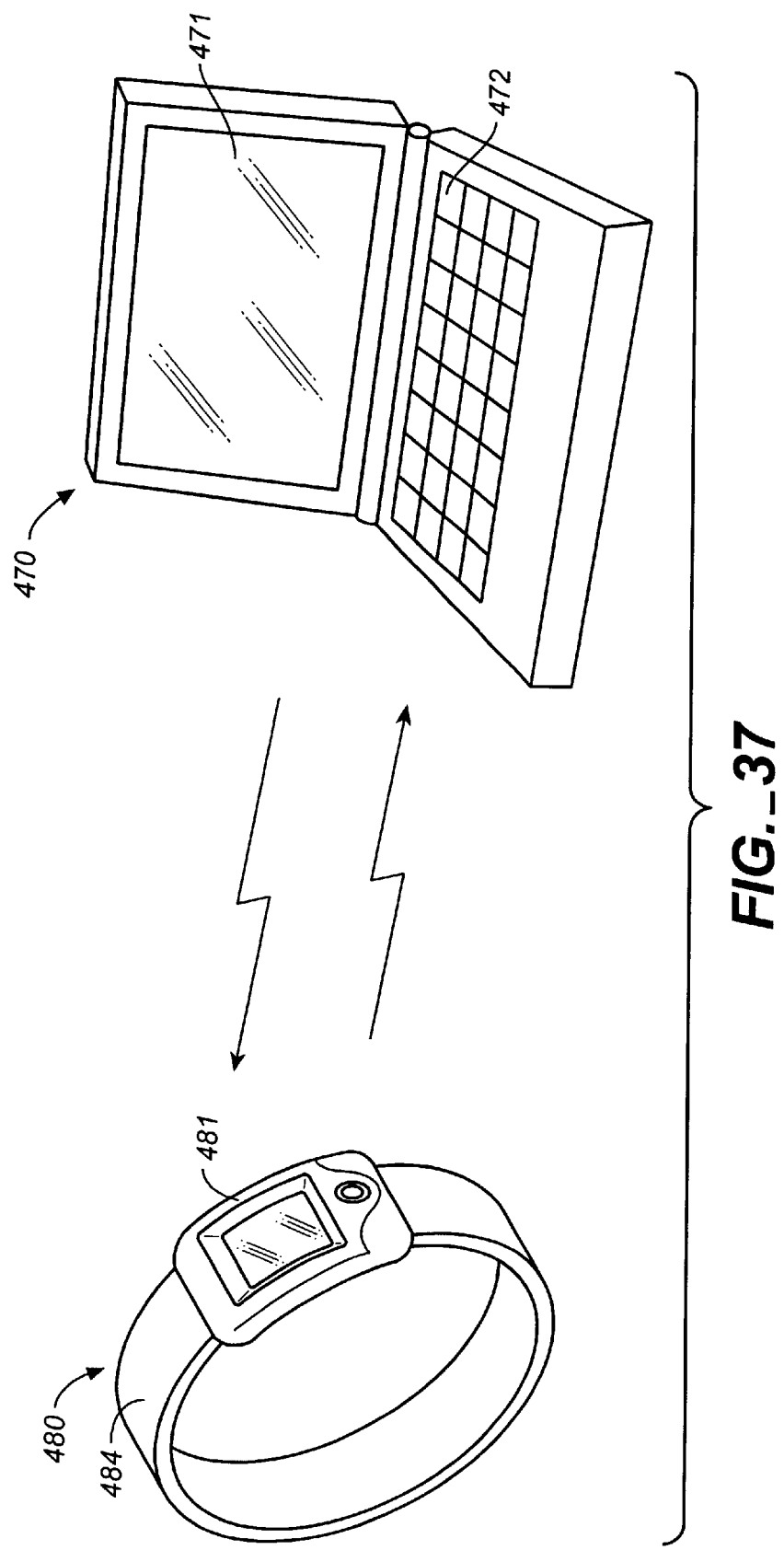
FIG._37

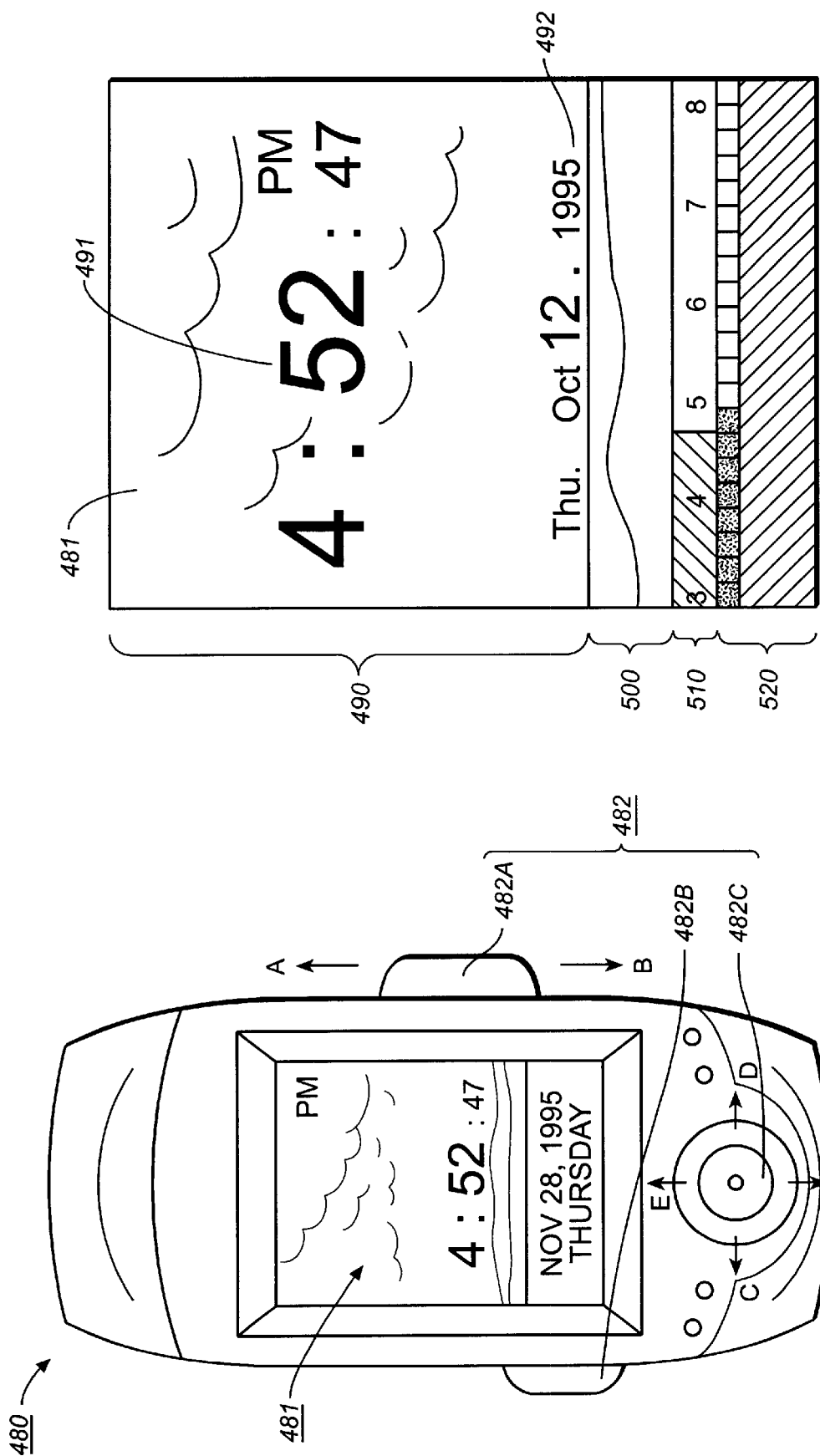

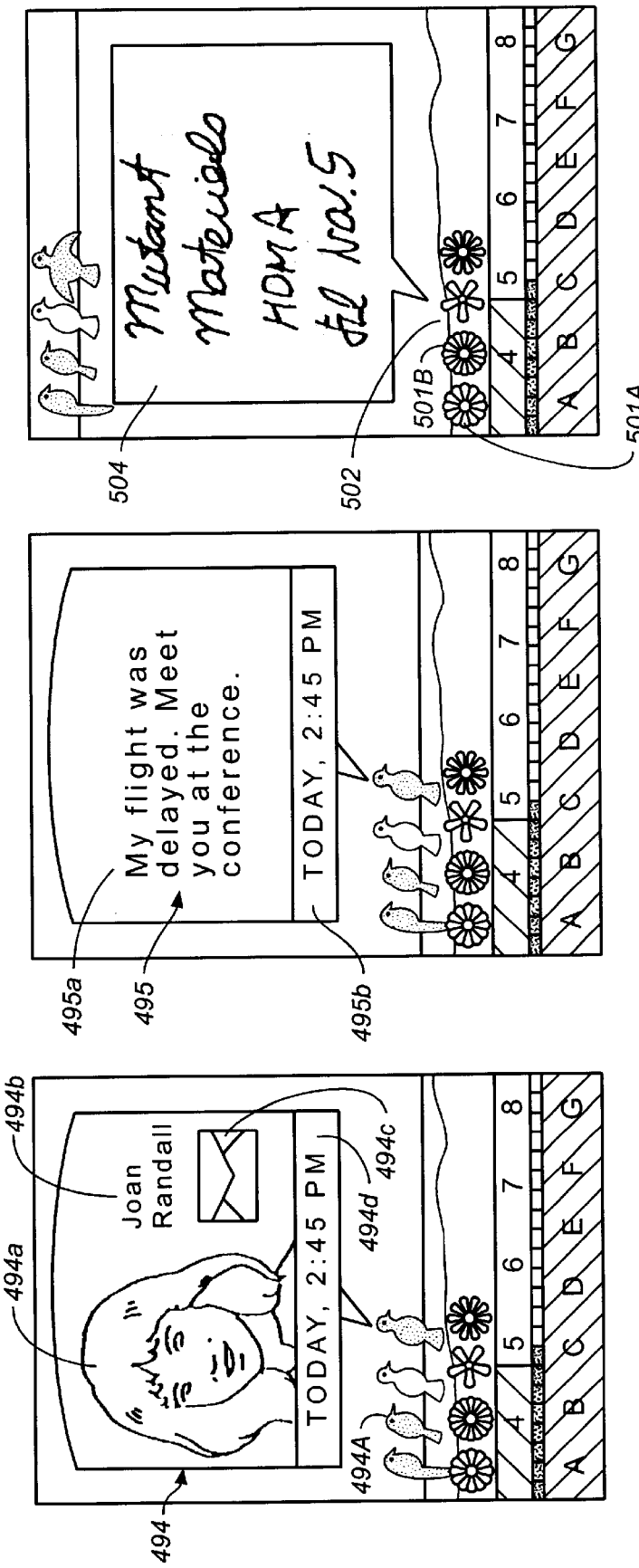

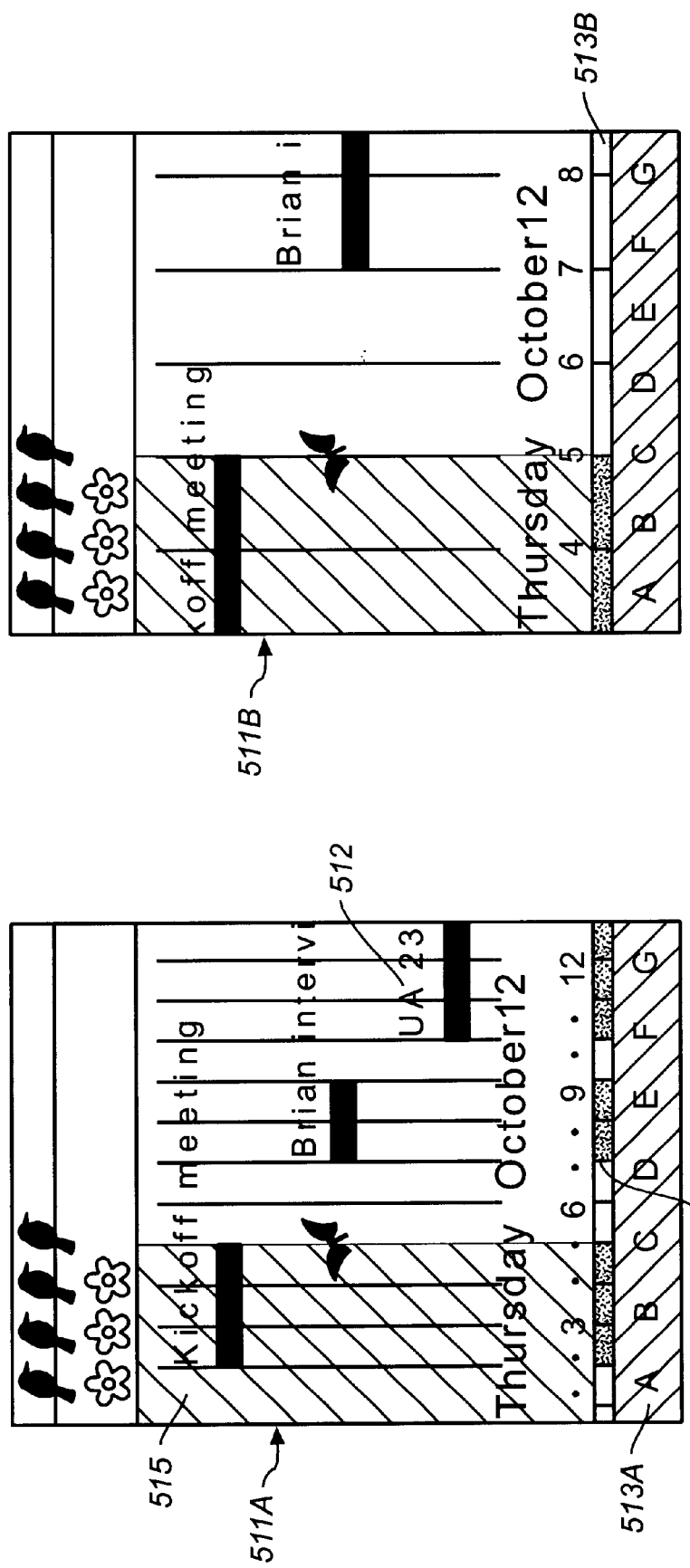

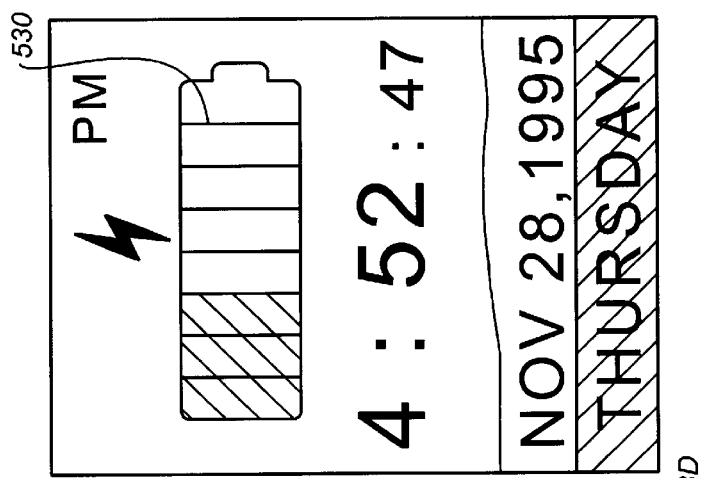
FIG._41E
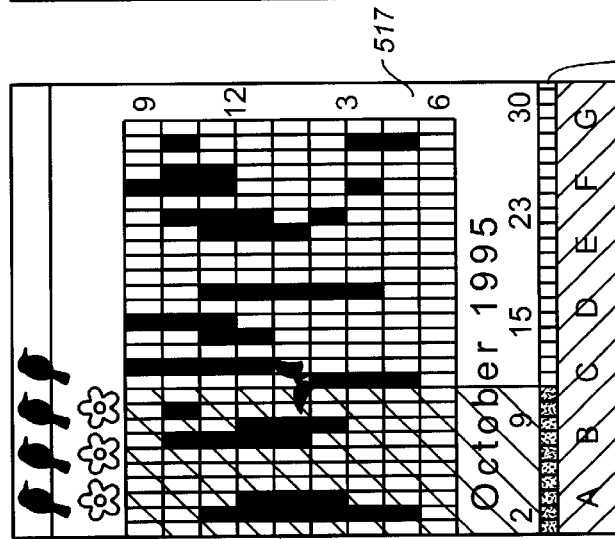
FIG._41D
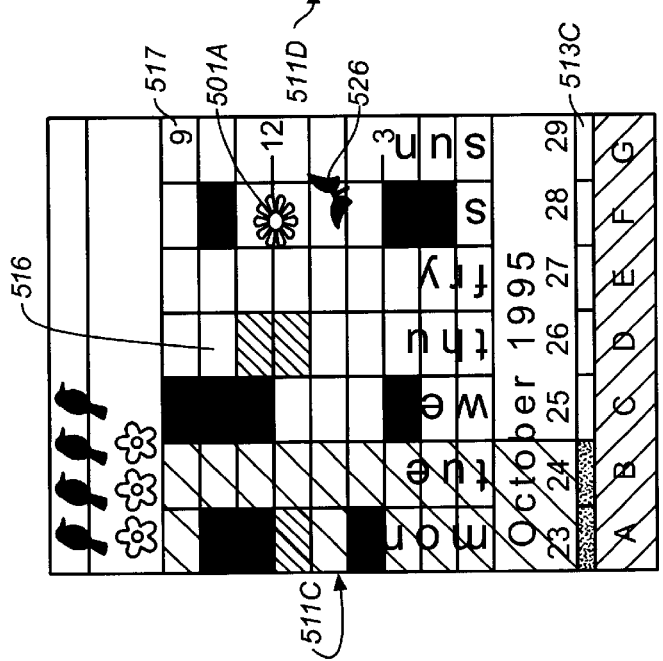
FIG._41C

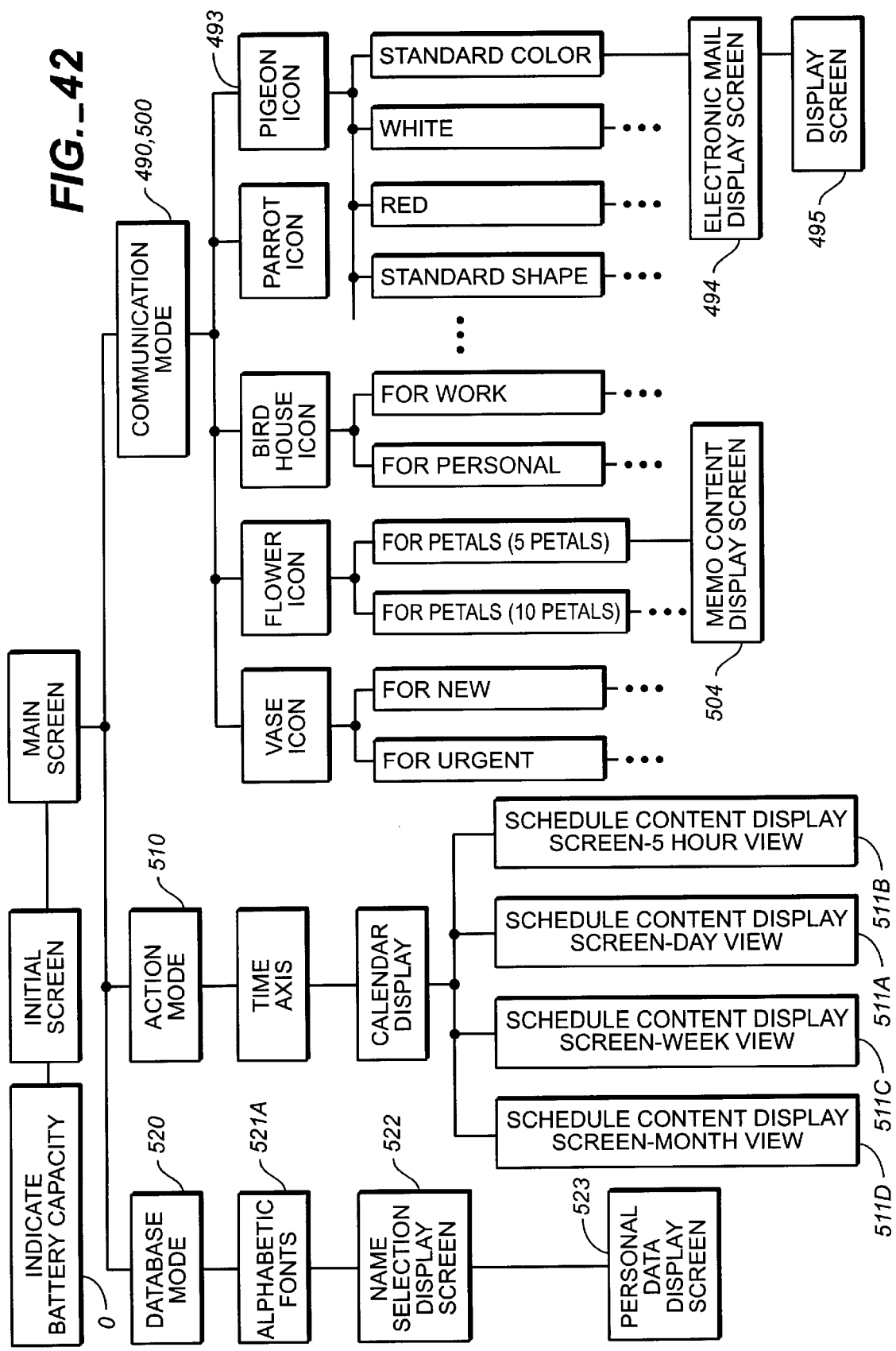
FIG._42

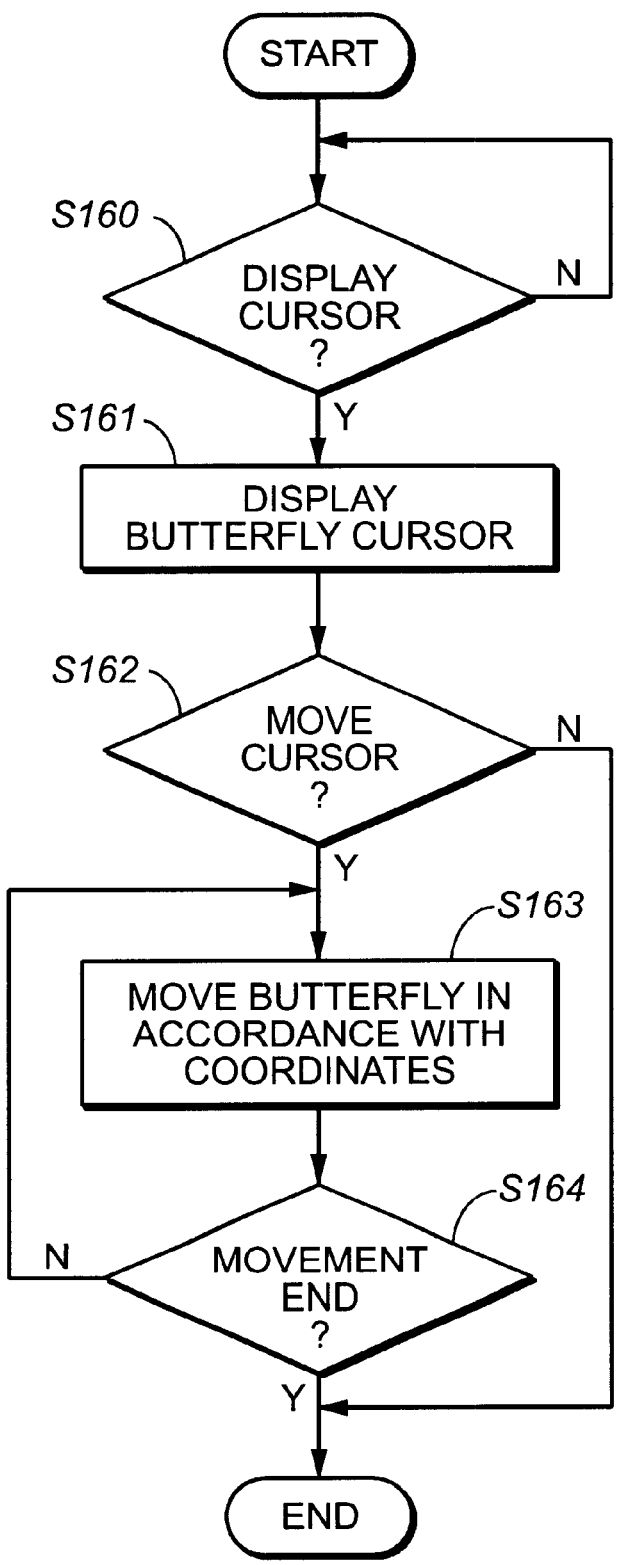
FIG._43

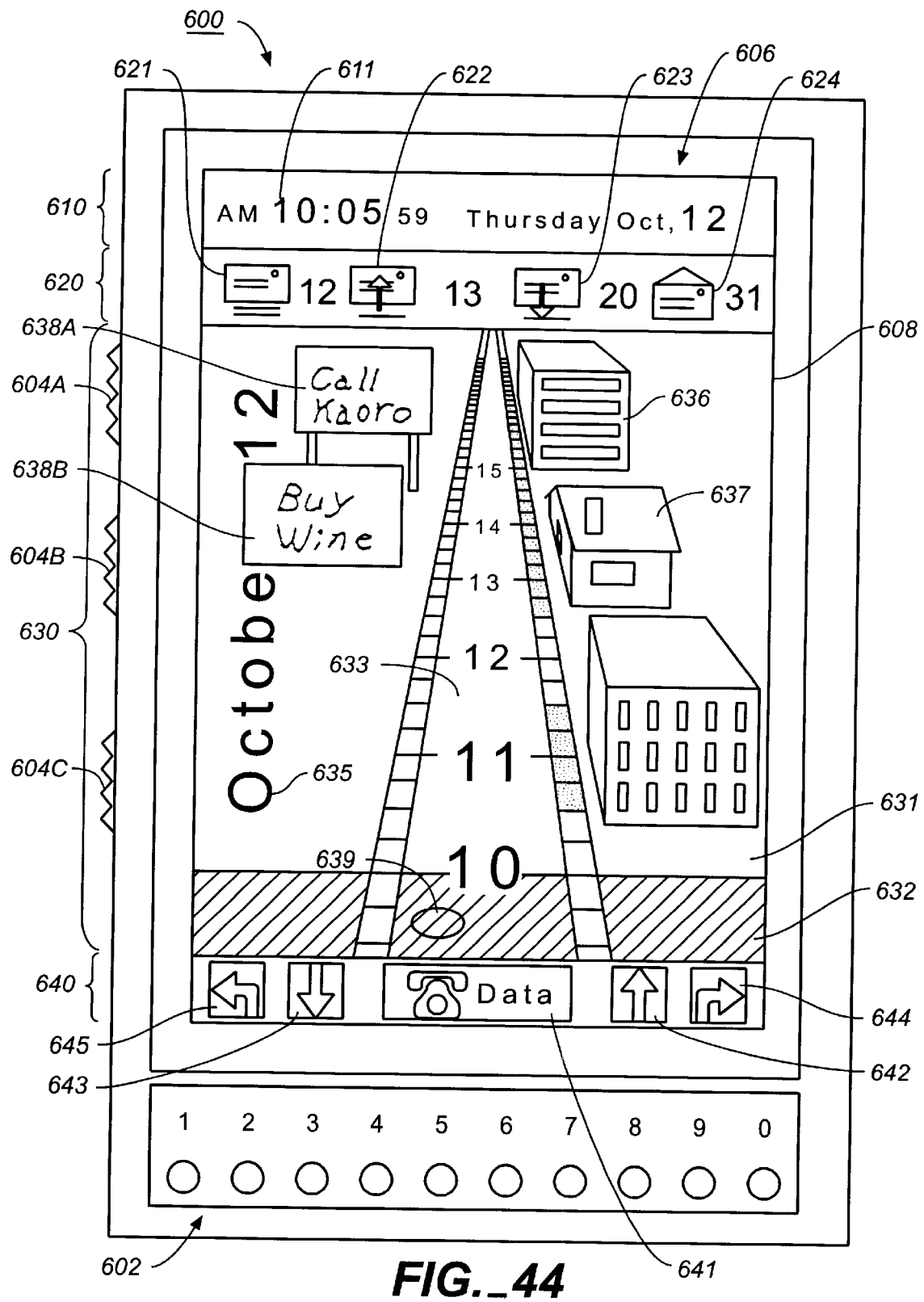
FIG._44

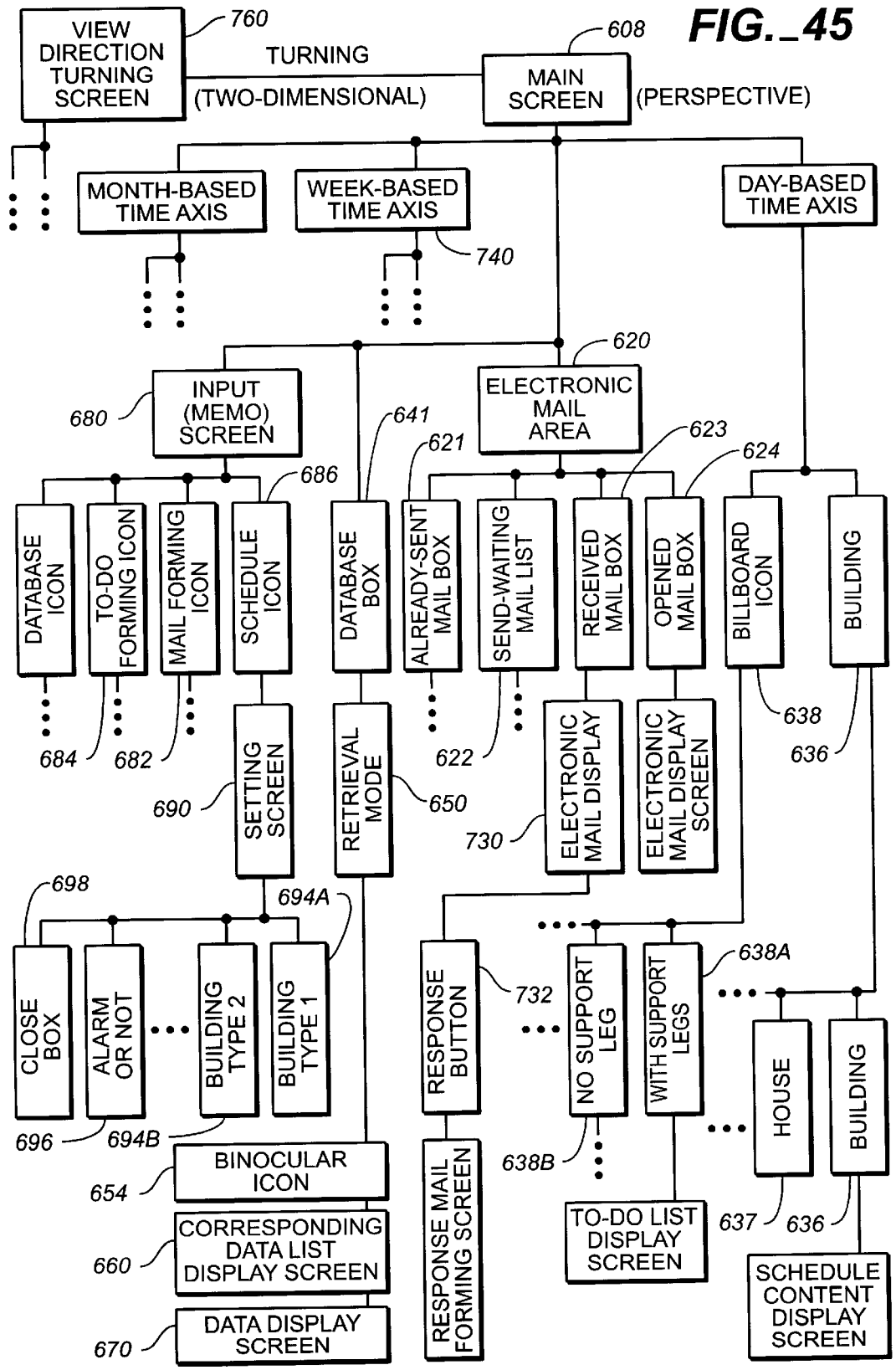
FIG._45

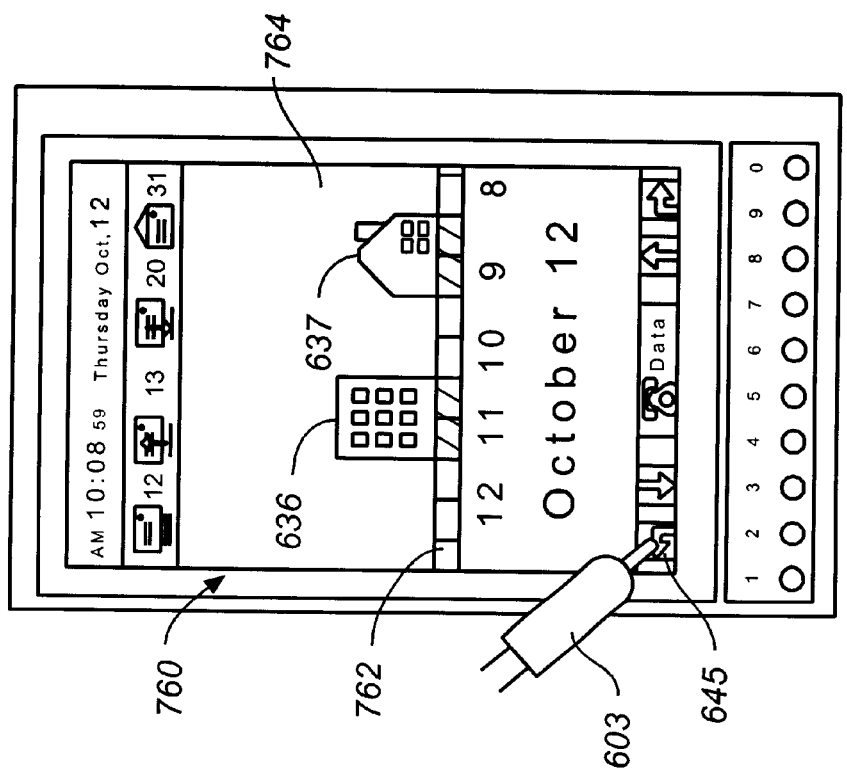
*FIG._46B*
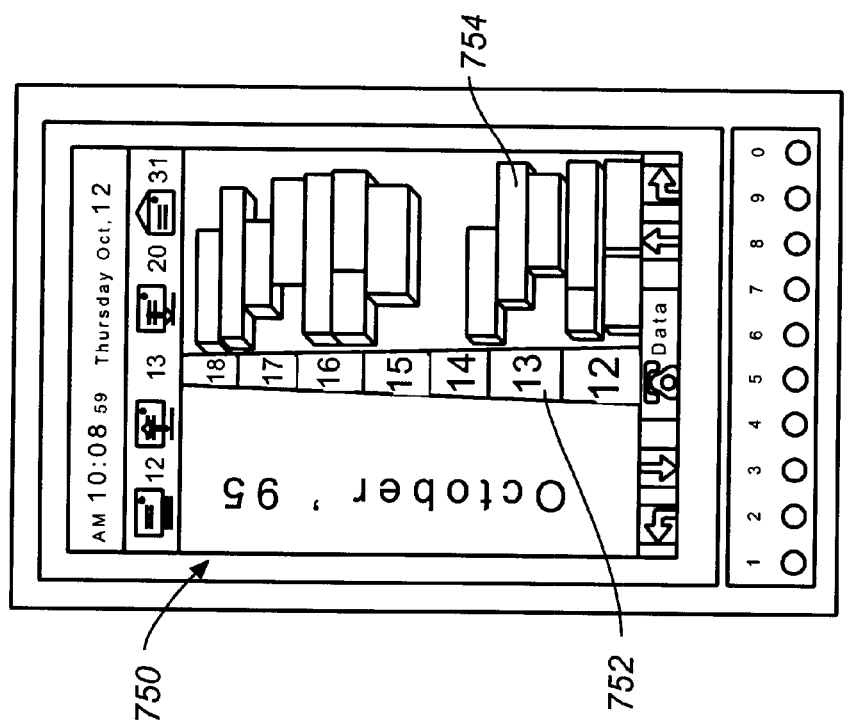
*FIG._46A*

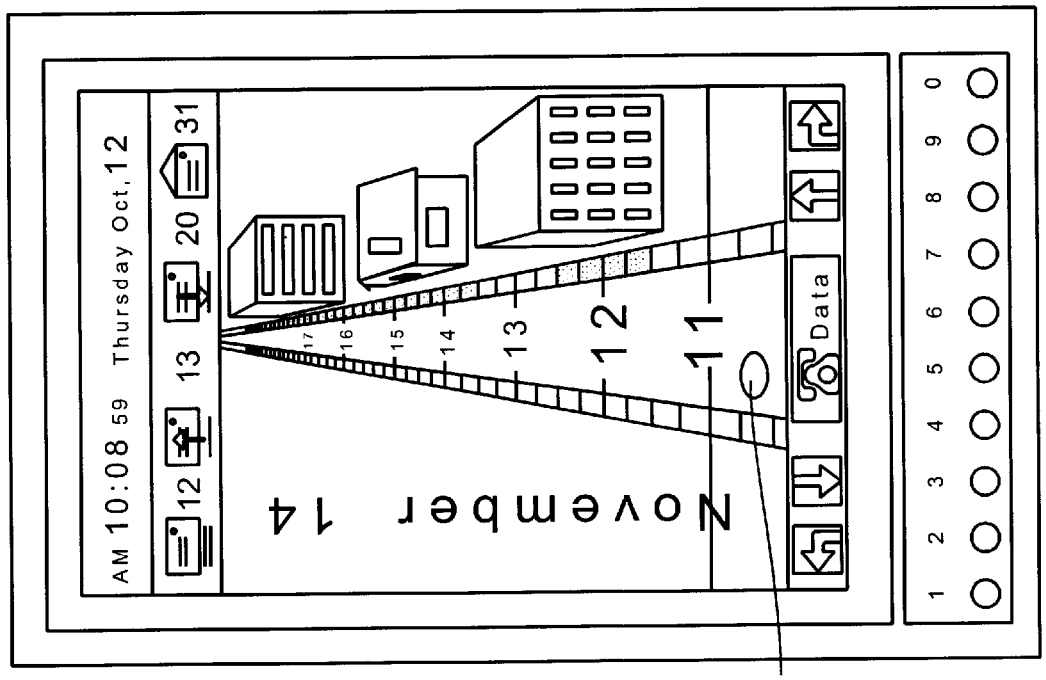
FIG._47B
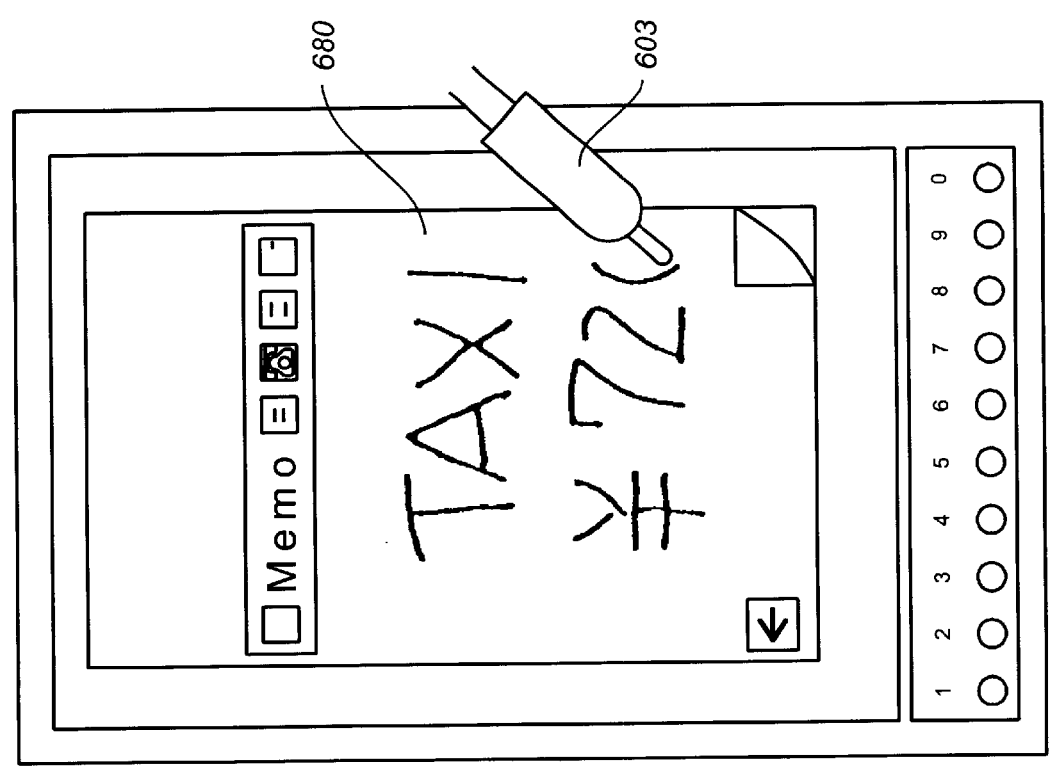
FIG._47A

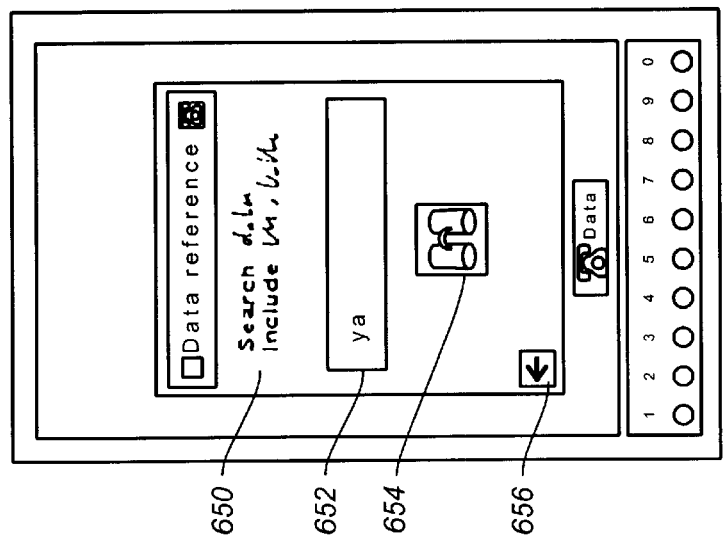
*FIG._48C*
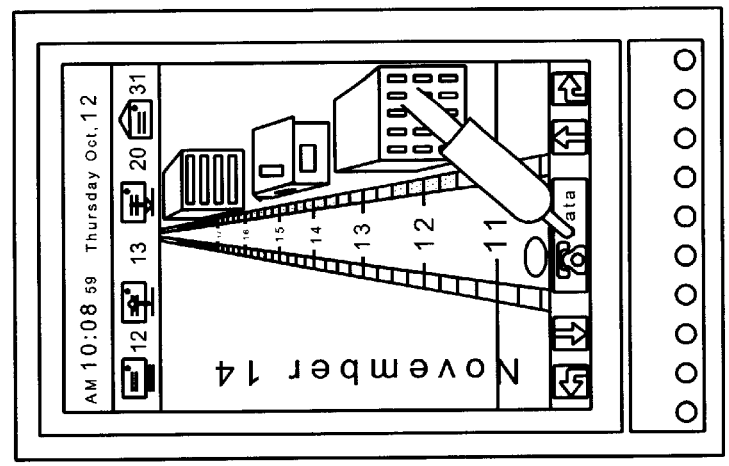
*FIG._48B*
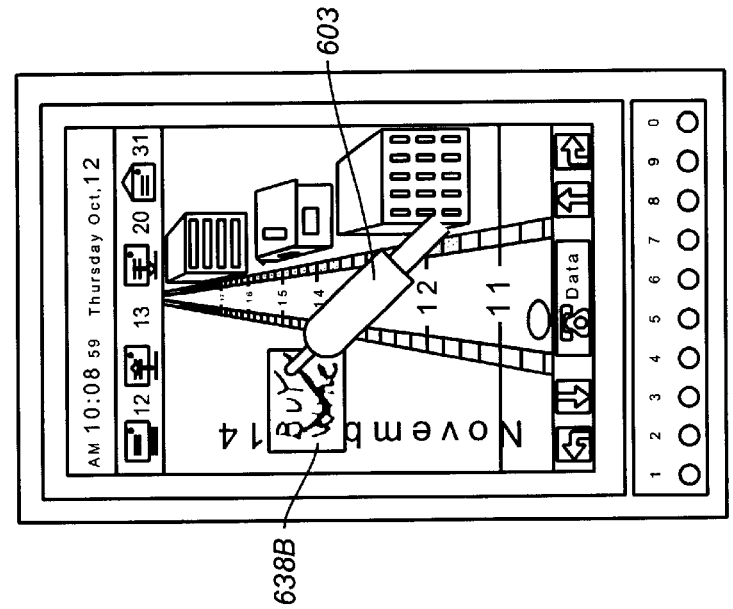
*FIG._48A*

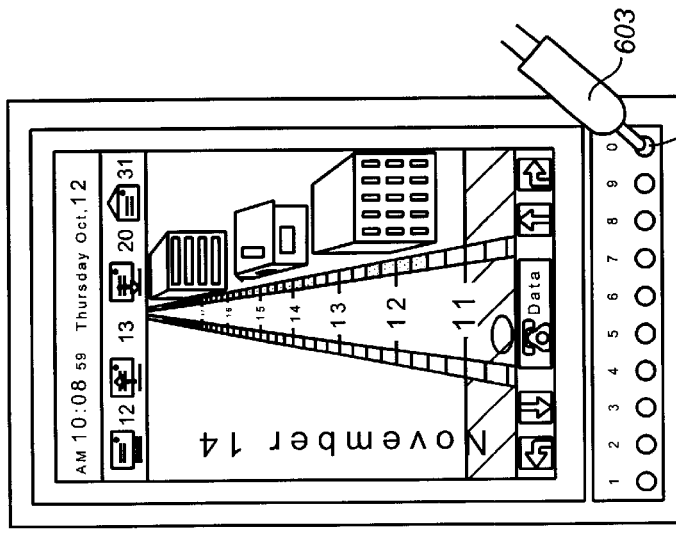
FIG._48F
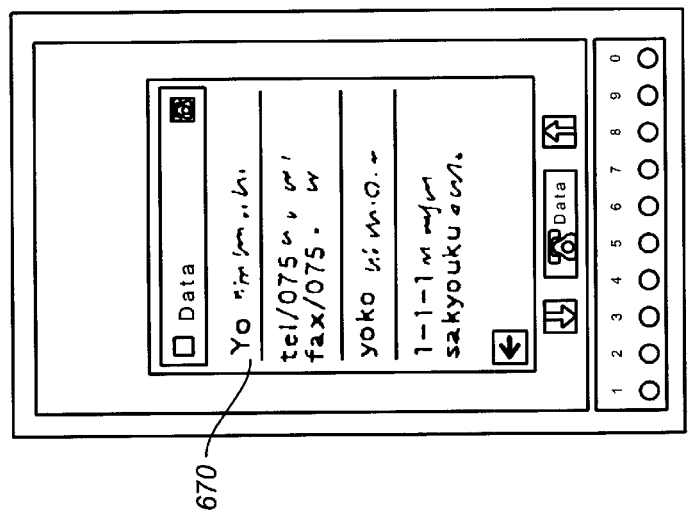
FIG._48E
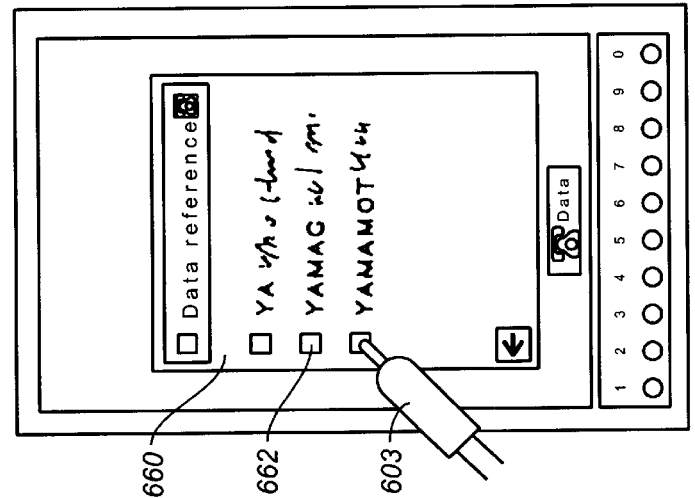
FIG._48D

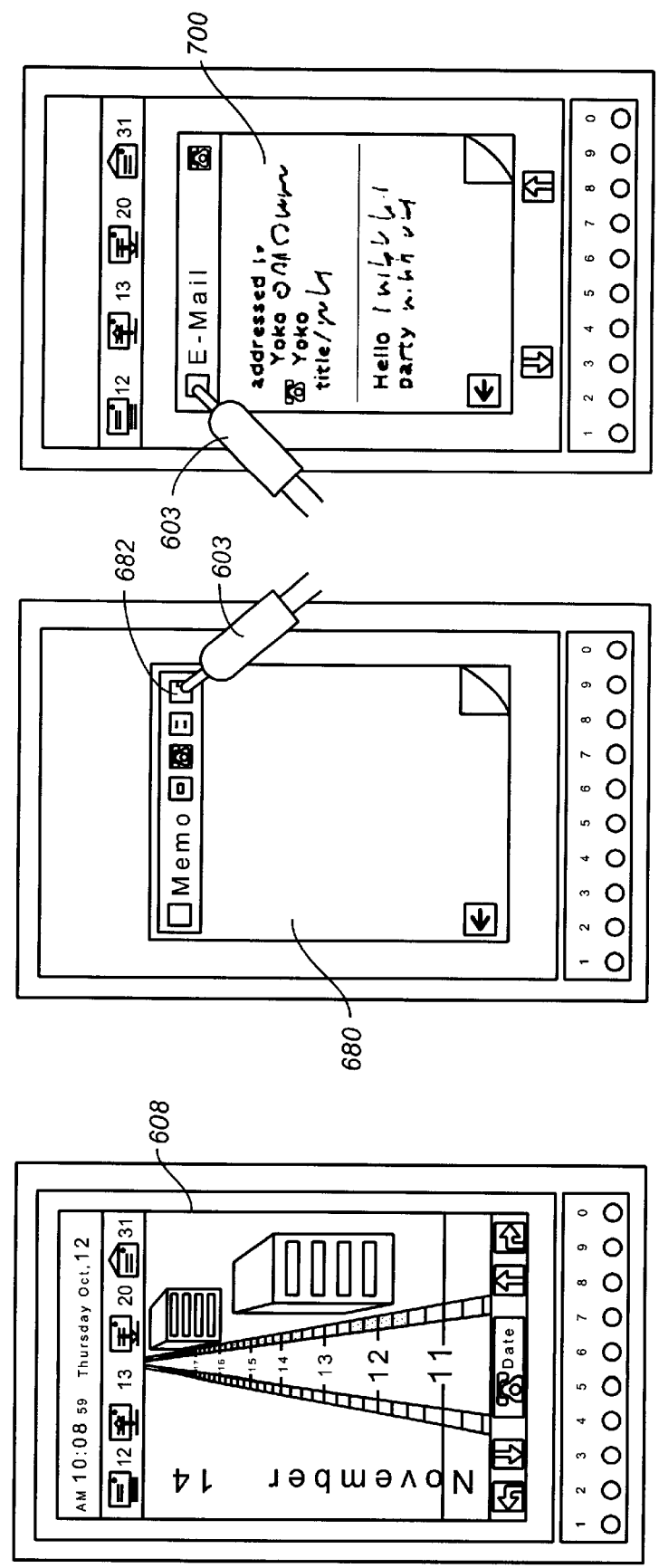

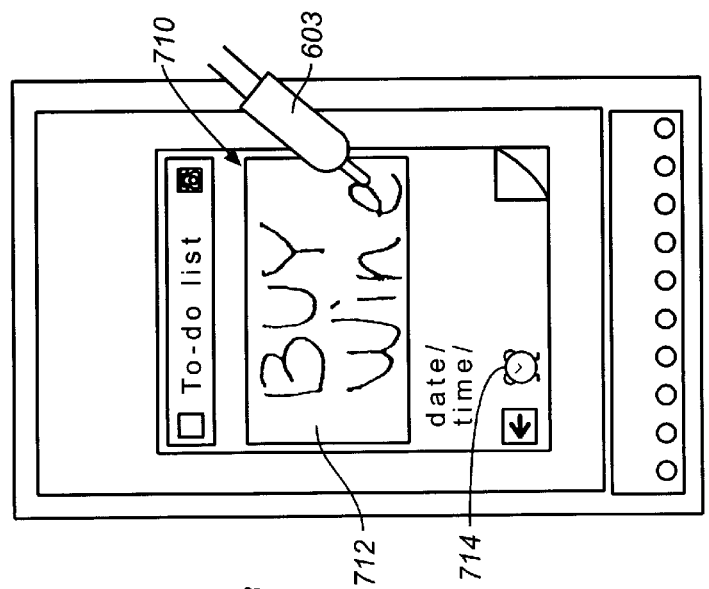
FIG._49F
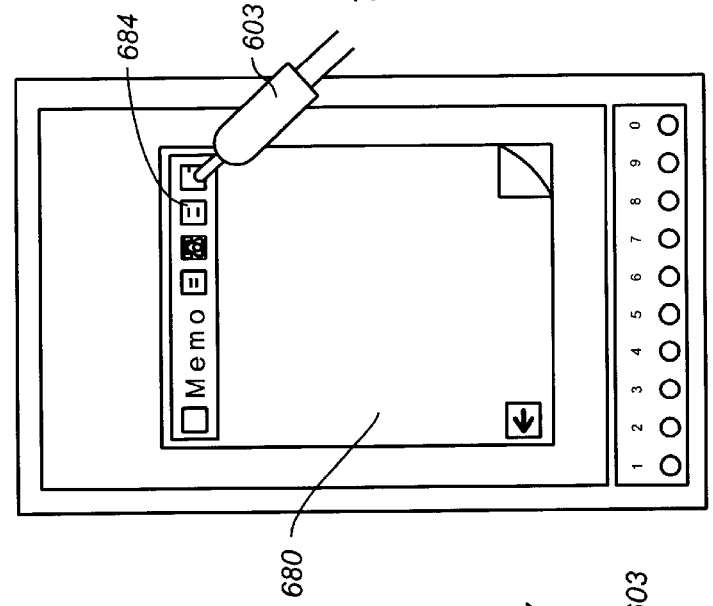
FIG._49E
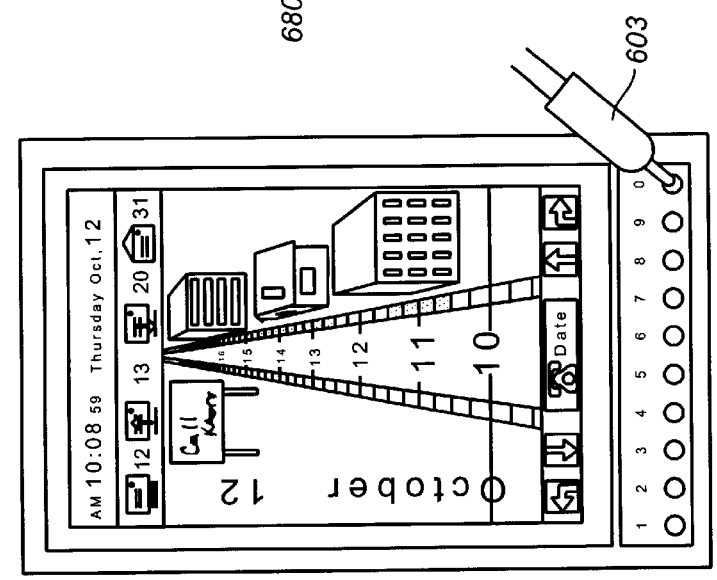
FIG._49D

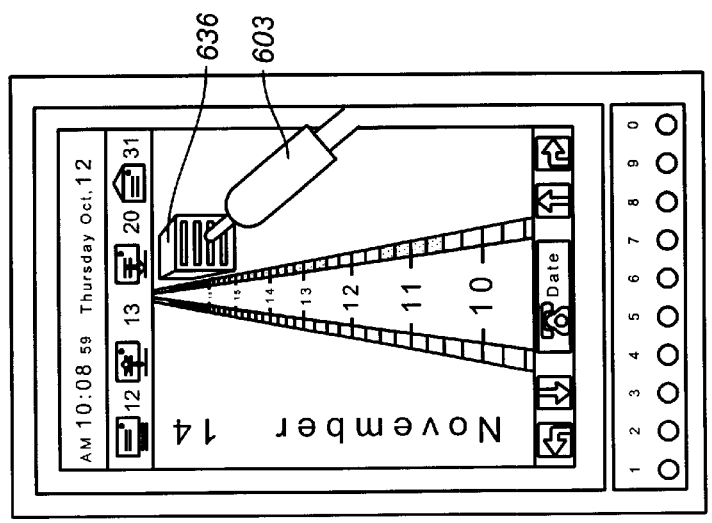
FIG._50C
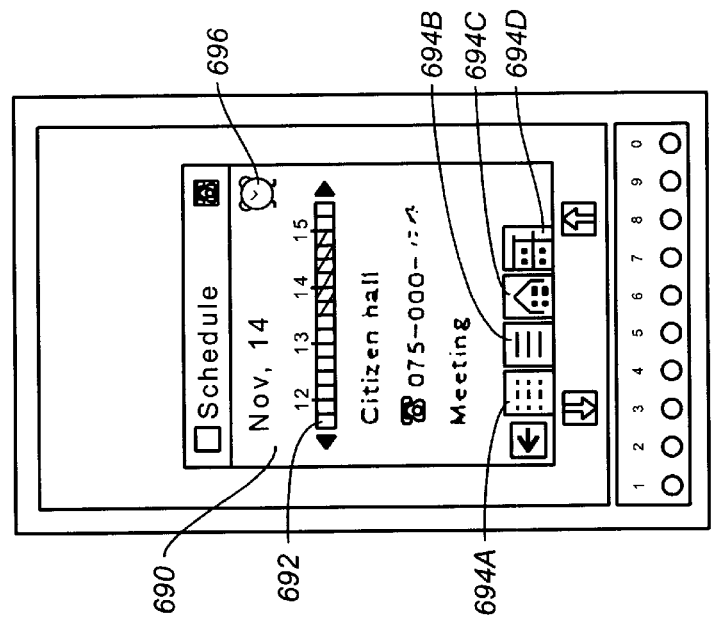
FIG._50B
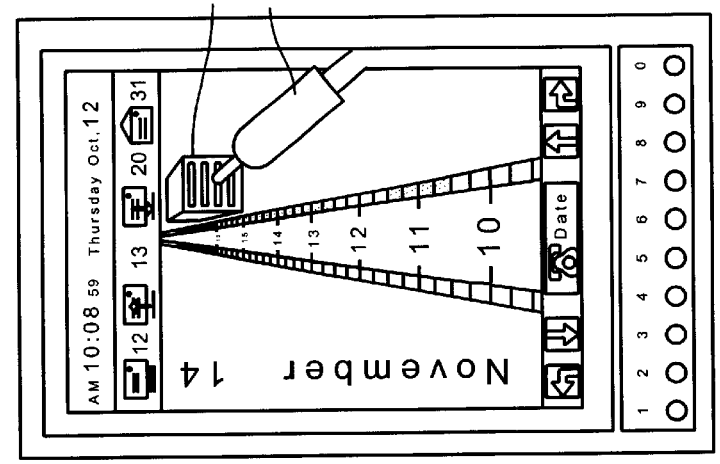
FIG._50A

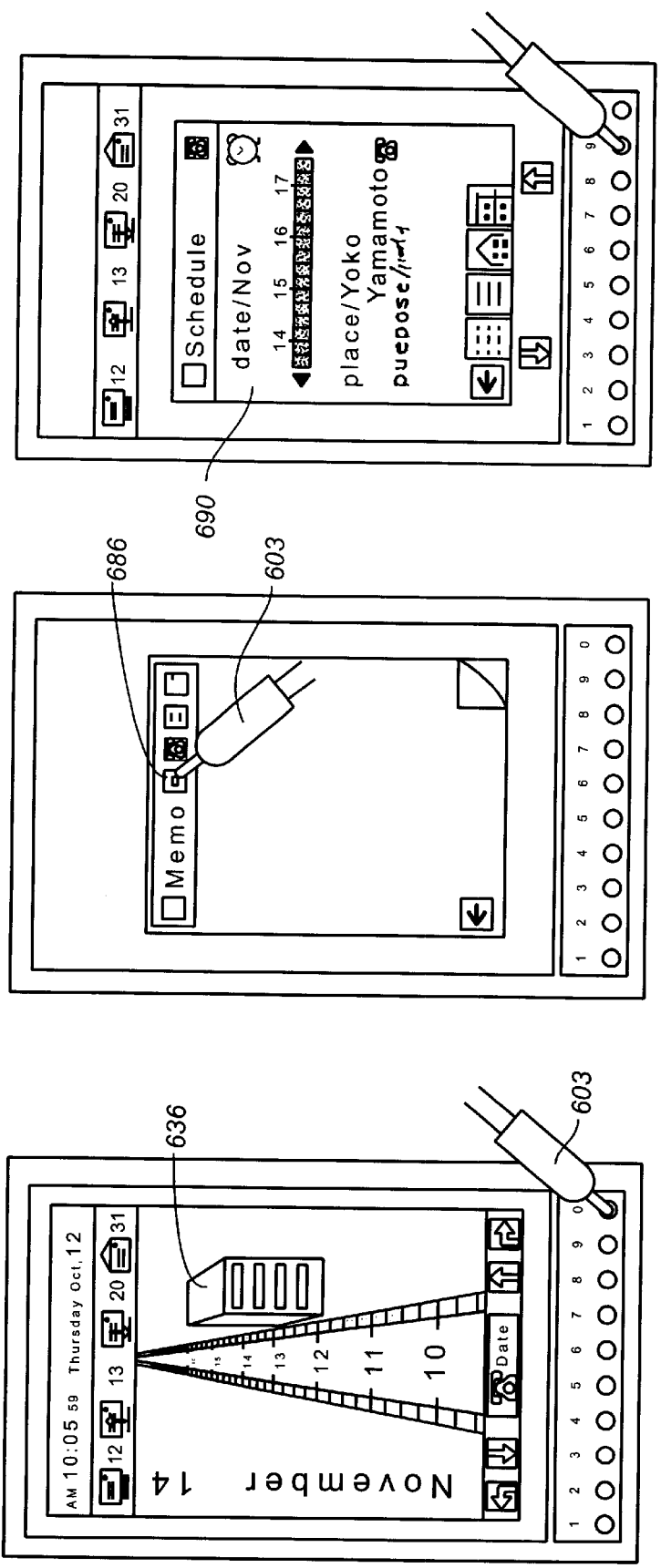

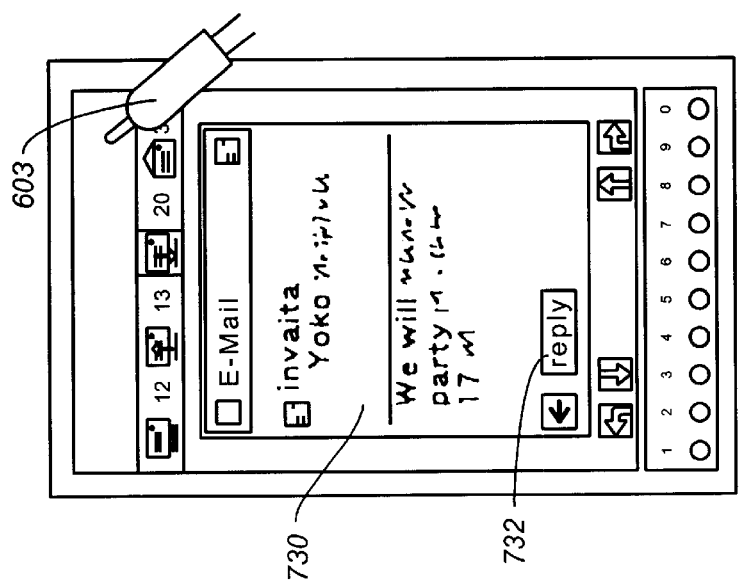
*FIG._51C*
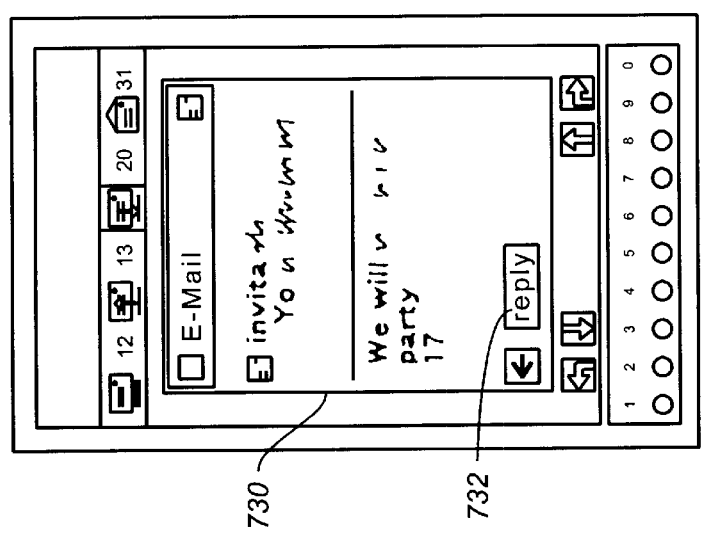
*FIG._51B*
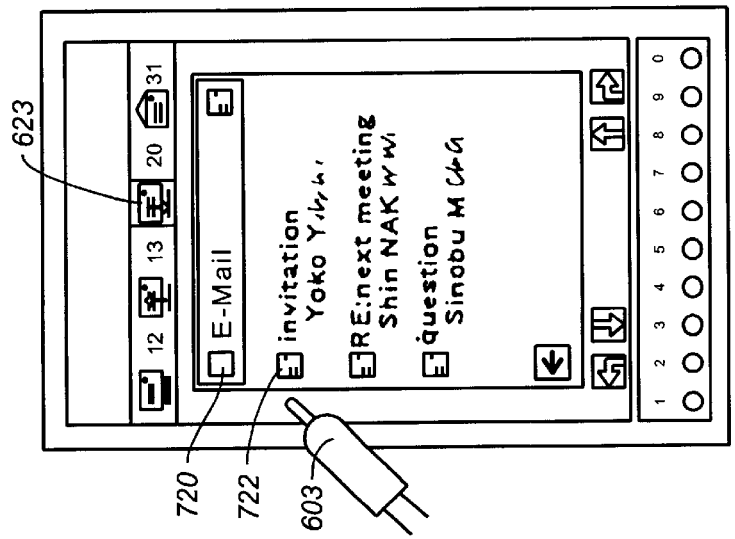
*FIG._51A*

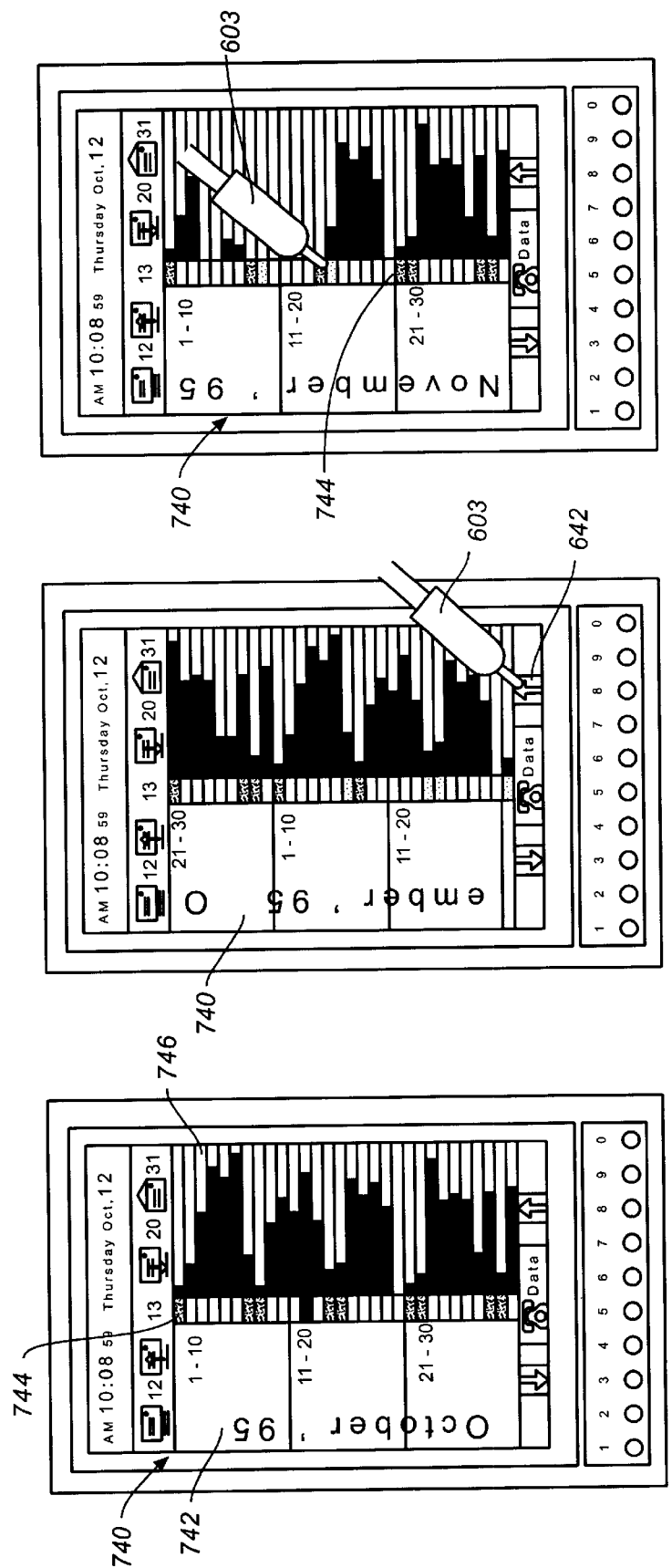

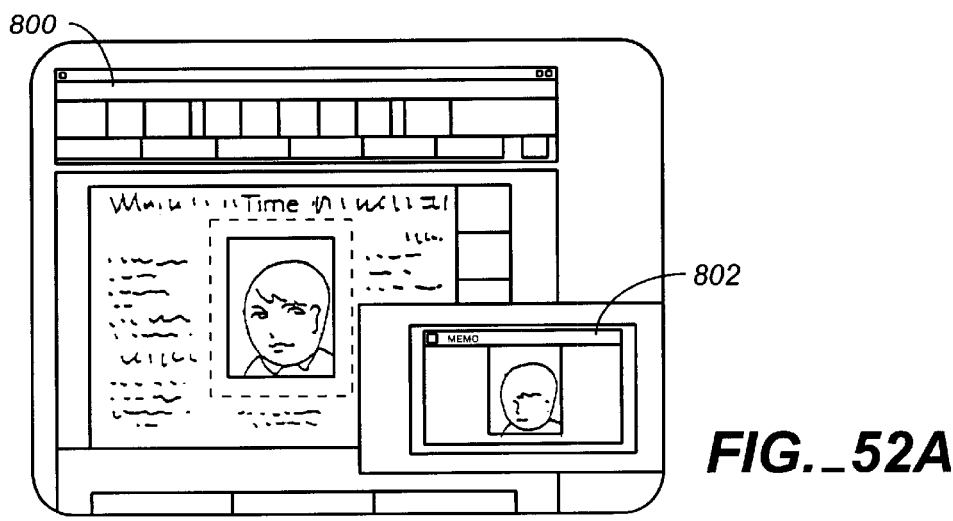
FIG._52A
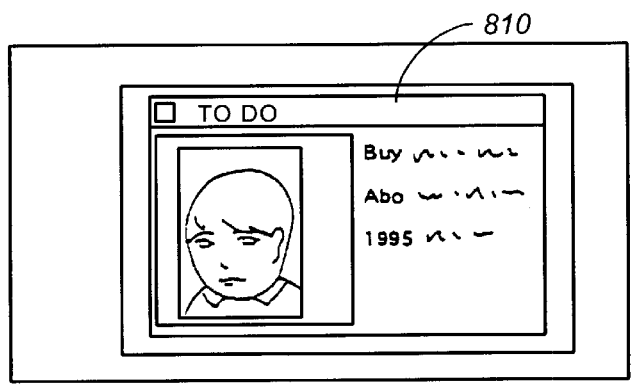
FIG._52B
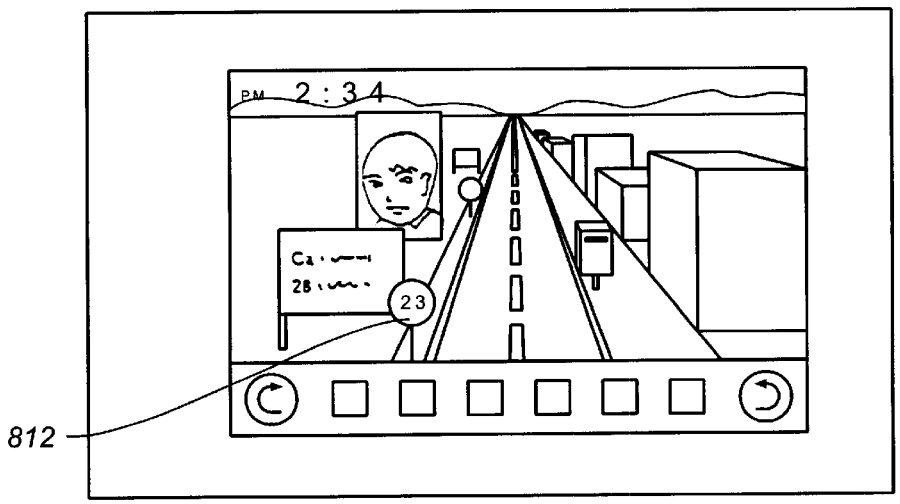
FIG._52C

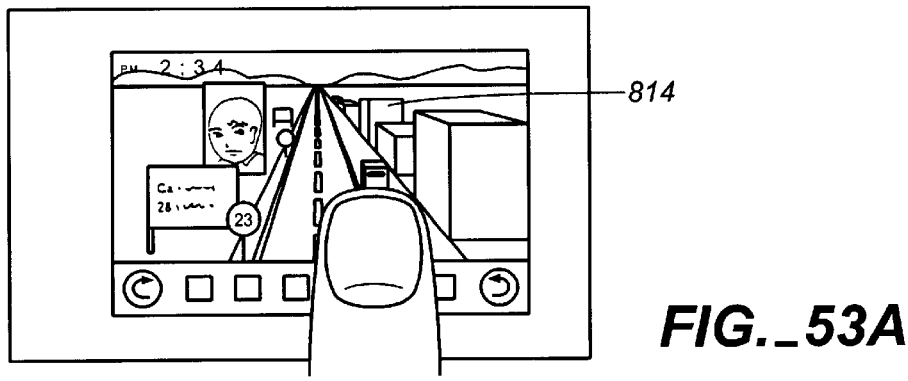
FIG._53A
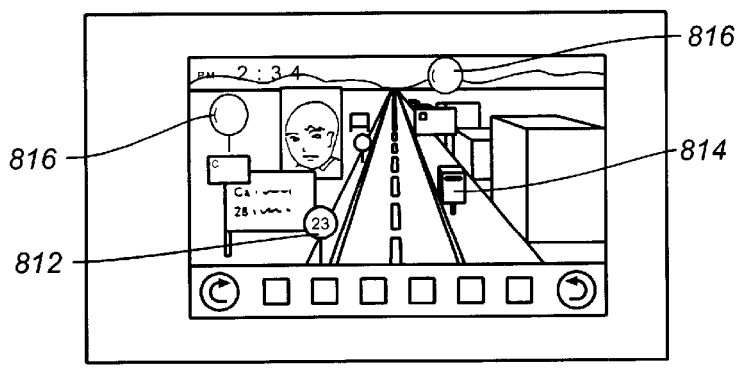
FIG._53B
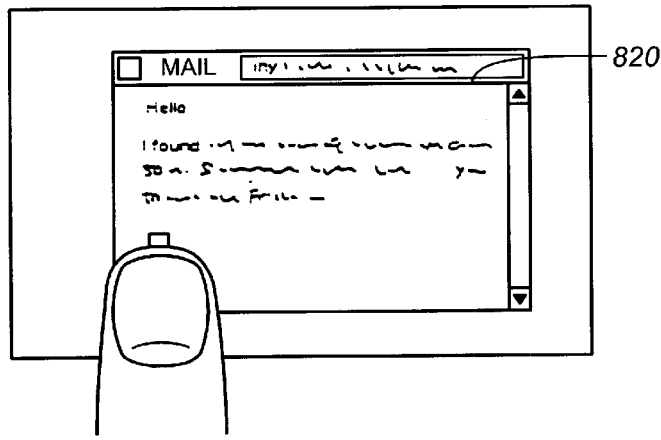
FIG._53C
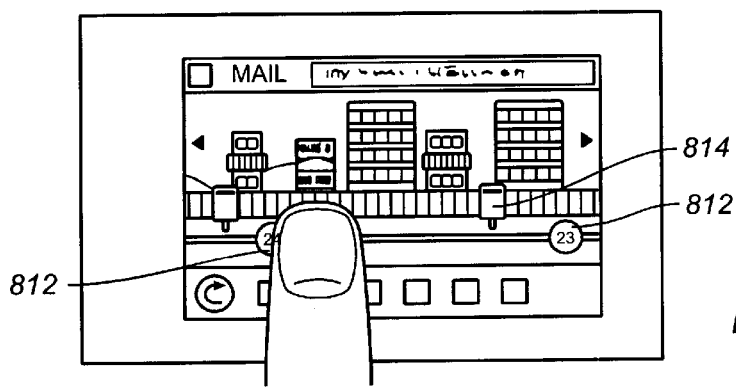
FIG._53D

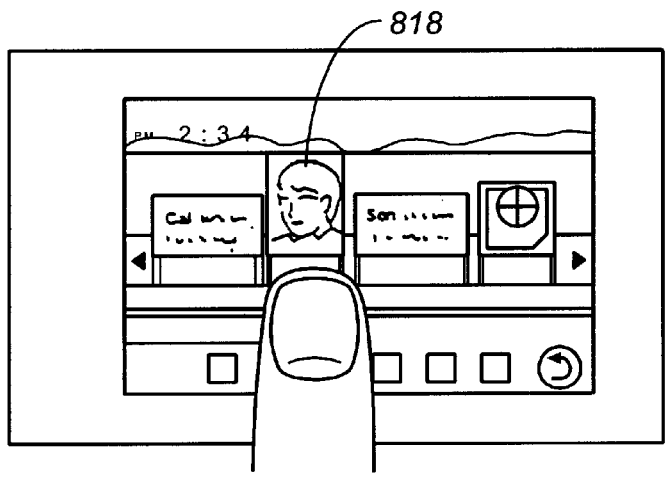
FIG._54A
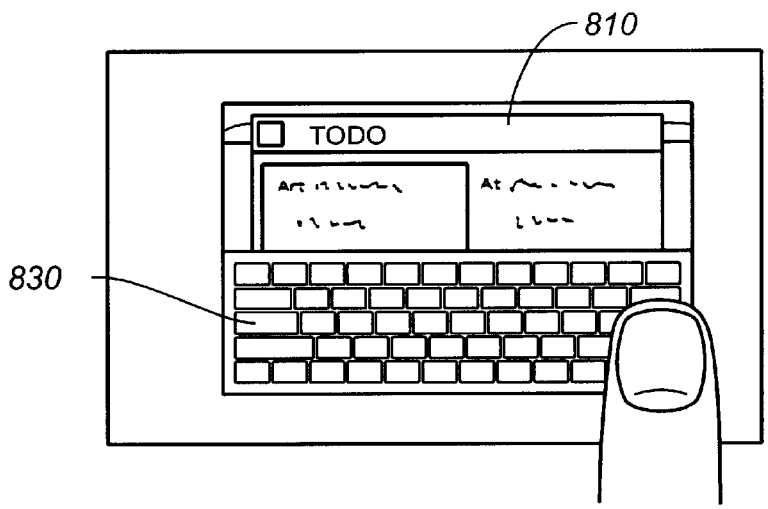
FIG._54B
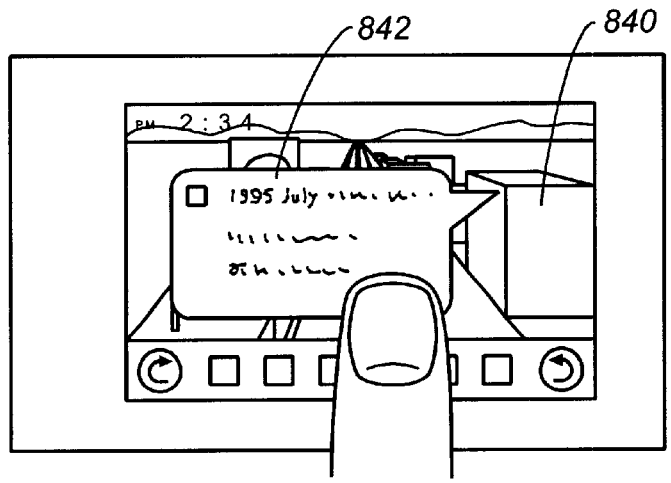
FIG._54C

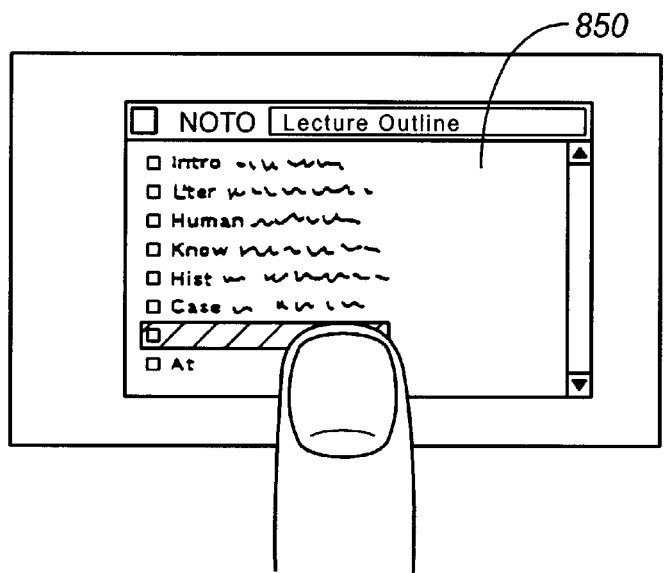
FIG._55A
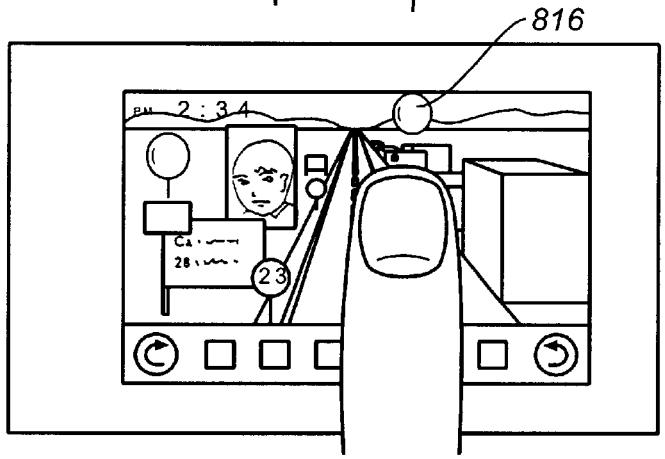
FIG._55B
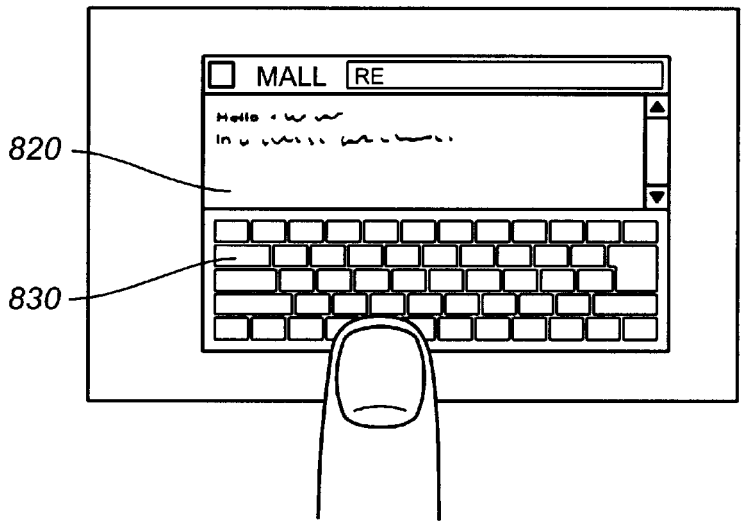
FIG._55C

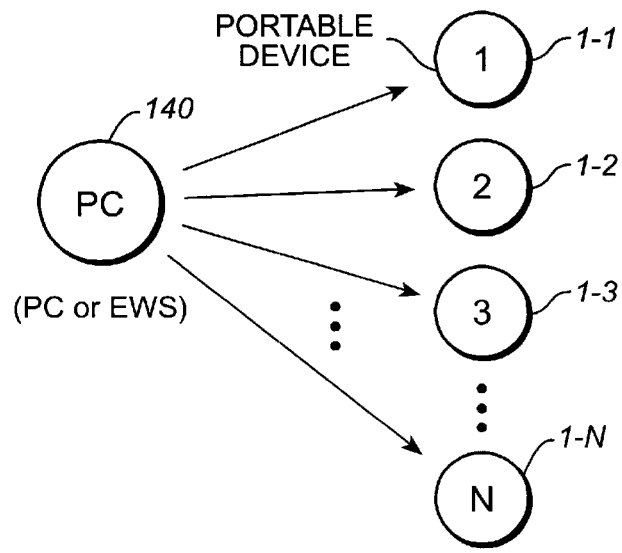
FIG._56A
CASE 1
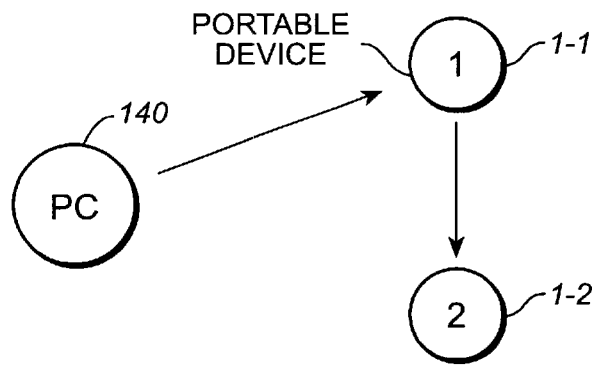
FIG._56B
CASE 2
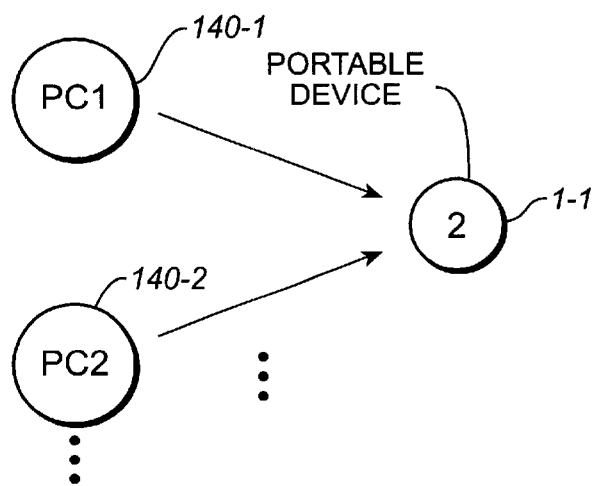
FIG._56C
CASE 3

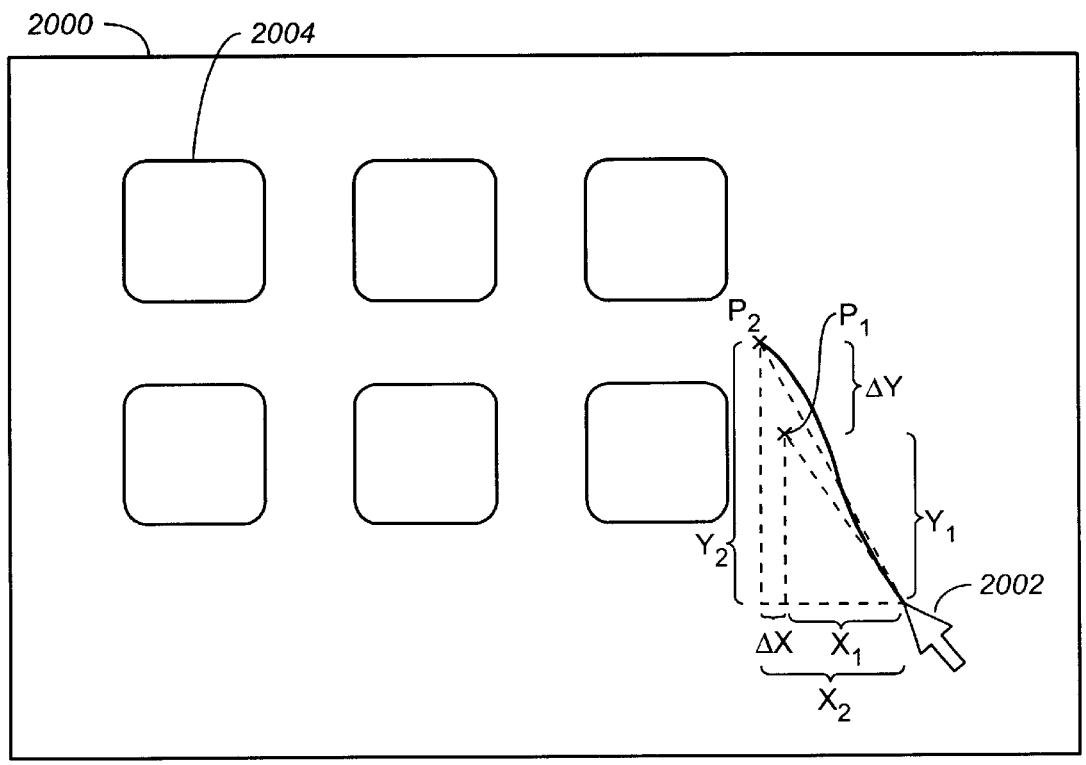
FIG._57
*(PRIOR ART)*
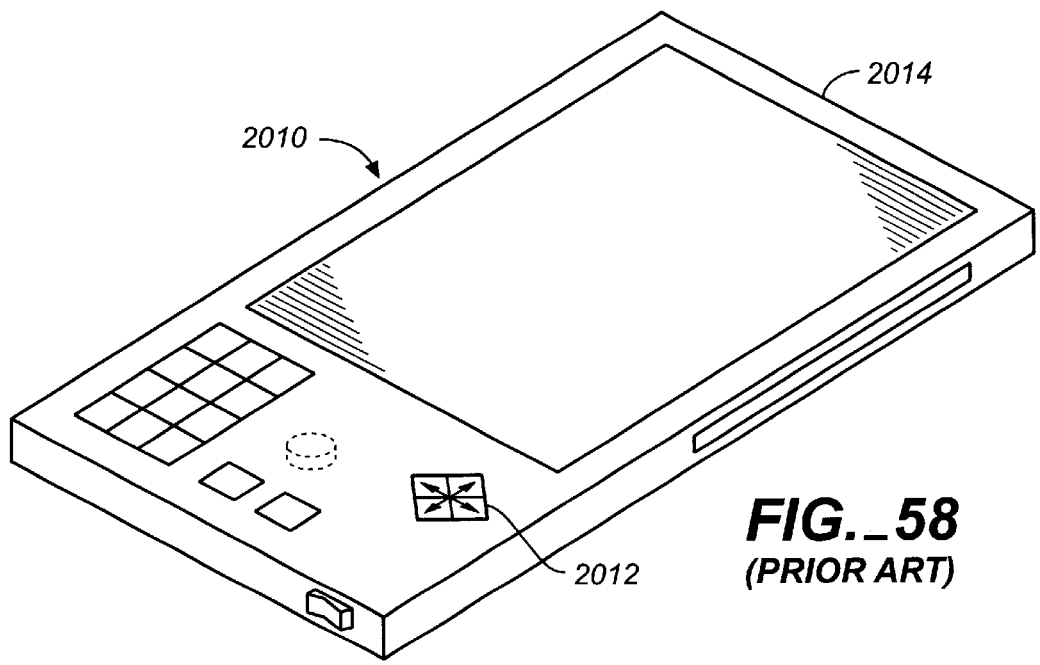
FIG._58
*(PRIOR ART)*

DISPLAY APPARATUS AND PORTABLE INFORMATION PROCESSING APPARATUS

BACKGROUND OF THE INVENTION

1. Field of the Invention

The present invention relates to a display apparatus and a portable information processing apparatus incorporating the display apparatus.

2. Description of the Related Art

A standard window system which is one of a screen display system for computers employs a coordinate input device such as a pointing device, e.g., a mouse or a track ball, for the purpose of commanding the position and movement of a cursor on a display screen. A program which has been related to an icon displayed at a predetermined coordinate position is started when the user operates a selecting button such as a clock button of, for example, a mouse, after placing the cursor on the icon. The user also can designate a predetermined region or area on the display screen by moving the cursor while continuing pressing of the selecting button.

This type of display system permits scrolling of the display screen by suitably operating the cursor.

The operations such as alteration of the display screen, movement of the cursor, scrolling of the display screen and so forth, however, are difficult to conduct in known wearable device such as wrist-watch-type devices having conventional arrangement of the operating means for inputting instructions for implementing these operations. Such difficulty arises from the posture of the wearable device when used and from the limited size of the operating means. Thus, the user tends to fail to smoothly effect operations such as pointing of a position, scrolling, etc., and to make wrong selection of the functions.

Pointers such as a mouse or a track point in one hand permits a cursor to move in any desired direction but on the other hand poses a problem in that the cursor becomes unstable, hampering smooth and accurate pointing of a position.

For instance, referring to FIG. 57, the cursor may erroneously designate a point P2 at coordinates X2, Y2 on a menu screen 2000 having a plurality of icons 2004, even when the user intended to move the cursor to a point P1 which is at coordinates X1, Y1. This is mainly attributed to the fact that the large degree of freedom of operation of the pointing device, e.g., a mouse, for implementing all-direction movement of the cursor tends to allow errors $\Delta X$, $\Delta Y$ to occur with respect to the target point P1. Consequently, the user cannot accurately point the target position in one action. After wrongly pointing the point P2, the user has to operate the operation means once again to move the cursor from P2 to P1.

FIG. 58 shows another type of portable information processing apparatus denoted by 2010. A cursor displayed on the display screen 2014 can be moved in all directions, i.e., up and down and to the left and right, in accordance with instruction input through an operation means 2012.

Obviously, this type of portable information processing apparatus also suffers from the problem explained in the foregoing.

In case of a portable information terminal device, sizes of the display screen, icons and operation means are small as compared with ordinary personal computers (PCs). The portable information terminal device is difficult to use when the operation means are arranged and used in the same way as those on ordinary PCs.

SUMMARY OF THE INVENTION

Accordingly, an object of the present invention is to provide a display apparatus which, even when used on a small-sized information processing apparatus such as a wearable device, enables the user to accurately and adequately conduct operations such as pointing and scrolling by means of a cursor, with improved ease of use.

It is also an object of the present invention to provide a portable information processing apparatus incorporating such a display apparatus.

To this end, according to one aspect of the present invention, there is provided a display apparatus, comprising: display means for displaying, on a display screen, a display image containing a time axis formed so as to extend at least in a first direction; input operation means for physically moving at least the time axis in one of the first direction; and controlling means for controlling the display screen based on an operational input given by an operation of the input operation means; wherein the input operation means includes a rotational operating means having an axis of rotation extending in second directions which cross the first direction; and wherein the rotational operating means is arranged such that a rotational operation of the rotational operation means by a first physical amount causes a physical movement of at least the time axis by a second physical amount corresponding to the first physical amount.

In accordance with these features of the first aspect of the present invention, it is possible to arrange such that the direction of scrolling (first direction) of the time axis on the display screen coincides with the direction of rotation of the input operation means. Hitherto, as stated before, operations such as alteration of the display screen, movement of cursor, scrolling of the display screen and so forth could not easily be conducted on wrist-wear type portable device having conventional arrangement of input operation means, due to restriction in the size of the input operation means and the posture of the wrist-worn device when operated. In contrast, according to the invention, the user can easily effect operations using cursor, because the scrolling direction coincides with the direction of rotation of the input operation means.

Conventional all-direction pointer such as a mouse or a track point allows unstable behavior of the cursor in response to the input instruction. In contrast, the display apparatus of the invention can ensure stable movement of the cursor because the cursor is movable only uni-axially. Further, the uni-axial movement of the cursor at high speed is realized by making use of the centrifugal force and inertial of the rotational input operation means. It is therefore possible to accurately command the horizontal movement and position of the cursor, while achieving high speed of cursor movement, with linear relationship between the operational input and the response of the display screen, whereby an interface is implemented which is easy to understand.

In the display apparatus of the first aspect having the described features, the rotational operation means may be arranged such that a direction tangent to the rotational operation means coincides with the first direction.

With this arrangement, the rotational operation means can also be sued for the purpose of setting a greater scale of display, i.e., enlargement of the display. This eliminates the necessity of complicated operation mechanism, thus reducing burden on the user, as well as the cost.

In the display apparatus of the first aspect, the input operation means may be arranged such that the input operation means when operated causes an enlargement of a predetermined display region of the display screen.

With this arrangement, the direction of movement coincides with the direction in which the display region is enlarged, giving an impression to the user as if the input operation means is mechanically linked to the display screen. It is therefore possible to realize a user-friendly operation environment.

When such an enlarging function is implemented, the arrangement may be such that the operation means is movable at least in the second directions, and causes the enlargement of the predetermined display region when moved in one of the second directions.

With this arrangement, the user can easily recognize the enlarged display region at one end of the display screen toward which the input operation means is moved.

This enlarging function may be implemented such that the input operation means is located at one end of the display screen as viewed in the first direction and, by being moved in one of the second directions, causes the enlargement of the predetermined display region which is positioned at one end of the display screen as viewed in the second directions With this arrangement, the user can enlarge the display region and easily recognize the enlarged display region at one end of the display screen, by moving the input operation means in one of the second directions.

In an alternative case, the arrangement is such that the input operation means, by being moved in the other of the second directions, causes the enlargement of the predetermined display region which is positioned at the other end of the display screen as viewed in the second directions.

With this arrangement, the user can enlarge the display region and easily recognize the enlarged display region at the other end of the display screen, by moving the input operation means in the other of the second directions.

In each of these two cases, the arrangement may be such that the input operation means is movable at least in the first direction and, by being moved at least in the first direction, moves and sets the position of a cursor on the display screen at least in the first direction.

With this arrangement, the input operation means serves also as means for commanding the movement and position of the cursor. This eliminates the necessity for any complicated input operation mechanism for commanding the cursor. It is thus possible to reduce the cost, while implementing small-sized input operation means suitable for use on small-sized portable device.

The display apparatus of the first aspect may be implemented such that the rotational operation means comprises a first operating portion which is disposed at one end of the display screen as viewed in the second directions.

With this arrangement, the first operating portion disposed at one end as viewed in the second direction can have an axis of rotation extending in the second direction, thus offering a greater ease of use.

In this arrangement, the first operating portion may be constructed so as to be movable in the second directions to move and set the position of the cursor on the display screen in the first direction when moved in the second directions, and, when rotated, to move and set the position of the cursor on the display screen in a third direction which perpendicularly crosses the time axis.

In this case, the first operating portion serves also as means for inputting instructions for moving and setting the cursor position. This eliminates the necessity for complicated operating mechanism, contributing to reduction in the cost, while adapting the display apparatus to small-sized devices.

When the rotational operation means has the first operating portion as stated above, the display apparatus may further comprise a second operating portion which perpendicularly crosses the time axis. In this case, the controlling means performs, based on the operation of the second operating portion, control of the display screen so as to enlarge the pitch of time scale of the time axis in the first direction.

In this display apparatus, therefore, the user can increase the pitch of the time scale of the time axis, i.e., to have the time axis displayed at a greater scale, by operating the second operating portion.

When the rotational operation means has the first operating portion as stated above, the display apparatus may further comprise a third operating portion which perpendicularly crosses the time axis. In this case, the controlling means performs, based on the operation of the third operating portion, control of the display screen so as to contract the pitch of time scale of the time axis in the first direction.

In this display apparatus, therefore, the user can reduce the pitch of the time scale of the time axis, i.e., to contract the time axis displayed on the display screen, by operating the third operating portion.

The display apparatus, when it comprises the aforesaid first operating portion movable in the second direction to move and set the cursor position in the first direction, may be constructed such that the area of the display screen is divided into a plurality of first display segment regions in the third direction perpendicularly crossing the time axis. In this case, the controlling means includes mode controlling means which performs switching between a first mode in which all the first display segment regions are displayed substantially at an equal scale and a second mode in which at least one of the first display segment regions is displayed in a greater scale than others. In addition, the display apparatus further comprises a fourth operating portion which gives a switching instruction to the mode controlling means for effecting the switching of the display mode.

With these features, the user can enlarge one or more of the first display segment regions, by operating the fourth operating portion. The user therefore can easily recognize the display region which is being used.

This display apparatus having the function to enlarge at least one of the display segment regions may be further modified such that the displaying means has a lower-level mode which is subordinate to the second mode and which sub-divides each the first display segment region into a plurality of second display segment regions in the third direction. Operation of the second operating portion in the second direction causes the cursor to jump between the second display segment regions.

In this modification, therefore, the user can freely effect movement of the cursor between the second display segment regions, by operating the second operating portion. Thus, the cursor can jump to and from any of the hierarchical levels. It is thus possible to eliminate complicated operation which hitherto is necessary when a complicated hierarchical structure is employed.

The above-described modification may be further altered such that the display means divides each the second display segment regions into a plurality of third display segment regions in the first direction. In this case, the second operating portion when rotated causes the cursor to jump between the third display segment regions.

In this case, therefore, the user can freely effect movement of the cursor between the third display segment regions, by operating the second operating portion. Thus, the cursor can jump to and from any of the hierarchical levels. It is thus possible to eliminate complicated operation which hitherto is necessary when a complicated hierarchical structure is employed.

The aforesaid display apparatus having the function to enlarge one of the display segment regions may be constructed such that each second display segment region has a plurality of different hierarchical structures, and the second operating portion permits the cursor to jump between the hierarchical levels.

The display apparatus in accordance with the first aspect may further comprise posture angle detecting means for detecting the posture angle of the display means with respect to a horizontal plane. In this case, the controlling means includes a posture switch control unit which controls, based on the result of detection of the posture angle detecting means, a power supply such as to turn on the power supply when the detected posture angle falls within a predetermined range, and to turn off the power supply when the detected posture angle does not fall within the predetermined range.

With these features, the power is automatically turned on and off in accordance with the angle at which the display apparatus is inclined. Thus, the power is kept off when the user does not look at the display screen, so as to eliminate wasteful display operation, thus contributing to saving of electrical power.

In accordance with a second aspect of the present invention, there is provided a display apparatus, comprising: display means for displaying, on a display screen, a display image containing a time axis formed so as to extend at least in a first direction; input operation means for enabling operational input of the display image at least on the display screen; and controlling means for controlling the display screen based on an operational input given by an operation of the input operation means. The display means displays display segment regions defined by dividing the display screen in a second direction perpendicularly crossing the time axis. The controlling means includes a first operating portion which when moved to one end as viewed in the second direction causes a display segment region adjacent to the end to be enlarged on the display and, when further moved again to the one end, causes one of other display segment regions to be enlarged.

In the display apparatus of the second aspect, the direction of movement, i.e., in the second direction, of the first operating portion coincides with the direction in which the specified display region is enlarged. The degree of enlargement of the display region, therefore, can be adjusted by adjusting the amount of movement of the first operating portion. It is thus possible to obtain a user-friendly display apparatus which is easy to use. Moving the first operating portion two or more times at the above-mentioned one end as viewed in the second direction produces display modes different from that obtained when the first operating member is operated only once. Thus, a single operating portion performs a plurality of functions, contributing to reduction in the overall size of the display apparatus.

The display apparatus of the second aspect may be arranged such that the input operation means has a second operating portion which, when moved to one end as viewed in the first direction, enlarges the pitch of time scale of the time axis.

This feature permits zoom-up operation and data opening operation to be effected by an identical action.

Preferably, the second operating portion when moved to the one end causes a lower-level menu of icons to be displayed.

In this case, the second operating portion serves to means for giving an instruction to display lower-level menu of icons. This eliminates the necessity for the complicated mechanism, thus contributing to reduction in the cost and adapting the display apparatus to small-sized devices.

The above-mentioned second operating portion may comprise a pointing device which moves and sets the position of a cursor on the display screen, thereby designating the position where an icon is to be displayed.

In this case, the second operating portion serves as means for commanding the cursor position and, hence, the position where the icon information is to be displayed. This eliminates the necessity for the complicated mechanism, thus contributing to reduction in the cost and adapting the display apparatus to small-sized devices.

The display apparatus in accordance with the second aspect may further comprise posture angle detecting means for detecting the posture angle of the display means with respect to a horizontal plane. In this case, the controlling means includes a posture switch control unit which controls, based on the result of detection of the posture angle detecting means, a power supply such as to turn on the power supply when the detected posture angle falls within a predetermined range, and to turn off the power supply when the detected posture angle does not fall within the predetermined range.

With these features, the power is automatically turned on and off in accordance with the angle at which the display apparatus is inclined. Thus, the power is kept off when the user does not look at the display screen, so as to eliminate wasteful display operation, thus contributing to saving of electrical power.

According to a third aspect of the present invention, there is provided a portable information processing apparatus comprising a display apparatus which may be of any of the foregoing aspects and arrangements.

Hitherto, as stated before, operations such as alteration of the display screen, movement of cursor, scrolling of the display screen and so forth could not easily be conducted on wrist-wear type portable device having conventional arrangement of input operation means, due to restriction in the size of the input operation means and the posture of the wrist-worn device when operated. In contrast, in the portable device of the invention, the user can easily effect operations using cursor, because the scrolling direction coincides with the direction of rotation of the input operation means.

Conventional all-direction pointer such as a mouse or a track point allows unstable behavior of the cursor in response to the input instruction. In contrast, the portable information processing apparatus of the invention can ensure stable movement of the cursor because the cursor is movable only uni-axially.

The portable information processing apparatus as described above may further comprise a wrist-wearing portion connected to the display apparatus so that the portable information processing apparatus can be worn on a user's wrist.

This portable information processing apparatus therefore can be implemented as a very small wearable device like a wrist-watch-type device.

These and other objects, features and advantages of the present invention will become clear from the following description of the preferred embodiments when the same is read in conjunction with the accompanying drawings.

BRIEF DESCRIPTION OF THE DRAWINGS

FIG. 1A is a schematic illustration of display on a display screen of an embodiment of the display apparatus in accordance with the present invention;

FIG. 1B is a schematic illustration of a main display screen displayed on the display apparatus shown in FIG. 1A;

FIG. 2 is a block diagram showing hardware architectures of a portable information processing apparatus such as that shown in FIG. 1A, and a personal computer;

FIG. 3 is a function block diagram showing a software architecture of a portable information processing apparatus in accordance with the present invention;

FIGS. 4A and 4B are a function block diagram showing the detail of the block diagram shown in FIG. 3;

FIG. 5 is schematic illustrations of upper-level menus, lower-level menus and a definition screen, that are displayed in accordance with hierarchical order by the operation of a control system of the display apparatuses shown in FIGS. 1A and 1B;

FIGS. 6A to 6C are schematic illustrations of examples of the content of display displayed by a display unit of the display apparatus shown in FIGS. 1A and 1B;

FIGS. 7A and 7B are schematic illustrations of examples of the contents of display on the display unit of the display apparatuses shown in FIGS. 1A and 1B;

FIGS. 8A to 8C are schematic illustrations of examples of the contents of display on the display unit of the display apparatuses shown in FIGS. 1A and 1B;

FIGS. 9A to 9C are schematic illustrations od examples of display screens displayed on the display apparatus of FIGS. 1A and 1B;

FIGS. 10A to 10C are schematic illustrations of examples of the contents of display on the display unit of the display apparatuses shown in FIGS. 1A and 1B;

FIGS. 11A to 11C are additional examples of the contents of display on the display unit of the display apparatuses shown in FIGS. 1A and 1B;

FIG. 12 is a schematic illustration of an example of the content of display on the display unit of the display apparatuses shown in FIGS. 1A and 1B;

FIG. 13 is a function block diagram showing a software architecture of a portable information processing apparatus in accordance with the present invention;

FIG. 14 is a schematic illustration of a memory map showing the hierarchy of information stored in a storage section of a portable information processing apparatus of the present invention;

FIG. 15 is an illustration of the concept of an electromagnetic signal of data transmitted and received through a communication unit or between internal devices;

FIG. 16A is an illustration of an example of a table which defines correlation between character data stored in the storage section of a portable information processing apparatus and function programs;

FIG. 16B is an illustration of an example of a table which shows character data stored in a storage section of the portable information processing apparatus, as well as positions of display data on the screen and menu forms, for each of a plurality of menu modes;

FIGS. 17A and 17B are illustrations of the background screen character data that are displayed on the display screen of the display apparatus of FIGS. 1A and 1B;

FIG. 18 is a flowchart illustrating the flow of control performed by a control system;

FIG. 19 is a flowchart showing the detail of the processing "A" of the flow shown in FIG. 18;

FIG. 20A is a flowchart showing the detail of Step 3 of the flow shown in FIG. 18;

FIG. 20B also is a flowchart showing the detail of Step 3 in the flow shown in FIG. 18;

FIG. 21A is a flowchart showing details of Steps 32 and 42 in the flowcharts of FIGS. 20A and 20B;

FIG. 21B is a flowchart showing the detail of a routine for executing Steps 32 and 42 of the flowcharts shown in FIGS. 20A and 20B;

FIG. 21C also is a flowchart showing the detail of a routine for executing Steps 32 and 42 of the flowcharts shown in FIGS. 20A and 20B;

FIG. 22A is a flowchart showing the procedure of operation executed by means of an operation system of the display apparatuses shown in FIGS. 1A and 1B;

FIG. 22B is a flowchart showing the detail of Sep 101 of the flow shown in FIG. 22A;

FIG. 22C is a flowchart showing the detail of Sep 104 of the flow shown in FIG. 22A;

FIG. 23A is a schematic illustration of the content of display on a display screen of another embodiment of the display apparatus in accordance with the present invention;

FIG. 23B is a schematic illustration of the content displayed in the main screen of the display apparatus shown in FIG. 23A;

FIG. 24 is a schematic illustration of upper-level menus, lower-level menus and setting screen which are displayed in stages under the control of a control system of the display apparatus shown in FIGS. 23A and 23B;

FIG. 25 is a schematic illustration of the content of display on a display unit of the display apparatus shown in FIGS. 23A and 23B;

FIGS. 26A to 26D are schematic illustrations of examples of the display screens displayed on the display unit of the display apparatus shown in FIGS. 23A and 23B;

FIGS. 27A to 27D are schematic illustrations of examples of the display screens displayed on the display unit of the display apparatus shown in FIGS. 23A and 23B;

FIG. 28 is a schematic illustration of an example of the display screens displayed on the display unit of the display apparatus shown in FIGS. 23A and 23B;

FIGS. 29A and 29B are schematic illustrations of examples of the display screens displayed on the display unit of the display apparatus shown in FIGS. 23A and 23B;

FIGS. 30A to 30C are schematic illustrations of examples of the display screens displayed on the display unit of the display apparatus shown in FIGS. 23A and 23B;

FIGS. 31A and 31B are schematic illustrations of examples of the display screens displayed on the display unit of the display apparatus shown in FIGS. 23A and 23B;

FIGS. 32A to 32C are schematic illustrations of examples of the display screens displayed on the display unit of the display apparatus shown in FIGS. 23A and 23B;

FIG. 33A is a flowchart showing a process executed by an operation system in the display apparatus shown in FIGS. 23A and 23B;

FIG. 33B is a flowchart showing the detail of Step 131 in the flow shown in FIG. 33A;

FIG. 33C is a flowchart showing the detail of Step 134 in the flow shown in FIG. 33A;

FIG. 34 is a schematic illustration of a display screen used in still another embodiment of the display apparatus in accordance with the present invention;

FIG. 35 is a schematic illustration of a lower-level menu screen (window) which is opened when an icon on the display screen of FIG. 34 is clicked;

FIG. 36 also is a schematic illustration of a lower-level menu screen (window) which is opened when an icon on the display screen of FIG. 34 is clicked;

FIG. 37 is a perspective view of a portable information processing apparatus of the present invention and a personal computer which in combination form a network system, arranged to perform synchronization of data;

FIG. 38 is a front elevational view of a portable information processing apparatus of the present invention;

FIG. 39 is a schematic illustration of a main screen displayed on a display unit of the portable information processing apparatus shown in FIG. 38;

FIGS. 40A to 40F are schematic illustrations of lower-level menus shown in a lower-level menu of the main screen of FIG. 39;

FIGS. 41A to 41E are schematic illustrations of contents of display on the display unit of the portable information processing apparatus of FIG. 38;

FIG. 42 is a schematic illustration of upper-level menus, lower-level menus and a definition screen, that are displayed in accordance with hierarchical order by the operation of a control system of the display apparatuses of this embodiment;

FIG. 43 is a flowchart showing the process executed by an operation system;

FIG. 44 is a schematic illustration of a different embodiment of the display apparatus of the present invention;

FIGS. 45 is a schematic illustration of upper-level menus, lower-level menus and a definition screen, that are displayed in stages by the operation of a control system of the display apparatuses shown in FIG. 44;

FIGS. 46A and 46B are schematic illustrations of an example of the display screen on a display unit of the display apparatus shown in FIG. 44;

FIGS. 47A and 47B are schematic illustrations of examples of display contents displayed on the display unit of the display apparatus shown in FIG. 44;

FIGS. 48A to 48F are schematic illustrations of examples of display contents displayed on the display unit of the display apparatus shown in FIG. 44;

FIGS. 49A to 49F are schematic illustrations of examples of display contents displayed on the display unit of the display apparatus shown in FIG. 44;

FIGS. 50A to 50F are schematic illustrations of examples of display contents displayed on the display unit of the display apparatus shown in FIG. 44;

FIGS. 51A to 51F are schematic illustrations of examples of display contents displayed on the display unit of the display apparatus shown in FIG. 44;

FIG. 52A is a schematic illustration of the content of display on a display screen of a different embodiment of the display apparatus in accordance with the present invention;

FIGS. 52B and 52C are schematic illustrations of examples of contents displayed on the display unit of the display apparatus shown in FIG. 52A;

FIGS. 53A to 53D are schematic illustrations of an example of display screen displayed on the display unit of the display apparatus shown in FIG. 52A;

FIGS. 54A to 54C are schematic illustrations of an example of display screen displayed on the display unit of the display apparatus shown in FIG. 52A;

FIGS. 55A to 55C are schematic illustrations of an example of display screen displayed on the display unit of the display apparatus shown in FIG. 52A;

FIGS. 56A to 56C are schematic illustrations of a portable information processing apparatus of the present invention and a personal computer which in combination form a network system, arranged to perform synchronization of data;

FIG. 57 is a schematic illustration showing a problem encountered when a cursor is moved by a conventional input operation unit; and FIG. 58 is a perspective view of a conventional portable information processing apparatus.

DESCRIPTION OF THE PREFERRED EMBODIMENTS

Figures 40D, 40E, 40F:
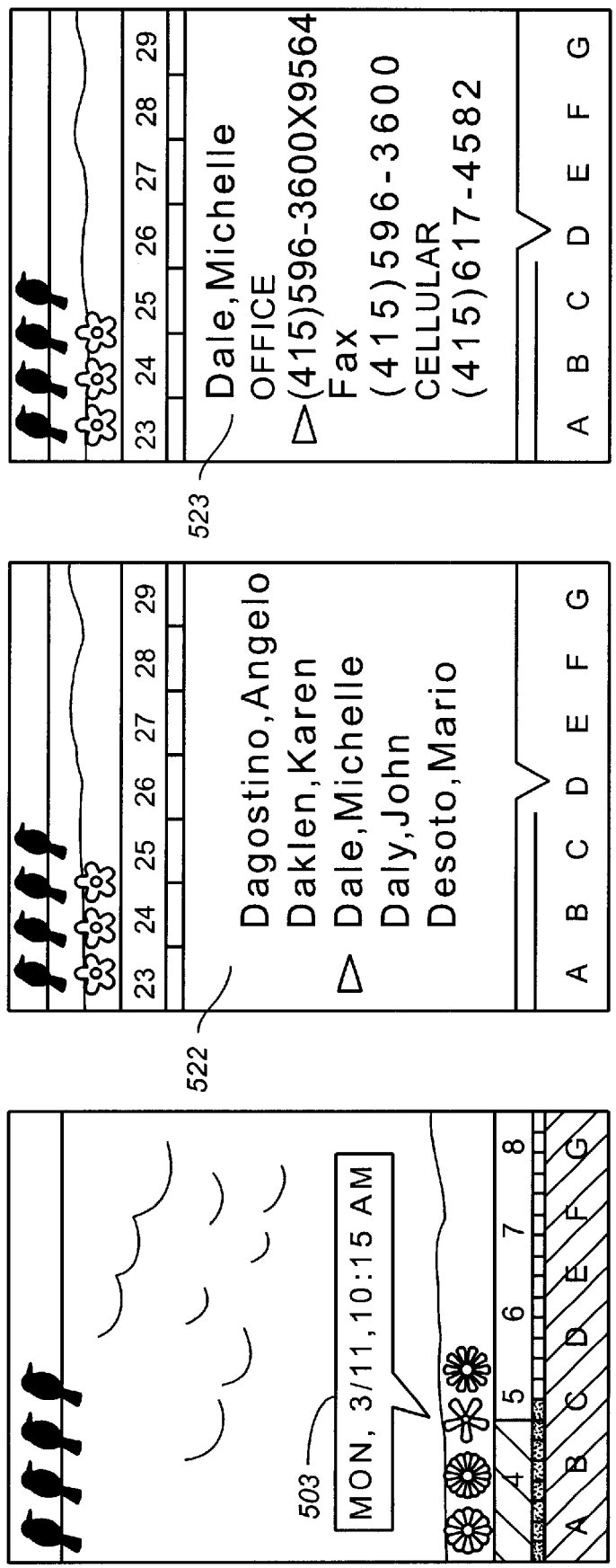

Embodiments of display apparatus in accordance with the present invention will be described with reference to the accompanying drawings.

First Embodiment
(Overall System Configuration)

FIG. 2 shows a system which suitably incorporates the present invention. The system includes one or more wearable, e.g., wrist-type, portable devices 1 serving as user terminals or PDAs and functioning as first information processing apparatus, and a personal computer (referred to as "PC", hereinafter) 140 serving as a host computer that provides predetermined services and functions as a second information processing apparatus. A network is formed by the PC 140 and the portable devices 1, such that they can communicate with each other. The PC 140 is installed in, for example, a home or an office, while the portable device 1 is worn by a user by being wound around a wrist.

The PC 140 comprises, as known in the art, a computer having high performance and incorporates therein various parts or components as shown in FIG. 2: namely, a time measuring unit 141 for measuring time; a storage unit 142 for storing various kinds of data; a display unit 143 for displaying data; operating unit 144 which permits various operations to be executed on various kinds of information displayed on the display unit 143; communication unit 145 which permits exchange of information between the PC 140 and another information processing apparatus such as the portable device 1; a voice output unit 146 that outputs voice information; a voice input unit 147 which permits input of voice information; and a CPU 148 that control these units.

The storage unit 142 stores various programs and data, including an exclusive software for running the PC 140 itself, an exclusive application software for generating display screens peculiar to the present invention, a web browser and a protocol which enable downloading of data to the portable device 1, and so on. Preferably, the software which generates the display screen peculiar to the invention is formed in the form of, for example, an exclusive PC card, independently from the storage area of the PC 140.

(Synchronization of Data)

The portable device 1 is used independently but may be synchronized with the PC 140 so as to form a system together with the PC 140.

Various techniques are available for the purpose of synchronization of data. For instance, data updating means (not shown) is provided in each of the PC 140 and the portable device 1. The data updating means performs comparison between the data in the portable device 1 and the data stored in the PC 140 and, based upon the result of the comparison, performs updating and synchronization of the data. Preferably, the data updating means is provided in each of the communication unit 145 of the PC 140 and the communication unit 15 of the portable device 1, shown in the block diagrams of FIG. 2.

In another technique for synchronizing the data, data stored in the storage unit 142 of the PC 140 is downloaded to a storage unit 12 of the portable device 1, in response to a request which is produced by the portable device 1 simultaneously with the start-up of the system upon turning on of the power supply of the portable device 1. Data in the storage unit 142 of the PC 140 is rewritten when updating of the data is required. Thereafter, as the portable device 1 is turned on, the portable device 1 set in the same state as the PC 140 in accordance with the updated data.

Thus, inputting or changing basic data in one of the PC 140 and the portable device 1 causes the other to be automatically updated. In the described embodiment, the portable device 1 and the PC 140 can be synchronized without requiring any specific attention of the user, even when the portable device 1 and the PC 140 are spaced a long distance from each other.

The user can edit the content of the information displayed on the display unit 13 of the portable device 1, by suitably operating the PC 140 while monitoring the display on the display unit 143 of the PC 140. In order to assist the user conducting the editorial work, an image of the portable device 1 appears on a part of the display unit 143 of the PC 140 (see FIG. 52). It is therefore possible to take-up a desired image from the PC 140 into the portable device 1, by clipping the image information at the PC 140 and pasting the information into the window opened on the PC 140. This operation will be described later in more detail in conjunction with a fifth embodiment of the present invention. This feature is particularly useful in the case where a PC card is incorporated in the PC 140, because the content of the displayed information can be inspected.

In the described system, the size of the display area of the display unit 143 of the PC 140 is much greater than that of the display unit 13 of the portable device 1. Therefore, a mere synchronization produces only an effect to compress the image displayed on the PC 140 and to display the compressed image on the display unit 13 of the portable device 1. This embodiment is arranged such that the display unit 143 and the display unit 13 have identical images, and employs the following unique features in order that the user can naturally recognize the two devices, i.e., the PC 140 and the portable device 1, as being an identical device.

More specifically, in this embodiment, character patterns different from those generated in the PC 140 are formed in the portable device 1 so that display of icons on the portable device 1 is performed in such a manner as to facilitate understanding by the user, although the images on both devices are the same. In addition, both the PC 140 and the portable device 1 employ the same background image and icon character image, thus providing a user interface which permits easy visual recognition by the user, even when the user is a beginner.

(Hardware Architecture of the Portable Device)

FIGS. 1A and 1B schematically show the appearance of the portable device 1. The portable device 1 used in this embodiment is small-sized and light-weight so that it can be worn by a user, for example, by being wound around a user's wrist. More specifically, the portable device 1 has a wrist band portion (not shown) adapted to be wound around the user's wrist, a display unit 13 having, for example, a liquid crystal display and serving as displaying means, connected to the wrist band portion, and an input operation unit 14 serving as an input operating means and having operating portions arranged on side edges of the display unit 13.

The input operation unit 14 has operating portions including a cursor button 14A having an oval form resembling that of a Rugby ball, serving as a first operation button constituting rotary input portion, a tab switch 14B as a second operation button, an option button 14C as a third operation button, and a recording button 14D which functions as a fourth operation button.

The cursor button 14A is capable of performing three types of operations: namely, a rotational operation in the directions indicated by a double-headed arrow θ about an axis Y shown in FIG. 1B, a push-up operation in which the cursor button 14A is once pressed in the direction of the arrow "o" and then pushed upward in the direction of the arrow "P", and a push-down operation in which the cursor button 14A is once pressed in the direction of the arrow "o" and then pushed downward in the direction of the arrow "Q".

Thus, when the cursor button 14A is rotationally operated by a first physical amount (e.g., distance, angular velocity or angular acceleration), the time axis displayed on the display screen is moved by a second physical amount (e.g., distance, velocity or acceleration). Conversion between the first and second physical amounts can easily be achieved by using a conversion table stored in a storage unit which will be described later.

The tab switch 14B is arranged so as to be pushed up and down in the directions perpendicular to the plane of the drawing sheet.

Referring now to FIG. 2, the portable device 1 further has a CPU 18 which performs overall control of the portable device. 1. The input operation unit 14 and the display unit 13 are connected to a BUS line of the CPU 18. Various functions shown in FIGS. 3 and 4 are implemented by a display driving function of the CPU 18 and a display interface (not shown) in the display unit 13.

To the BUS line of the CPU 18, also connected is a storage unit 12. As shown in FIG. 14, the storage unit 12 has a control section 22A storing a control program, and real data section 22B which stores various types of data. The real data section 22B will be described later in detail, but it is to be understood here that the real data section 22B preferably has a ROM and a RAM that store the data. The ROM has a data memory that stores various kinds of data such a icon character data, background character (image) data, font data and position data defining positions of the icons relative to the background image. The ROM also has a program memory which contains various programs including a menu displaying program for displaying various menus used in those embodiment, a function program which defines various functions of this embodiment, a boot program which activates the CPU 18 in response to turning on of the power supply of the portable device 1 to start the latter, a display program which is determined by first to fourth display setting portions which will be described later. When the power of the portable device 1 is turned on, the boot program makes access to the storage unit 142 of the PC 140 so as to read the web browser, various communication protocols and other data, and loads them down into the RAM.

The RAM stores information which has been input through various kinds of setting screen. Thus, the functions of the first to fourth display setting portions are implemented by the display setting function of the CPU 18, the storage unit 12, and a memory interface (not shown) which is provided in the storage unit 12.

To the BUS line of the CPU 18, further connected are a time measuring unit 11, voice input unit 17 and a voice output section 16 having a microphone which is not shown.

A communication unit 15 which serves as the communicating means for communication with the PC 140 also is connected to the BUS line of the CPU 18, as will be seen from the block diagram in FIG. 2. The communication unit 15 includes an infrared communicating portion (IRDA) 15D which performs communication by way of infrared rays, a radio communicating portion 15C for wireless radio communication, a MODEM 15B connected to these communicating portions to perform modulation and demodulation, a telephone 15E and a communicating portion 15A which incorporate the telephone 15 as a serial interface and which is connected to the MODEM 15B. The connection to the CPU 18 is made through this communicating portion 15A. The infrared communicating portion (IRDA) 15D has a transmitting portion (port) for infrared rays. The MODEM 15B is configured in the form of a soft MODEM through which a serial bit train is received by the CPU 18. The MODEM 15B has an interface for infrared rays. The CPU 18 conducts various processings relating to the MODEM 15B and the communicating portion 15A. Thus, the portable device 1 is capable of communication via infrared rays and transmission/receipt of electronic mails.

A notification unit 19B for notifying the user of the presence of information is connected to the CPU 18. The notification unit 19B may be implemented by various means such as vibration generating means capable of generating vibration of magnitude variable in a stepped manner to stimulate the user, a smell generating means for generating smell of intensity variable in a stepped manner, alarming tone changing means which generates tone of a level variable in a stepped manner, light generating means capable of generating light adjustable in a stepped manner, an electric discharging means which gives an electrical shock to the user in a manner adjustable stepwise, or the like. A battery capacity detecting unit 19A for detecting the remaining capacity of a battery as the power supplying means is connected to the CPU 18.

It is possible to connect to the CPU 18 a detection means (not shown) that detects posture of the display unit with respect to a horizontal plane. In this case, the CPU serves also as a posture switch control means which controls the power supply in response to the detection output from the posture detection means in such a manner as to turn the power supply on when the detected posture angle falls within a predetermined range and turns the power off when the posture angle is outside the above-mentioned range. With this arrangement, power is turned on or off in accordance with the posture of the display device itself. For instance, when the user does not wish to look into the display, the power is kept off to save wasteful operation, thus achieving a reduction in the power consumption.

(Display Screen of Portable Device)

FIG. 1A illustrates an initial screen (default view) 20 which appears in response to turning on of the power supply. This initial screen 20 is constructed so as to be able to provide a day-of-week display area 20A which appears at an upper portion of the display on the display unit 13 and indicating what day of the week is it today, a time display area 20B which appears at a intermediate region of the display unit 13 and indicating the present time, and a date display area 20C which appears at the lowermost end portion of the display unit 13 and indicates the present date.

In operation, the display unit 13 displays the initial screen 20 as shown in FIG. 1A, in response to turning on of the power supply. Then, as the user operates the tab switch 14B, the schedule display mode screen 30A as shown in FIG. 1B appears as the main screen.

The display screen 30A of the schedule display mode has an uppermost data display area 42, a schedule display area 50 having vertical time lines and serving as a calendar, a time axis display area 60A indicating a time axis that provides time reference to the vertical time lines displayed in the above-mentioned schedule display area 50, and the lowermost icon display area 70.

A black bar 44 having an arrow head giving a present time indication to the display on the schedule display area 50 is provided at the lower end of the date display area 40. The black bar 44 with its arrow head serves as a cursor.

Thus, one of the vertical lines 54 which is pointed by the arrow head of the black bar 44 indicates the present time which separates the "past" time region and the "future" time region. The past time region is displayed as a background-colored display area 52 in which the background image is colored in, for example, gray color.

The schedule display area 50 has schedule icons 56 positioned in accordance with the desired scheduled time. By operating each schedule icon 56, it is possible to inspect the schedule which is shown in a lower-level menu.

The time axis display area 60A is prepared as a non-colored schedule occupied/non-occupied displayed area 62. Portions of the time axis corresponding to the schedule icons 56 are colored to indicate the presence of schedules events or actions, i.e., to indicate that the schedule has been occupied. In the display screen shown in FIG. 1B, the schedule icons are formed over a time region from 9 o'clock to 12 o'clock. It will be seen that the corresponding portion of the schedule occupied/non-occupied display area 62 constituting the time axis are also colored over this time region of from 9 to 12 o'clock. The user therefore can visually recognize whether or not the schedule has been occupied at a glance of the time axis. This permits the user to visually understand the most current schedule of events and actions, without difficulty.

The icon display area 70 displays microphone icons 72 indicating that voice memos have been registered and envelope icons 74 indicating that messages have been received as electronic mails. These icons can be operated in the same way as that for the above-described schedule icons 56, so that the user can listen to the voice memos or read the electronic mails by referring to lower-level menus.

Pushing down of the tab switch 14B causes the time axis of the schedule display mode screen 30A to be switched over a 6-hour mode, 12-hour mode, 1-week mode and a 1-month mode. Zooming-in (magnification) of the display image of the time axis is possible in each of these modes.

Pushing up of the tab switch 14B causes zooming out (de-magnification) of the displayed image. FIG. 1B shows the display screen in the 6-hour mode. FIGS. 7A and 7B show the display screens in the 12-hour mode and 1-week mode, respectively.

Referring now to FIG. 8A, pressing down of the cursor button 14A causes the display screen to be switched from the schedule display mode to the memo mode. More specifically, as shown in FIG. 8B, the date display area 40 skips down to the position below the icon display area 70, when the cursor button 14A is pushed down. Then, the user can move the cursor to point a desired icon, by rotating the cursor button 14A. For instance, the user moves the cursor to put it on the microphone icon 72A, and pushes the tab switch 14B, so that the user can listen to the recorded voice memo via the voice output unit.

In order to register the recorded information at the schedule display area 50, the user pushes the tab switch 14B up to move the microphone icon upward into contact with the black bar 64, as shown in FIG. 8C. Then, the user pushes up the cursor button 14A upward as shown in FIG. 9A, so that the date display area 40 moves upward as shown in FIG. 9B. The user then rotates the cursor button 14A, so as to move the microphone icon 72A to the position of a desired time, e.g., 6 pm, as shown in FIG. 9C. A subsequent pressing down of the tab switch 14B causes the microphone icon 72A to move apart from the cursor, whereby the microphone icon 72A is pasted on the schedule display area 50. It is thus possible to correlate the voice memo indicated by the microphone icon to the time axis.

The user can then switch the display mode by operating the option button 14C one time, as shown in FIG. 10A. Pressing this button one more time causes the display to be reset to the original normal mode, i.e., to the schedule display mode.

FIG. 10B shows the display screen which is displayed when the mode has been changed to the database mode 100. The database mode 100 is classified into four categories: namely, "Clients" 110, "Vendors" 111, "Personal" 112 and "Setting" 113. The "Setting" mode is used for time adjustment or other types of adjusting operations.

The user can move the black bar (cursor) 103 horizontally by operating the cursor button 14A to point desired one of these categories. The user then selects, for instance, the "Clients" list 110, by operating the tab switch 14B, as shown in FIG. 10C. As a consequence, a display screen as shown in FIG. 11A appears. The user then rotates the cursor button 14A to move the selector bar (cursor) 103 horizontally, so a to point, for example, an initial "K".

As a result, a vertically movable virtual cursor 122 is displayed on one side of the list of the names, as shown in FIG. 11B. The user can point and select any desired name in the list by moving the virtual cursor, by pushing up or down the cursor button 14A. The display screen is automatically scrolled when the cursor 122 has reached an end of the display area 502.

The user can inspect information given by the name shown in FIG. 11C, through an operation of the tab switch 14B. The user then moves the virtual cursor 122 up or down by pushing the cursor button 14A up or down so as to scroll the display, in order to reach the desired information.

A notification window 80 as shown in FIG. 6C is displayed when an electronic mail is received. This notification window 80 can display the photograph of sender's portrait, name of the user, and the time of transmission.

When the received electronic mail is not urgent, the notification of arrival of the mail is not conducted but an envelope icon 74 is automatically pasted thereto. The user therefore can look into the electronic mail by selecting the icon 74 at his convenience.

Recording of a voice memo is conducted by operating the recording button 14D. Recording is possible when the display screen 90 as shown in FIG. 12 is being displayed.

In the schedule display mode as shown in FIG. 1B, the user can scroll the display screen in the direction of the time axis by rotating the cursor button 14A. If the arrangement of the input operation unit is the same as that of conventional wrist-type wearable instrument such as a wrist watch, it is not easy for the user to conduct various operations such as switching of the display screen, movement of the cursor and scrolling, because of the posture of the device on the wrist and because of the size of the input operation device. In this embodiment, however, this problem is overcome and the user can easily conduct these operations because the cursor button of the input operation unit is rotatable in the same direction as the scrolling.

Pointers such as a mouse or a track point, which enables a cursor to move in any desired direction, tends to inconveniently allow unstable movement of the cursor. In contrast, in the illustrated embodiment, stable and accurate movement of the cursor is ensured because the cursor is movable only uniaxially. In addition, the uniaxial movement of the cursor can be performed at a high speed, by making use of the centrifugal force and inertia of rotation of the rotational operation of the input operation unit. Therefore, accurate positioning and high-speed horizontal movement of the cursor are achieved by the rotational operation of the input operation unit. It is thus possible to provide a feasible interface which is easy to understand by virtue of the coincidence between the operation of the input operation device and the response of the display screen.

In addition, the described embodiment has a catch-net metaphor function for displaying data outside the display frame. A memo (or an object) pasted to the time axis moves in accordance with the movement of the time axis as the time elapses. However, necessary memo remains in the display area even when the time on which the memo has been pasted has come out of the display frame as a result of the movement of the time axis.

To this end, a catch-net area is provided at the left end region, i.e., at the end of the "past" time region, of the display area on the display unit 13, and the data which has come off the time axis are "caught" by the catch-net and pasted to the end of the "past" time region. Thus, the catch-net area has a function to retain on the time axis display area any icon information which otherwise would be extinguished by being moved out of the display area.

FIG. 21C is a flowchart showing the display processing with the catch-net function.

Determination as to whether an icon has come into the catch-net area is conducted each time the update processing is conducted for moving the time axis in accordance with the lapse of time (S70). If any icon has fallen into the catch-net area, a processing is conducted to stack the icon in the catch net area regardless of the movement of the time axis (S71), otherwise the icon is continued to be displayed by being moved together with the time axis. Any schedule icon stacked in the catch-net area is deleted (S72) from the catch-net area of the display screen at a moment which is "K" hours from the scheduled time, i.e., when the time difference between the input schedule time and the present time exceeds "K" hours. Thus, icons are extinguished after lapse of "K" hours.

(Software Architecture of Portable Device)

FIG. 3 is a block diagram showing the configuration for implementing the described hierarchical structure in the portable device.

Referring to this Figure, the portable device has a display control system including the input operation unit 14, a voice input unit 17, the first to fourth display setting units 210A to 210D, a display control unit 260, the display unit 13, the voice output unit 16, and a voice control unit 270. In this embodiment, the input operation unit 14 includes the cursor button 14A and associated interface. The arrangement is such that the cursor moves on the display screen in response to rotation of the cursor button 14A, in accordance with display control which will be described later. It is possible to select one of menus on the display screen by this operation.

The detail of the first to fourth display setting units 210A to 210D will be described with specific reference to FIG. 4.

The first display setting unit 210A sets up an initial screen which is displayed when the power is turned on. In this initial screen, font data indicative of the time are synthetically displayed against a background which is displayed by a specific metaphor. A main screen then appears in response to an operation of the input operation of the tab switch 14B.

The second display setting unit 210B sets up a group of menus of upper hierarchical level. In this embodiment, three modes, i.e., "schedule", "memo" and "database" are available as the items. These three mode groups are set up via the step of displaying the initial screen which is performed when the power of the display unit 13 is turned on. A desired mode can be selected on the main screen by operating the option button 14C. The selected mode is then displayed.

The selected information is delivered from the second display setting unit 210B to the third and forth display setting units 210C, 210D.

The main screen described above displays icons such as those denoted by 56, 72 and 74 in an icon display region of the "schedule" mode, as well as a time axis scaled by hour. When there is a schedule on this time axis, the background is colored. To this end, the background color is displayed in a schedule occupied/nonoccupied background color display area region. The "database" mode displays regions for various items which are used when the database is retrieved. Any of these icons and regions (characters) can be selected by operating the cursor button 14A to move the cursor on the main screen so as to point the icon of interest. The selected information is delivered from the second display setting unit 210B to the third and fourth display setting units 210C, 210D.

Based on the output from the second display setting unit 210B, the third display setting unit 210C sets up upper-level menus such as the icon and characters selected in the second display setting unit 210B. If there are a plurality of lower-level menus, such lower-level menus also are set up as information to be displayed. For instance, when the microphone icon 72 indicative of the voice memo has been selected in the second display setting unit 210B, a "voice memo display screen" which is a group of lower-level menus under this icon 72 is set up as the display information. These lower-level menus are displayed in, for example, a window which is opened in the main screen on the display unit 13, by the operation of the display control unit.

A subsequent operation of the cursor button 14A causes the cursor to move on each mode screen, so that one of the lower-level menus is selected in each mode screen. Information concerning this selection is delivered from the third display setting unit 210C to the fourth display setting unit 210D.

Based on the output from the second (or third) display setting unit 210B (or 210C), the fourth display setting unit 210D sets up information to be displayed. More specifically, the fourth display setting unit 210D sets up a display screen for displaying the selected upper-level menu (only when there is no lower-level menu corresponding to this upper-level menu), or a setting screen for setting lower-level menu (if any) under the selected upper-level menu.

When a screen is set up by the fourth display setting unit 210D, the display control unit performs the display control so as to display, on the display unit 13, the lower-level menu screen instead of the mode screen.

For instance, when a name selection screen 120 (see FIG. 11B) has been displayed by the third display setting unit 210C in the database mode, an individual data display screen 130 (see FIG. 11C) is displayed by the operation of the fourth display setting unit 210D.

Thereafter, various pieces of information corresponding to the selected item can be input by an operation of the track ball. The condition information set by the operation of the input operation unit is displayed by being superposed on the setting screen which is displayed on the display unit 13, so that the user can confirm the set information.

Fifth, sixth and further display setting units may be employed as required if there are a plurality of lower-level menus.

(Display Setting Unit)

The detail of each of the display units 210A to 210D (collectively represented by numeral 210, hereinafter) will be described with reference to FIG. 4. The display setting unit 210 has a data processing unit 230 that performs processing of data mainly based on time information derived from the time measuring unit 11 and communication information derived from the communicating unit 15. The display setting unit 210 also has a UI processing unit 240 which operates based on the data from the data processing unit 230 and operational input from the input operation unit 14, so as to generate background image and icon character data to be displayed and to set the display screen itself, thereby processing the user interface. The display setting unit 210 further includes the storage unit 22 which stores data to be processed by the data processing unit 230 and the data to be processed by the UI processing unit 240. The data processing unit 230 and the UI processing unit 240 communicate with each other for processing the input from the input operation unit 14.

The data processing unit 230 has various processing sections corresponding to functions of various applications, including a mail processing section 230A for processing mail data, a memo processing section 230B for processing memo data, a database data processing section 230C for processing data in the database, a voice memo processing section 230D for processing voice memo data, and so forth.

The information processed by the data processing section 230 includes communication information from the communication unit 15, time information from the time measuring unit 11 and input/output information produced in accordance with the operation of the input operation unit 14. The communication information includes, for example, electronic mail information transmitted and received through the communication unit 15, and receipt time information included in a header accompanying the electronic mail information and indicating the time at which the mail was received. The combination of the receipt time information and the electronic mail information is stored in a data administrating unit 220 of the storage unit 12. When the communication information is voice information, the voice information includes voice mail information and receipt time information stored in a header accompanying the voice mail information and indicating the time at which the voice mail information was received.

The input/output information includes: schedule information indicating a schedule; designated time information indicating the time designated by the user as the time at which the schedule is to be executed, stored in a first header of a header section accompanying the schedule information; and input operation time information determined in accordance with the output from the time measuring unit 11 and indicating the time at which the user input the schedule, stored in a second header of the above-mentioned header section. The schedule information, designated time information and input operation time information are stored as a set of information in the data administration unit 220 of the storage unit 12. When the input/output information is voice information, the voice input information includes voice memo information containing input voice information, and input time information indicating the time at which the user input the voice memo and stored in a header accompanying the voice memo information.

The UI processing unit 240 includes: a content analyzing unit 242 which analyzes appendix data appended to the data to be processed by the data processing unit 230, such as the receipt time information included in the header, file size, number of files and so forth; update processing unit 244 which updates the display screen in accordance with the time information from the time measuring unit 11 and the input operation unit 14; a data control unit 250 having a background character data control section 250A for generating background screen, icon character data control section 250B for generating icon information, and a font data control section 250C for generating font information, and a screen synthesizing unit 252 having a state holding section which synthesizes data derived from one of these data control sections 250A to 250C.

The content analyzing unit 242 has a header analyzing section 242A for analyzing contents of a plurality of headers 1, 2, . . . of the header section, a file size analyzing section 242B for analyzing sizes of files, a file number analyzing section 242C for analyzing the number of files, and so forth. When the receipt time information is stored in the header section, the header analyzing section 242A also functions as a receipt time analyzing section, whereas, when the header section stores designated time information, the header analyzing section 242A functions also as a designated time analyzing section.

The background character data control section 250A, serving as metaphor environment generating means, operates in accordance with a control signal given by an operation input control unit 280, so as to receive the results of processing performed by the data processing unit 230 and to generate a background screen using metaphor (character data) which simulates scenery or event of actual environment that can be sensed and recognized by users in their daily life. The background screen thus generated is delivered to the display unit 13.

The icon character data control section 250B receives the results of analysis performed by the content analyzing unit 242, and instructs the screen synthesizing unit 252 to alter the state of operation of the display screen, in accordance with data which is derived from the storage unit 12 and which has been selected from a group of functions prepared beforehand in the storage unit 12. For instance, if receipt time information is stored in the header section, icon character data stored in the icon character data storage section 222B of the data storage unit 222 are displayed on the display screen of the display unit 13 in the order of the receipt time, in accordance with the results of the analysis (comparison of receipt time) performed by the header analyzing section 242A. Similarly, if designated time information is stored in the header section, icon character data stored in the icon character data storage section 222B of the data storage unit 222 are displayed on the display screen of the display unit 13 in the order of the scheduled time, in accordance with the results of the analysis (comparison of designated time) performed by the header analyzing section 242A.

Thus, the information such as the electronic information includes text data as the body of the data, and appendix data appended to the text data and stored in the header section of the information. The appendix data includes, for example, receipt time, file size and so forth. The content analyzing section 242 performs determination as to whether or not any appendix data exists and, if any, extracts such appendix data, e.g., receipt time. Therefore, the header analyzing section 242A (receipt time) and the file size analyzing section 242B (data size) identify the file by the file name contained in the appendix data, taking into consideration a characteristic extension identifier such as TXT, GRP graphic, Exls, or the like.

Based on the extracted information, the character data control section 250B extracts character data corresponding to the information and causes the extracted data to be reflected on an object based on, for example, receipt time which indicates degree of urgency.

The state holding section in the screen synthesizing unit 252 holds the present state of operation and delivers this operation state to the display unit 13 via a display control unit 260.

The storage unit 12 has the data administration unit 220 for storing the data processed by the data processing unit 230 and the data storage unit 222 which stores data to be processed by the UI processing unit 240.

The data administration unit 220 has various levels such as a mail data storage section 220A for administrating data that processes data such as directory, a memo data storage section 220B for administrating memo data, a vice memo storage section 220C for administrating voice memo data, and so on.

The data storage unit 222 has the background character storage section 222A for storing a plurality of types of background character data, e.g., time axis, metaphor of sky, etc., the icon character data storage section 222B for storing a plurality of types of icon character data corresponding to a plurality of kinds of icon information; and the font data storage section 222C for storing a plurality of types of font data. The background character data storage section 222A stores display image of the applied metaphor, e.g., scenery or looking of the sky of a sky metaphor.

The data storage unit 222 of the storage unit 12 has, in addition to the background character data storage section 222A, icon character data storage section 222B and the font data storage section 222C, a metaphor rule accumulating section that accumulates therein rules concerning the applied metaphor such as, for instance, range of movements of the characters and method of display of these characters on a display screen constituted by a time axis representing the environment of operation.

The operation input control unit 280 has the following sections corresponding to various kinds of operations: a voice input control section 280A which controls, based on the operational input from the input operation unit 14, transmission of voice input information derived from the voice input unit 17 to the data processing unit 230; a key-input assignment control section 280B which controls correlation between the states of the operation buttons 14A, 14B, 14C, and icon information and cursor displayed on the display unit 13; a data input control section 280C which correlates input information other than the voice information, e.g., hand-written alphabetic character input information, to the fonts on the display unit 13; a hierarchy control unit 280D which performs switching between hierarchical level of the display screen, e.g., from a screen of higher level to that of lower level and vice versa, as well as alternative selection of the hierarchical levels; a mode change-over control section 280E which performs change-over of modes of display of the display screen; a zoom-in/out control section 280F for magnifying or de-magnifying part or whole of the display screen, e.g., variably changing the scale of time axis and variably changing the size of icons in accordance with the change of the scale of the time axis; a scroll control section 280G for controlling scrolling of the display screen; an icon move control section 280H for controlling movement of icon information on the display screen; and so forth.

When the data input control section 280C functions for example, the operation input control unit 280 also performs such functions as to detect the coordinate position of the operational input and to deliver the coordinate position data to the UI processing unit 240, in accordance with the state of the display screen.

The display control unit 260 receives the present state of display from the screen synthesizing unit 252 and reads necessary display images to form a display screen. The display screen thus formed is delivered to the display unit 13.

Thus, the data administration unit 220 serves as the first storage means of the display apparatus in accordance with the invention, while data storage unit 222 including various storage sections serves as the second storage means.

The data administration unit 220 is capable of storing a plurality of kinds of information having different attributes, e.g., mail data (communication information), memo data (input/output data), voice memo data, and so forth. To this end, the data administration unit 220 has a function to sort these plurality of types of information according to the attributes, and is provided with storage sections such as a mail data storage section 220A, memo data storage section 220B, voice memo data storage section 220C, and so on. Each of these storage sections stores, in addition to the display data, attribute information for identifying the type of information such as an extension identifier exclusively used for files containing mail data, an extension identifier exclusively used for files containing memo data, an extension identifier exclusively used for files containing voice memo data, and so forth. The display data also contains a plurality of pieces of time information accompanying the plurality of pieces of information.

The icon character storage section 222B of the data storage unit 222 stores a plurality of types of icon information corresponding to the plurality of types of attributes. The background character storage section 222A stores time axis display data for displaying the time axis, background display data for displaying a time axis display area as a part of the background, background coloring data for coloring the background of the time axis display area, and time-axis coloring data for coloring a region of the time axis corresponding to icon information.

The time axis display data includes: a first hierarchical-level display time axis data which is scaled by hour and used for the display screen of the first hierarchical level; a second hierarchical-level display time axis data which is scaled by day and used for the display screen of the second hierarchical level; a third hierarchical-level display time axis data which is scaled by week and used for the display screen of the third hierarchical level; and a fourth hierarchical-level display time axis data which is scaled by month and used for the display screen of the fourth hierarchical level.

Thus, the controlling means 210 selects, in accordance with the attribute information, icon information corresponding to the attribute of each type of the information, and controls the display on the display screen based on the time information related to each type of information, such that the selected pieces of icon information are arranged along the time axis in accordance with the time determined by the time information. The background character data control section 250A and the display screen synthesizing unit 252 in cooperation form a background display screen generating portion.

If the information is electronic mail information, transmitted or received through the communication unit 15, the header section of the information has receipt time information relating to the time of receipt of the electronic mail. Therefore, the controlling means 210 serves to display icons of electronic mails on the display screen in the order of receipt time.

If the information is memo information which has been input through an input operation, the header section of the information has input time information relating to the time of the input operation. Therefore, the controlling means 210 serves to display icons of memo information on the display screen in the order of the time of drafting of the memo.

If the information is "To do" list information, the header section of the information has designated time information relating to the time of receipt of the electronic mail. Therefore, the controlling means 210 serves to display the icons of the schedule on the display screen in the order of the designated time at which the schedule is to be executed.

Thus, the display apparatus in accordance with the present invention has first storage means, second storage means, displaying means and controlling means.

(Display Processing for Menu Screen)

Referring to FIG. 1B showing an example of the display screen, the background screen is formed by laying out objects around the time axis, and the objects in the background are constituted by envelope icons 74 which give instructions to start up application programs. The content analyzing unit 242 analyzes the contents of appendix information appended as appendix data to the header section of the electronic mail information, e.g., receipt time, file size, and so forth. Then, the character data control unit 250 performs icon display processing based on the appendix information, e.g., receipt time, file size or the like, so as to array the icons in the order of receipt time to indicate degree of urgency or to vary the configuration of the icon in accordance with the file size.

The user can operate these objects by selecting (pointing) one of them by means of the input operation unit 14.

Selection of an envelope icon 74 starts up a corresponding application program related to electronic mails, so that a display window (lower-level menu, lower-level instruction screen) of this application program is opened.

More specifically, when the user selects the envelope icon 74 in an operation world or condition displayed on the display unit 13, the input coordinates with respect to the display on the display unit 13 are detected by the operation input control unit 280, so that corresponding data (application start-up request) is generated based on the present state of the display screen (the fact that the envelope icon 74 is displayed at the input coordinate position). The data thus generated is delivered via the character data control unit 250 to the data processing unit 230. The data processing unit 230 then executes a processing selected from the application programs (programs for electronic mails), and outputs the results of the execution (e.g., completion of start-up of the application).

The character data control unit 250 receives the results of the processing from the data processing unit 230, and determines a state of display, with reference to the rules concerning application start-up accumulated in the metaphor rule accumulating section. More specifically, fonts are synthetically displayed against the background image by the font data control section. The screen synthesizing unit 252 operates in response to instruction given by the character data control unit 250 so as to change the state of operation, and delivers the new state of operation to the display control unit 260. In accordance with this new state of operation, the display control unit 260 reads a required display image, e.g., an application start-up screen, and forms the display screen using this image. The display screen thus formed is delivered to the display unit 13. Thus, the application program start-up screen is displayed as a result of the selection of the envelope icon 74 by the user.

During execution of the application program, the user conducts selection of item from a list in the display screen or objects such as soft button, by means of the cursor, thereby inputting information to the application program. Then, the user gives instructions for processing by selecting objects appearing on successive display screens. When the execution of the application program is finished, the window is closed and the metaphor display screen that was displayed before the start up is recovered. Consequently, details of contents and states are displayed on the display screen, so that the user can visually understand the state of selection and execution of the application program.

In accordance with the received new state of operation, the input operation unit 14 generates data (input of application, etc.) based on the coordinate positions of subsequent inputs made by the user. This data is received by the data processing unit 230 as in the case of the operation following the selection of the electronic mail icon, and is processed as being input data under running of the application program. As a result, the font data control section 250C acquires corresponding font data with which the state of operation is changed by the display screen synthesizing unit 252. The new state of operation thus obtained is supplied to the display control unit 260, whereby the content of display on the display unit 13 is changed.

Instruction given by the user for terminating the running of the application program causes the display screen synthesizing unit 252 to change the state of operation, whereby the window is closed and the main display screen is recovered. The display control unit 260 receives the state of operation changed by the display screen synthesizing unit 252, and changes the state of display of characters (change in image or movement of characters). The state of display thus changed is delivered to the display unit 13. With this series of operations, the user can visually recognize the state of execution of the instruction.

Thus, the described embodiment provides an operation world or condition standardized by the metaphor. This permits easy understanding by the user of the states of execution of the application program. Namely, the user can easily understand the content of the display and operation of the system, based on common knowledge that the user can obtained in his daily life.

By way of example, the scrolling processing is conducted generally based on instruction given through the input operation unit 14. Namely, the scroll control section 280G operates based on the instruction given by the input operation unit 14 so as to cause the update processing unit 244 to update the data, so that the display screen on the display unit 13 is progressively rewritten. It is, however, preferred that this updating operation is conducted in such a manner that the time scale is put one hour ahead to update the time data, while keeping the background image stationary. More specifically, the entire display screen is flushed and the background screen is displayed. Then, data are generated based on a time which is one hour ahead of the present time, and various characters are synthesized in accordance with the data. Consequently, the display screen is moved in one direction, by repetition of update processing performed by the update processing unit 244. In this case, it is also preferred that data is generated only for the display region which has become vacant as a result of the movement. More specifically, it is preferred to prepare and use such an algorithm that the display content common to the display screen before the scrolling and that after the scrolling are held and displayed also after the scrolling, while the area which has become vacant as a result of the scrolling is filled with newly formed display data.

In order to conduct a display processing for changing the color of the background of a certain period of time in which an event is scheduled, it is necessary to conduct an analysis to determine the time of start and the time of end of such a period. Namely, it is necessary to attach the starting time and ending time as appendix data to the body of the data. Alternatively, the starting time and the scheduled time period may be appended in combination. In general, information concerning a scheduled event has a plurality of headers indicating various data such as the number of participants of a meeting, in addition to the data indicative of the degree of importance. It is therefore possible to display the title of the scheduled event and the scheduled time. This display enables the user to grasp the degree of tightness of the schedule.

For the purpose of magnifying/de-magnifying processing, a plurality of magnified or de-magnified character patterns are prepared by the operation of the zoom-in/out control section 280F and the update processing unit 244, and thee character patterns are put on display one by one to change the display screen in accordance with the instruction given from the input operation unit.

A description will now be given of various tables used for displaying menus in connection with the display processing of the initial screen which is displayed in response to turning on of the power and display processing of the main screen, with specific reference to FIGS. 16A to 17B.

FIG. 16B shows a menu data table (table 2) containing menu name data for identifying each menu data, menu form data indicating the form in which the menu is to be displayed, background character data pointers BI1 to BI7, etc., indicative of addresses of background character data to be used as background shown in FIG. 17A, and icon position data indicating the position where the icons are to be placed, in terms of X and Y coordinate values. Preferably, this table further contains lower-level menu number data indicative of menus set in the next hierarchical level and icon number data indicative of icons that are used in the menus of the lower level.

This menu data table defines menus of the main screen and modes of the hierarchical level next to these menus. Icons corresponding to the functions of the scheduler used in this embodiment are displayed in a desk menu.

FIG. 16A shows an icon data table (Table 1) which holds a plurality of pieces of icon data. This table contains function name data showing names of functions of the respective icons, character data pointers DI1 to DI7, etc. that are pointers for pointing addresses of the character data corresponding to the icons shown in FIG. 17B, and function program pointers for pointing addresses of function programs F1 to F9 of FIG. 14 that define the functions of the icons.

Display of the menus is performed based on the data contained in these tables, by a display processing which will now be described briefly.

A reference is made to the menu data table (Table 2 shown in FIG. 16B) to find the menu form of the menu to be displayed. If the menu form is "full screen", the background character data (see FIG. 17A) pointed by the background character data pointer such as BI1 to BI7 is displayed over the entire area of the display screen. When the menu display mode is "pop-up", a window framework of a pop-up window is displayed, and the background character data pointed by the above-mentioned pointer is displayed in this pop-up window. A reference is further made to the menu table (table 2) to find the icon to be synthesized and the icon position data. Then, a reference is made to the icon table (table 1) to find character data (see FIG. 17B) pointed by the character data pointer DI1, DI7, etc., of the icon data corresponding to the above-mentioned icon, thereby assembling the icon to be displayed. The icon thus assembled is displayed on the display screen at the position determined by the icon position data (X1, Y1) shown in the menu table.

When an icon is selected, a reference is made to the function program pointers F1–F8 to find the function program corresponding to the selected icon and the corresponding function program (one of F1 to F9 shown in FIG. 14) is started.

(Mail Processing Section)

The mail processing section 230A of the data processing unit 230 incorporates various means which are not shown, including mail input/output means, mail sending/receiving control means, addressee list administration means, and so on. The mail input/output means has a mail forming processing portion for newly forming a mail, sending operation processing portion for sending the mail, and a mail editorial processing portion for changing the mail addressee list. The mail sending/receiving means includes a mail sending processing portion for sending the mail in accordance with the addressee list, and a mail receiving processing portion which informs the user of receipt of a mail. The addressee list administration means includes an addressee list initializing processing portion for initializing the addressee list, an addressee list addition processing portion for newly adding addressees, and an addressee deleting processing portion for deleting addressees.

(Data Architecture)

A description will now be given of the architecture of data which is stored in the mail data storage section 220A of the storage unit 12 and which is used by the program for performing the above-described display of the window.

FIG. 14 shows the hierarchical architecture of the data stored in the mail data storage section 220A.

Referring to FIG. 14, the storage unit 12 has an administration section 22A, application programs F1 to F9, various tables inclusive of the tables 1 and 2 described above, data storage section 222 containing character data 222A, 222B and font data 220C, and the data administration unit 220.

An information recording medium in accordance with the present invention for storing at least information for generating display image can be implemented by a medium that contains at least various types of information shown in FIG. 14.

A plurality of pieces of attribute information for identifying a plurality of types of information, a plurality of pieces of time information relating to a plurality of pieces of information and so forth are stored in the header sections. A plurality of types of icon information corresponding to the plurality of pieces of attribute information are stored as icon character data 222B, while the time axis display data representing the time axis is stored as the background character data 222A. Pieces of icon information corresponding to attributes of a plurality of types of information are selected based on the attribute information. The selected pieces of icon information are arranged along the time axis at positions in accordance with the time based on the time information related to each of the plurality of types of information. A program for implementing such selection and display is stored as an administration program 22A.

The data administration unit 220 includes the mail data storage section 220A, memo data storage section 220B, database data storage section 220C, and so forth.

The mail data storage section 220A includes a plurality of files 1, 2 and so on. Each file has header portions 220A-1, 220A-2, 220A-3 and so on, and an actual data portion 220A-15 which pertains to the content of the file. The header portion 220A-1 (header 1) stores receipt time information, header portion 220A-2 (header 2) contains file size information, and the header portion 220A-3 (header 3) contains a name (ID).

The mail data storage section 220A is provided for each of nodes formed in the display window. The mail data storage sections 220A thus provided are stored in the storage unit 12. More specifically, the mail data stored in the mail data storage section 220A includes various pieces of information such as the file size, time and data of receipt, name (ID), bit map data of photograph (or pictorial letter) of the sender's portrait, position of display of the photograph, size of the photograph, time and data at which the mail was read, time and date of transfer, position of display of the mail display window, size of the mail display window, position of the time display to be made at a lower part of the mail display window, size of the region of the time display, size of the fonts indicating the time, size of the fonts of the alphabetic characters showing the content of the mail, actual data related to the content of the mail (data body), list of senders, transfer destination list (directory, addressees, etc.), attributes, pointer for pointing an icon, comments, and so forth. In this embodiment, these various kinds of attribute information other than the actual data (body of the data) are stored in headers 1, 2 and so on in the order of the hierarchical level and the above-described header analyzing section 242A analyzes the contents of these headers.

Preferably, additional tables are provided such as a window administration table for mail display window, addressee list administration table, or the like.

The name (ID) is the identifier that identifies the user. Usually, user's actual name or nickname is used as this identifier. The address to which the mail is to be sent is set up as the addressee. In ordinary electronic mail, the mail address is the information that appoints a position in the storage portion where the mail is to be stored. The user can grasp the state of arrival of mails directed to the user, by making access to this storage position. The time and data at which the mail was read are given by means of the real time clock available from the time measuring unit 11. The data and time at which the mail was read for the first time are set as the data of the time and date of reading. If the mail is sent (transferred or sending back) in accordance with a predetermined addresses list, the time and date of such sending are stored as the time and date of transfer. A flag indicating whether or not the receiving party as the node corresponding to the data architecture is capable of editing the addressee list, or whether or not such a receiving party is present, is set as the attribute. The coordinate positions at which a train of alphabetic characters, icon or the like shown by the node corresponding to the data architecture are to be displayed in the display window, as well as the size of the character train and the icon, are set as the display coordinates and size. The pointer pointing the region storing the icon image (image information or character data) of the icon corresponding to the data architecture displayed in the display window is set as the pointer for the icon. Any comment which the user would like to input is set as the comment. The number of these entrants may be variable.

The window administration table is a group of data sets used for displaying the windows on the display screen, and is stored in the storage unit. The window administration contains items concerning each window such as the name of the window, coordinates of the window and breadth and height of the window determined in terms of number of pixels. The data sets constituting the window administration table includes the items described above for a plurality of types of windows such s the message display window, directory display window, and so forth.

The mail data storage section 220A has an addressee list administration table that holds various kinds of information concerning all the registered users. Various kinds of information thus held are displayed in a window in the form of a list or tale. The table has items such as names, addressee's addresses and so on. Thus, the table is constituted by data sets each containing the above-mentioned items of each registered user.

(Operation of the Portable Device)

FIG. 18 shows a flowchart illustrative of the operation of the portable device. When the CPU is started up by turning on of the power supply, the CPU of the portable device operates in accordance with the boot program stored in the storage unit, so as to make access to the PC via the communication unit, thereby reading necessary data stored in the storage unit including the OS for the terminal device, protocols and so forth.

Then, the display unit 13 of the portable device 1 displays an initial screen as shown in FIG. 1A. Then, a main screen is displayed in which icons to which functions have been assigned in accordance with the data are displayed as characters within the display area of the main screen. The user therefore can visually and instantaneously understand the functions. It is thus possible to obtain a portable device which is easy to use. The characters displayed in this embodiment may be still pictures or, if necessary, moving pictures.

More specifically, when the power is turned on, the initial screen is displayed (Step S1, hereinafter simply represented as "S1"). In response to an operation through the input operation unit (S2), the main screen is displayed (S3). The display of the main screen is conducted in accordance with display information given by the first display setting unit 210A shown in FIG. 3. More specifically, the CPU 18 shown in FIG. 2 reads the display information concerning the main screen stored in the storage unit 12 and transfers the display information to the display unit 13, whereby the main screen is displayed.

The appearance of the main screen is as shown in. FIG. 1B. The user can select any one of the menus which divides the main screen.

More specifically, Step S3 which displays the main screen performs processing which is shown by flowcharts in FIGS. 20A and 20B. If any operation has been performed, a situation occurs requesting updating of the display screen. Then, whether or not the main screen is to be updated is determined (S30) and, if the main screen is to be updated, a background display processing is conducted (S32) in order to update the screen. This processing is to process the background display for the purpose of generating a main screen and, therefore, can be executed by pasting the background screen character data BI1, B17, etc. of FIG. 17A to the screen at specified positions.

A question is posed (S33) inquiring whether there is any mail. If the answer is "Yes", a window as shown in FIG. 12A is displayed on the display screen, thereby notifying the user of the presence of the mail information. This notification is conducted only when the mail is received by the portable device. Therefore, whether or not the display is made for the first time is determined (S34a) and the photograph of the mail sender and the topic are temporarily displayed for a predetermined period, e.g., one second or so, followed by automatic extinction processing to extinguish the display (S34b).

The content of the mail is then analyzed (S35). More specifically, the body of the data which is the content of the mail message is processed (S35a). To this end, for example, the data is stored in the mail data storage section 220A of the data administration unit 220 of the storage unit 12. As in the case of an electromagnetic signal shown in FIG. 15, the data is headed by a plurality of header sections (220A1,220A-2 to 220A-N). Various kinds of information, e.g., name of the sender of the mail, receipt time and so forth carried by these header sections are then read and analyzed by a header analyzing section 242A (S35b). The size of the file, which also is included in the appendix data, is analyzed (S35c).

Although not described in detail, further analysis of the header information is conducted to identify, for example, the name of the sender of the mail.

The background character data control section 250A and the icon character data control section 250B shown in FIG. 4 then operate so that corresponding characters in the form of bit map images are selected from among a plurality of characters constituted by bit map images, whereby an electronic mail icon is synthetically displayed against a background image (S36).

Then, a check is conducted as to whether there is any other mail (S37) and, if any other mail exists, Steps S34 to S36 are repeated, whereas, if thee is no other mail, the process pauses (Steps S30 and S31 are repeated) until any update operation is conducted. Thus, the program is held in a waiting condition until any key-input is received. These Steps are repeated until all the mails are processed. Consequently, electronic mail icons are displayed against the background image.

The program may be such that Step S35 determines the degree of urgency based on the order of receipt time and assigns a first type of icon to a mail which has a high degree of urgency and a second type icon to a mail which has a low degree of urgency. To this end, the header analyzing section 242A sets a threshold time which is a predetermined length of time aback from the instant time, and sorts the mails such that the mails received after the threshold time have higher degree of urgency, while the mails received before the threshold time are of lower degree of urgency. Based on this analysis and sorting, the character data control section 250 performs a control so as to display the desired types of electronic mail icons.

The header section of each electronic mail carries time information such as the time of drafting of the electronic mail, so that the plurality of electronic mail icons can be pasted on the time axis in accordance with the time information.

FIG. 21B shows a flow for processing a memo (schedule). As in the case of the processing of electronic mail, an inquiry is made as to whether or not a demand exists for changing the main screen (S41) and, if such a demand exists, a background display processing is performed (S42).

Then, an inquiry is made as to whether or not a memo exists (S43). If the answer is "Yes", a window for displaying a memo is set up on the display screen (S44).

Step S43, inquiring whether there is any memo, may include a sub-step which poses a question "What type of memo?".

Then, analysis of the content is executed (S45) as in the case of the aforesaid Step S35 which analyzes electronic mails. Since the header section of the memo carries time information such as the time at which the memo was written, schedule icons corresponding to a plurality of memos can be pasted on the time axis at positions corresponding to the times. If the memo data includes text data as the body of the data, such a body of the data is delivered to the font data control section 250C which, in cooperation with the font data storage section 222C and the data processing section 230, extracts font data corresponding to the body of the data, and delivers the font data to the screen synthesizing unit 252. The font data storage section contains font data such as 1,2,3,4 etc. and A,B,C,D, etc. These font data are extracted one by one and pasted on the schedule icon, whereby alpha-numeric character information is produced (S46). The font data stored in the font data storage section are not limited to "Mincho" fonts and "Gothic" fonts. For instance, various fonts data simulating various hand-written letters may be stored in the font data storage section.

Subsequently, a determination is made as to whether or not any other memo exists (S47) and, if any, Steps S44 to S46 are repeated, whereas, if there is no other memo, the process waits (S40 and S41 are repeated) until any update request is received. These Steps are executed until processing of all existing memos is completed, whereby a plurality of schedule icons are displayed side by side, as shown in FIGS. 1A and 1B.

The processes described hereinbefore with regard to the processing of electronic mails and memos can be applied to the display processings for icons of different kinds of information, e.g., memo icons, schedule icons, voice memo icons, etc. Detailed description is omitted with regard to such processings.

The icon character data control section may be arranged such that it selects, based on the file size analysis, either one of a first type of icon and a second type of icon. For instance, when the file size exceeds a predetermined size, the first type icon is selected, otherwise the second type of icon is selected. Thus, first type of icons and second type of icons are displayed according to the sizes of the files.

In the background processing performed in each of Steps S32 and S42, the time axis is displayed on the main screen. A description will now be given of a flow for generating this time axis, with specific reference to a flowchart shown in FIG. 21A.

Step S50 poses a query as to whether or not any request for updating exists. If there is any instruction given through the input operation unit, such as scrolling, zoom-in/out, switching of display mode or the like, a display region (display scale) in a standard-size display is determined (S51) and the time axis is synthesized and displayed on the background in accordance with this scale (S52). Subsequently, the present time is confirmed (S53). Then, the time to be displayed at one end of the time axis, the time to be displayed at the other end of the time axis, and the position of an arrow indicating the present time are determined based on the display scale and the present time (S54).

Thereafter, the portion of the background image which is aback from the present time, i.e., the past region, is colored (S55). The present time advances by the operation of the time measuring unit. Obviously, the display of the time axis is momentarily updated in accordance with the lapse of time measured by the time measuring unit. This gives an impression to the user as if the time axis and various kinds of information on display are moved on the display screen in accordance with the lapse of the time.

In this embodiment, the time axis is displayed in the form of a train of a plurality of consecutive squares each corresponds to a unit time. The portion of the background image corresponding to a square containing a scheduled time is colored. This operation is conducted in the background processing shown in FIG. 21B, corresponding to Step S32 or S42 in the flowchart of FIG. 20A or FIG. 20B. More specifically, as shown in a flowchart in FIG. 21B, characters are synthesized and displayed at positions corresponding to the scheduled times along the time axis (S60), and the corresponding squares of the time axis and the corresponding portions of the schedule display area are colored (S61).

Referring again to FIG. 19, once the main screen is set up through the process described hereinbefore, the program holds "waiting state" until any new operation is made through the input operation unit. If an operation is made to reset the display screen, the display returns to the initial screen (S4).

If an instruction is given through the input operation unit for changing the mode of the display (S6), the mode change-over section 280E shown in FIG. 4 operates to display the background image in each display mode (S7). This mode changing instruction is input through the input operation unit, more specifically by moving up and down a slider of the input operation unit. The background image processing in Step S7 is materially the same as the main screen display processing (S3). More specifically, the processings for synthesizing and displaying the icons and the time axis are substantially the same as those in Step S2 (more specifically Steps S30 to S37 of FIG. 20A and Steps S40 to S47 of FIG. 20B), although Step S7 employs background characters different from those used in Step S3. The processing of Step S7 is therefore not described in detail.

If an instruction is given through the input operation unit for resetting the display, the main screen is recovered (S8), otherwise the present state is held until a further input is made through the input operation unit.

If a scrolling instruction is input through the input operation unit (S110), the scroll control section 280G shown in FIG. 4 operates to display a new background image corresponding to the state after the scroll (S11). This scrolling instruction is input by moving the cursor on the display screen, through the operation of the input operation unit. In this case also, the background processing of Step S11 is materially the same as the main screen display processing (S3). Namely, processings for synthesizing and displaying the icons and the time axis are the same as those of Step S2 (more specifically Steps S30 to S37 of FIG. 20A and Steps S40 to S47 of FIG. 20B), although Step S11 employs background characters different from those used in Step S3. The background processing of Step S11 is therefore not described in detail.

If an instruction is given through the input operation unit for resetting the display, the display screen of the selected mode is recovered (S12), otherwise the present state is held until a further input is made through the input operation unit.

If a zoom-in/out instruction is input through the input operation unit (S14), the zoom-in/out control section 280F shown in FIG. 13 operates to display a new background image corresponding to the state after the zooming-in or zooming-out (S15). The zoom-in/out instruction is input through the operation of the input operation unit by operating a predetermined portion of the input operation unit. In this case also, the background processing in Step S15 is almost the same as the main screen display processing (S3). More specifically, processings for synthesizing and displaying the icons and the time axis are the same as those in Step S2 (more specifically, Steps S30 to S37 of FIG. 20A and Steps S40 to S47 of FIG. 20B), although Step S15 employs the background characters and icon characters of sizes different from those of Step S3. The processing of Step S15 is therefore not described in detail.

Thereafter, the process holds the present state until a new key-input is received. When a new key-input is detected, the process determines whether or not the key input is intended to dismiss the zooming of the display.

If an instruction is given to reset the display screen, the scrolled display screen is recovered (S16), otherwise the process holds the present state until a further input is received through the input operation unit. If a further instruction for changing the display mode is received, one of the above-described operations (S5, S4, S13, S17) is performed.

If no instruction for changing the display screen is received, a routine "A" (S18) is executed, in accordance with a flow which will now be described with reference to FIG. 19. Since various kinds of icons are on the display screen, an inquiry is made whether or not the user wishes to select one of the icons (S19).

The selection of an icon is conducted by moving the cursor on the display screen through an operation of the input operation unit, so as to place the cursor on a desired icon, followed by a clicking operation. Consequently, an answer "Yes" is given to the question of Step S19 of the flow shown in FIG. 19. For instance, information concerning the icon selected by the operation of the input operation unit is delivered from the second display setting unit 210B to the third and fourth display setting units 210C, 210D. Upon receipt of this information, the third display setting unit 210C determines whether there are a plurality of lower-level menus associated with the selected icon (S20). If the third display setting unit 210C has determined that there are such lower-level menus, these menus are displayed on the display screen of the mode which has been selected. More specifically, the third display setting unit 210C operates to open a window in the display screen and displays the lower-level menus side-by-side within the opened window. For instance, if Step S19 has selected a "red pigeon" icon from among the upper-level icons shown in FIG. 10, the third display setting unit 210C operates to display the lower-level menus corresponding to this icon, i.e., an "electron icon display screen 1". (S21).

Selection of one of the displayed lower-level menus can be conducted by operating the input operation unit, as in the case of the selection of the icon. When one of the lower-level menus has been selected through the operation of the input operation unit, an answer "Yes" is given to the question posed in Step S23, and information concerning the selected menu is delivered from the third display setting unit to the fourth display setting unit, whereby the process proceeds to Step S24. Step S24 is executed also when the answer to the question given in Step S20 is "No". It will be seen that, when an object having no lower-level menu is selected in Step S19, the answer in Step S20 is "No". In this case, the fourth setting unit understands that a set display screen corresponding to the selected icon exists, based on the output from the second display setting unit. Steps S24 onwards are therefore executed by the functions of the fourth display setting unit. Alternatively, the process may be modified such that the third display setting unit informs the fourth display setting unit that there is no lower-level menus associated with the selected icon.

One of a plurality of items is selected as a result of the processings conducted in Steps S19 through S24. Thereafter, Steps S25 onwards are executed by the functions of the fourth display setting unit. Thus, the fourth display setting unit operates to display a setting display screen which corresponds to the selected item. The user can input various instructions or selections by moving the cursor on the display screen through the operation of the input operation unit under the control of the data input control section 280C, followed by clicking operation. When such an instruction is given through the operation of the input operation unit, an answer "Yes" is given to the question posed in Step S25, so that the information of the instruction is displayed on the setting display screen (S26). When the input operation is terminated by an operation which will be described later, an answer "Yes" is given to the question of Step S27, so that Steps S3, S7, S11 or S15 is executed to recover the main screen. The setting screen displays also other lower-level menus of the same hierarchical level. If another lower-level menu is selected on this setting screen, an answer "Yes" is given to the question posed in Step S28, so that the process returns to Step S21 which displays the setting screen corresponding to the selected lower-level menu. Steps S25 to S27 are repeated when the answer is "No" in Step S28 or S27.

In accordance with the operation of the input operation unit 14, the screen hierarchy control section 280D controls the hierarchy of the upper- and lower-level menus set by each of the first to fourth display setting units.

In order to move an icon to a desired position, the icon move control section 280H operates in accordance with an operation of the input operation unit. Based on this control, a character data control section of the UI processing unit 240, e.g., the icon character data control section 250B, operates to identify the icon and to determine the position at which the icon is to be pasted, and the information concerning the icon and the pasting position is delivered to the display unit.

Inputting of information by way of voice is conducted through a voice input unit 27, which is enabled also by an operation of the input operation unit 14. More specifically, voice information is moved by the voice input control section 280A to the data administration unit. When a designated time has come, a voice output control unit 270 produces voice information which has been stored, in accordance with an operation of the input operation unit. The voice information thus produced is delivered to a voice output unit 20 and is sent also to the display unit via the display control unit, whereby information related to the voice information is displayed.

FIG. 24 shows a hierarchical structure of the display for implementing the above-described control. This hierarchical structute permits switching between the detabase display mode and the schedule mode.

FIGS. 26A to 26C show display processing performed for zooming the display screen while scrolling the same. In order to conduct the scrolling processing, the cursor button 14A which is the Rugby-ball-shaped operation member is rotated (S100) as shown in FIG. 1B, and the direction of rotation of this operation member is determined by a routine "A" (S101).

More specifically, in the routine "A" conducted in Step S101, a determination is made first as to whether the cursor button has been rotated clockwise or counterclockwise (S110). If the rotation direction is counterclockwise, the amount of rotation, e.g., angle of rotation or number of revolutions, of the counterclockwise rotation is detected (S111a). Then, the distance to be traveled by the cursor on the display screen corresponding to the detected amount of rotation is calculated (S112a) by using data in a rotation amount vs. scroll amount conversion table which is stored in the storage unit. Then, an updating processing for moving the display screen by an amount corresponding to the calculated amount of scroll is effected by the display control unit (S113a), whereby the display screen scroll processing (S102) is reached.

Preferably, the update processing for the scrolling of the display screen is conducted as follows. When the amount "X" of scrolling, i.e., the amount of horizontal movement, of the display screen is smaller than the horizontal size "X1" of the display screen, it is not necessary to update the portion of the old data corresponding to the region "X1–X". In such a case, the image in the region "X1–X" is held without being updated, and the new display data is added only for the region "X" which is newly brought into the display screen. This way of processing provide a greater speed of the scroll processing.

When the direction of rotation of the operation member has been determined as being clockwise in Step S110, Steps S111b to S113b, similar to Steps S111a to S113a described before, are executed. Although Step S152b uses a rotation amount vs. scrolling amount conversion table exclusive for the clockwise rotation, it is possible to arrange such that both Steps S112a and S112b use a common conversion table.

Then, display processing is conducted to effect the scrolling of the display screen (S102). Then, a determination is conducted as to whether the rotation of the cursor button 14A has been ceased (S103), followed by execution of a routine "B" (S104).

The cursor button 14A of the input operation unit used in this embodiment is capable of effecting zooming-in or zooming-out of the display area and vertical movement of the black bar (cursor) by being pushed up and down, in addition to the scrolling processing which is effected by the rotational operation of this operation member. The following routine "B", therefore is conducted in accordance with the operational input given by the cursor button 14A.

In the routine "B" executed in Step S104, if the cursor button 14A has been pushed downward or upward (S120) as shown in FIG. 22C, a determination is made as to whether the direction is upward or downward (Step S121). If no operation has been made, the routine "B" is terminated. If Step S120 has determined that the cursor button 14A has been pushed upward, a display processing is performed so as to enlarge the lower display region (S122). Conversely, if downward pushing is confirmed, a display processing is executed so as to enlarge the upper display region (S124). If no further enlargement, i.e., zooming-in operation, is necessary, the routine "B" is terminated, otherwise Steps S121 onwards are repeated (S125).

As will be seen from the foregoing description, the display apparatus of the third embodiment enables administration of formed or received data according to the time of formation or receipt by correlating the data to the time axis on the display screen. This permits an easy retrieval of data by using time information as a key, without requiring complicate hierarchical structure.

The display apparatus of this embodiment also permits various data intentionally to be moved to corresponding time points on the time axis, whereby a list or schedule table is obtained. In addition, since the time axis moves together with the display data indicating events or occurrences as the time lapses, it is possible to easily recognize the objective events or occurrences in relation to the present time.

Furthermore, since the time axis and the past and future time regions are displayed in different colors or by black-and-white inversion. The present time can be displayed in the form of a border line which is pasted in a specific color and which separates the past and future time regions from each other. It is therefore possible easily distinguish the past time, present time and the future time at a glance on the display screen.

It is possible to adjust the scale of the time axis, i.e., to zoom-in or zoom-out the image of the time axis. At the same time, zooming of the time axis is possible in each of the month, week, day and hour display modes. Further, the display content may be zoomed-in or zoomed-out in relation to the scaling of the time axis. Further, the range of display of the data can automatically be varied in accordance with the scale of zooming, e.g., 5 hours, 12 hours and one week.

Minute display image of data accompanying each event of the schedule may become legible or illegible when the scale of the time axis is enlarged or contracted. Even when such minute image has become illegible due to reduction of the time scale, presence of such image data is expressed in terms of solid area which indicates the volume of the data. The user therefore can recognize tightness of the schedule.

In the illustrated embodiment, the table correlating the amount of rotation of the rotational input member to the amount of scrolling is set such that three full revolutions of the rotational input member causes the display screen to move several centimeters. This, however, is not exclusive, and other arrangements may be used for implementing the scrolling function. For instance, a rotation angle detector is connected to the CPU, and a rotation angle vs. horizontal movement conversion table, defining the relationship between the angle of rotation of the rotational input member and the amount of horizontal movement of the display screen, is stored in the storage unit. The CPU in such a case serves also as a rotation angle-horizontal movement conversion control means which produces the amount of horizontal movement of the display screen based on the detected rotation angle of the rotational input member, by making reference to the rotation angle vs. horizontal movement conversion table.

The above-described software arrangement, memory map and so forth can obviously be applied not only to the described portable device but also to various other types of information processing apparatus such as a PC, EWS and so forth.

Second embodiment

A second embodiment of the display apparatus in accordance with the present invention will be described with reference to FIGS. 23 to 33. Portions of the second embodiment equivalent or similar to those of the first embodiment are not described, in order to avoid duplication of the description. In the second embodiment, the display screen is formed as shown in FIGS. 23A and 23B.

Referring to these Figures, the input operation unit 301 as the input operation means of the portable display device 300 of this embodiment has a crown 301A which serves as a first operating portion or a rotational input portion, a zoom-in button 301B constituting a second operating operation and disposed on the upper side of the crown 301A as viewed in FIG. 23A, a zoom-out button 301C serving as the third operating portion and disposed on the lower side of the crown 301B, and a function button 301D serving as a fourth operating portion and disposed at a lower portion of the display unit, and a recording button 301E.

The crown 301A permits two types of operation, i.e., rotational operation in clockwise and counterclockwise directions as indicated by arrows R and S, and push-pull operation as indicated by a double-headed arrow T, as shown in FIG. 23A. The rotational motion of the crown 301A causes a cursor to move up and down (U, V). Upward (U) or downward (V) scrolling of the display screen is commenced when the cursor has reached the upper or lower end of the display screen.

The zoom-in button 301B is used for switching of schedule displaying mode over a 5-hour mode, 12-hour mode, 1-week mode, 1-month mode and 1-year mode. Switching back from one to the preceding mode is effected by operating the zoom-out button 301C. The zoom-out button 301C also enables selection of icons to cause the display unit to display lower-level menu screens. Simultaneous pressing of zoom-in and zoom-out buttons 301B, 301C causes resetting to the one-day 5-hour mode which shows also the instant time, regardless of the type of the display screen displayed when these buttons are pressed simultaneously.

The 1-week mode of the schedule display shows the electronic mail icons 360 and the voice memo icons 350 simply positioned along the time axis, but does not show details of the schedule. When the user wishes to search for a time band in which an event of an interest is scheduled, the user moves the cursor to the week displayed in the 1-month mode and magnifies the appointed week by operating the zoom-in button 301B, as shown in FIG. 26D. Then, the user selects the date which is contained in the magnified display of the week and magnifies the information on the selected data by using the zoom-in button 301B, whereby the user can make access to the time band of interest, as shown in FIG. 26C.

Referring to FIG. 23B, a schedule display screen as a main screen obtained in a schedule displaying mode 310 has three display areas: namely, a schedule date display area 312, a time axis display area 320, a schedule display area 330 and an instant time display area 316, which are arranged in the mentioned order from the left to the right as viewed on the Figure. The time axis and the schedule are displayed such that future time and schedule are shown at the upper side and past time and schedule are shown at the lower side of the display screen, and the border line which separates the future time and the past time indicates the instant time. The background of the lower area below the border line may be colored in, for example, gray.

At a lower part of the display area of the display unit 303, formed are voice memo icons 350 and a stack of electronic mail icons 360, whereas, in upper part of the display area, formed are "To do" list icons 336A to 336D. A schedule icon 334 is formed in the display area 330.

The "To do" list icons 336 shows future events or tasks so that they are displayed in an array at an upper right corner of the display area allocated for future events. The size of the "To do" icons 336 is correlated to the degree of importance or degree of urgency of each item represented by this icon. These "To do" icons are arrayed in an order such that the earlier event or task appears at the left side.

The described display screen has a unique feature that the icon information, e.g., the schedule icon 334, "To do" list icons 336A and so forth shown in FIG. 1B are progressively enlarged as the due time approaches. The size of the voice memo icon 350A is varied such that the size of this icon is large when the recording time is long. The user therefore can remember or recall the content of the voice memo solely by recognizing the size of the icon.

The electronic mail icons 360 are displayed in a stacked manner so as to contain overlapping regions. Thus, a multiplicity of icons of the same kind are stacked on display one on another, enabling displaying of a multiplicity of icons. With this function, the user can visually and roughly grasp the number of received electronic mails, at a glance of the size of the stack. The number of the icons that can be stacked on the display, however, is limited. Electronic mails received after a predetermined number has reached are handled as "many mails".

Clicking a "To do" icon 336 opens a window which presents a display screen as shown in FIG. 29A. The user can select "DONE" 338A or "NOT YET" 338B by pushing or pulling the crown 501A. A subsequent selection is made through the zoom-in button 301B. When the DONE tab 338A is selected, a check mark 389 as shown in FIG. 29B appears on the display. Means are provided for displaying the window as if the window is exploding, thereby giving a feel of achievement of the task "To do" to the user.

The voice memo icons 350 are arrayed at right lower corner of the display screen, because these memos are events conducted in the past.

When the user selects the voice memo icon 350 by means of the zoom-in button 301B and opens the window of this icon, a bar graph appears in an upper part of the window to indicate the date and time of writing (recording) of the memo, as well as the time length of recording, as shown in FIG. 30A. This triggers the user to recall the content of the memo, without necessitating reproduction of the recorded information.

At a lower part of the window, there are shown icons "DISPOSE" 352A, "REPRODUCE" 352B and "MOVE TO TIME AXIS" 352C which enable the user to select how to deal with the memo.

The user then inverts the icon of interest by a push or pull of the crown 301A, and selects the inverted icon by means of the zoom-in button 301B which has a selecting function. If there is no need for making access to the memo, the user presses the zoom-out button 301C which has a canceling function, so that the window is closed.

Selection of "MOVE TO TIME AXIS" 352C causes the cursor to trap the voice memo icon 350A to make it blink. The user then rotates the crown 301A to "drag" this icon to the time axis and pastes it to the time axis by pressing the crown 301A.

Then, pressing of the zoom-in button 301B opens a window which enables setting of desired date and time and selection of a desired notification means such as alarming tone, beep, vibration or the like. After confirmation of date and time and selection of the notification means, a voice memo icon 350C is placed on the schedule (see FIG. 30B).

The notification unit is switchable to select one of three portions: namely, a first notification portion that performs notification in accordance with the state or condition of the user, a second notification portion that performs the notification based on the content of the information, and a third notification portion that performs notification in accordance with the degree of importance or urgency. For instance, weak blinking is selected for a time period in which the user is sleeping. In case of a meeting, arrival of a mail is notified by way of vibration rather than sound, so as not to disturb the meeting. It is possible to arrange such that a notification of arrival of a mail is made by voice which announces the name of the user. Various other notification means are usable such as tone changing means, voice changing means, vibration generating means, smell generating means, light generating means, electricity generating means for giving an electrical shock, and so forth.

For the purpose of recording a voice memo, the user presses the recording button 302, thereby opening a window as shown in FIG. 32A, whereby the device is ready for recording the user's voice. Upon recognition of the voice, the "RECORD" display screen 422 starts to blink as shown in FIG. 32B to indicate that the voice is being recorded. The lapse of time during the recording is indicated by a bar. When the user stops to speak, the recording is automatically ceased, and a next window 424 of a low-level is opened. As shown in FIG. 32C, the window 424 shows the date, time and time length of recording. One of subsequent operations such as "ERASE" 426C, "REPRODUCE" 426B and "MOVE TO TIME AXIS" 426A is selectable by push-pull operation of the crown 301A and operation of the zoom-in button 301B. Pressing of the zoom-out button 301C causes the display to be reset to the schedule display screen.

Arrival of an electronic mail to a desktop or note PC or to a server is informed also to the portable device. More specifically, an electronic mail icon 360 appears at the position of the instant time and blinks, as shown in FIG. 31A. Pressing of the zoom-in button 301B causes a window 361 of a lower-level menu to appear, indicating the nature of the mail such as "URGENT" 361B or "R.S.V.P.". This window 361 also displays a photo 361A of the sender's portrait, as well as a summary 361C of the content of the message.

An additional pressing of the zoom-in button 301B causes a lower-level menu screen 362 to appear as shown in FIG. 31B, showing the time and date of the receipt, as well as the sender's name. Icons "INSPECTED" 363B and "MOVE TO TIME AXIS" 363A are selectably displayed at a lower part of this window 362. Selection of "MOVE TO TIME AXIS" enables the user to be notified when the designated time has come.

Various icons described hereinbefore can freely be pasted on the time axis, so as to be incorporated in the schedule in the order of time. For instance, in the display screen shown in FIG. 30C, the voice memo icon 350B appears also along the time axis.

In this embodiment, the voice memo icon 350 and the electronic mail icon 360 are positioned along the time axis according to the input time and arrival time. This embodiment, however, may have a catch-net metaphor function in which events of times preceding the displayed time are collected in a lower region of the schedule display screen.

FIG. 28 shows an initial screen displayed in a sleep mode after turning on of the power supply. In this sleep mode, the lower region indicating the instant time 518 is widened to spread over a substantial area of the screen in a manner like a lower eyelid. This spread region additionally indicates the remaining capacity of the battery. The sleep mode display may be such one as to completely cover the display area or to expose a portion of the schedule display region over a period of, for example, 2 hours from now on. In the latter case, the user can confirm the schedule in forthcoming two hours or so, without switching the display to the main screen. This sleep mode darkens the display so as not to allow any other person to look into the user's schedule. The schedule display area may be darkened out for the security purpose. Icons on display however, remain on the display to allow the user to confirm whether there is any task or event. The bar graph appearing on the right end indicates the level of charging of the battery.

As in the case of a screen saver, the schedule display mode as shown in 36B can be recovered when any switch is operated. Suspension of operation over a predetermined period causes the display to the sleep mode again.

(Scrolling)

The screen can be scrolled by rotating the crown as shown in FIG. 28. The arrangement is such that the speed of rotation of the crown corresponds to the speed of the scrolling.

Referring to FIG. 33A, for the purpose of scrolling, the crown is rotated (Step S130), and a routine "A" (Step S131) is conducted to determine the direction of rotation.

In the routine "A", whether the direction of rotation is upward or downward is determined (Step S140). When the direction is upward, the amount of the upward rotation, e.g., angle of rotation or number of revolutions, is detected (Step S141a). Then, the amount of scrolling to be performed on the display screen corresponding to the detected amount of rotation is calculated (Step 142a) by making reference to a rotation-scroll conversion table which is prepared beforehand and which indicates the relation between the amount of rotation and the amount of scrolling. The display control unit then performs a screen moving operation (Step S143a), i.e., screen updating operation, to scroll the display screen by the amount calculated in the preceding step. The scroll processing (Step S132) of the main flow is thus reached.

The display screen updating processing for the scrolling purpose is preferably such that, when the amount Y of upward movement of the screen is smaller than the size Y1 of the display screen, the region Y1-Y of the old data, which need not be updated, is left on the screen, and only the region Y to be newly displayed is displayed above the region Y1-Y in which the old data remains.

Such a processing effectively enhances the speed of the scrolling processing. When the rotation of the crown is downward in Step S 140, steps S 141b to S 143b, similar to Steps S 141a to S 143a, are executed. Although Step S 112b refers to a rotation-scroll conversion table prepared specifically for downward rotation, it is possible to arrange such that a common conversion table is used both for upward and downward rotations.

Display processing regarding the scroll processing is then executed (Step S 132). Thereafter, Step S 133 is executed to confirm stopping of rotation of the crown 301A, followed by a processing "B" (Step S 134).

In this embodiment, the crown 301A can effect scrolling operation by being rotated and, in addition, left and rightward cursor moving processing by being pushed and pulled. The following processing "B" therefore can be conducted by using the crown 301A.

Referring to FIG. 33C, the routine "B" in Step S 134 begins with Step S 150 which determines whether or not any push/pull operation of the crown 301A has been made. If no operation is confirmed, the routine "B" is ceased. However, if the crown 301A has been pushed or pulled, the process advances to Step S 151 which detects the amount of movement of the crown 301A. Then, the amount of movement of the cursor is calculated (Step S 152) based on the amount of movement of the crown 301A, by referring to a correlation table, and a processing is performed to move the cursor (Step S 153). Subsequently, various display processings are conducted (Step S 154) through the operation such as clicking and dragging using the cursor. The process then proceeds to Step S 155 which determines whether or not a further movement of the cursor is necessary. If Step S 155 has determined that a further cursor movement is necessary, Steps S 150 onwards are executed again, otherwise, the routine "B" is ceased.

As shown in FIGS. 26A to 26D, when scrolling the display screen, the scale of the schedule can be switched over to select one of the 5-hour mode, 12-hour mode, 1-week mode and 1-month mode. Therefore, the balance of display area between the data display, time display and the schedule display, in particular the width of the time axis (width of the time axis display area 30), is progressively reduced in the order of G1 to G2 to G3 to G4. At the same time, the width of the non-colored area for the schedule display is reduced from H1 to H2, while the schedule date display area is enlarged in the order of F1 to F2 to F3 to F4. The user therefore can visually understand that the time scale has been compressed, without difficulty. The number and size of the fonts describing the title of the schedule are also varied in accordance with the change in the time scale.

When the first information in the lower hierarchical level of an item of the schedule has a specific relation to an information, e.g., address information, stored in the portable device, an automatic correlating operation is performed so that the related information is displayed in the same column as the schedule item on the display.

(Database)

Selection of the function button 301D switches the operation to a database mode, so that a database menu screen 372 (with one of the first display segment regions enlarged) appears as shown in FIG. 27A. The database menu screen 82 displays five categories: namely, "PEOPLE" 372A, "OFFICE" 372B, "PROJECT" 372C, "SYNCHRONIZE" 372D AND "REFERENCE" 372E. A desired category can be inverted by rotating the crown 301A. In the embodiment shown in FIG. 27A, the category "OFFICE" 372B has been inverted. Pulling of the crown 301A causes the inverted category to be selected and switches the display to a lower level of hierarchy. As a result, an initial selection screen 384 comes into the display screen from the right side thereof. This display screen 384 is of a lower hierarchical level and contains a list of names arranged in alphabetic order. Meanwhile the menu selection region 382 of the higher hierarchical level, showing the categories for selection, is pressed towards the left end of the display screen.

A desired initial is inverted in the initial selection screen 384 by rotation of the crown 301A. In the case of FIG. 27B, the character "G" is inverted. The inverted initial is selected, and the display is changed to lower hierarchical level, as a result of pulling of the crown 301A.

Preferably, the display screen as shown in FIG. 27B is formed as follows. In general, the region in which the cursor can move is a meaningful area, while other area where the cursor cannot move is an insignificant area. Therefore, in FIG. 27B, the area of the display screen other than the initial selection region 384 is displayed as a background image. In response to a scrolling operation, the character displayed on the initial selection region 384 is successively updated. Namely, character appears on the order of A, B, C, D and so forth, in accordance with the rotation of the crown 301A. A further rotation of the crown 301A causes the character G to appear, followed by H. In this case, only the portion of the region 384 corresponds to G is inverted to allow the data headed by character G to appear.

After the character G has been selected, the display screen is changed such that the display contents are compressed leftward as shown in FIG. 27C. More specifically, the menu selection region 382 remains without being rewritten, while other regions are rewritten. By arranging the data in the order of the hierarchical structure, it is possible to eliminate the step of sorting and extracting the data which is necessary each time of retrieval when the data is arranged in a random manner. Such an arrangement therefore facilitates the control. It is therefore preferred that all the data are arranged in the alphabetic order.

In the hierarchical level shown in FIG. 27C, a name selection display screen 390 is displayed showing a list of names arranged in alphabetic order. In this name selection screen 390, the menu selection region 382 and the initial selection region 384 have been compressed further towards the left end. A desired name is inverted in this name selection screen 390 by rotation of the crown 301A and is selected by pulling of the crown 301A. As a consequence, a personnel data screen 600, which is of the lowest hierarchical level, appears as shown in FIG. 27D.

In this personal data display screen 400, the menu selection region 382, initial selection region 384 and the name selection region 396 have been further compressed to the left. Data such as a photograph 410 of the portrait of the person designated by the name, as well as the name 412A, phone number 412B and address 412C, is displayed in a personnel data display area 408 of the personnel data display screen 400.

In this embodiment, the category "PEOPLE" 372A has a hierarchical structure represented by menu screen 372 to initial selection screen 380 to name selection screen 390 to personnel data screen 400.

Display screens of lower levels of hierarchy successively appear from the right side of the display screen. Consequently, the width of the menu selection region 382 progressively decreases as L1 to L2 to L3 as the screens of lower hierarchical levels appear, as shown in FIGS. 27B to 27D. Similarly, the width of the initial selection region 384 decreases as M1 to M2 to M3, as will be seen from FIGS. 8B to 8D. Thus, the data of different hierarchical levels are arrayed horizontally, and items in each hierarchical level are arrayed vertically. Shifting from one to another hierarchical level is effected by push-pull operation of the crown 301A, while selection of an item in a hierarchical level is performed by rotation of the crown 301A.

It will be seen that all the hierarchical levels above the level which is being active are left on the display screen. This facilitates the understanding of the hierarchical structure, helping the user to shift the display from one to another hierarchical level. In addition, the direction of stack of the hierarchical levels and the direction of operation for selecting a hierarchical level are the same, whereby an easily-understandable interface is implemented.

In the described embodiment, the relation between the rotation of the rotational input portion and the scrolling of the display screen is determined by a table which is prepared such that three full revolutions of the input portion causes the display screen to move several centimeters. The present invention, however, may employ a rotational angle detecting means, horizontal movement detecting means and a rotational angular velocity detecting means and so forth connected to the CPU. Such detecting means are used in combination with various tables stored in the storage unit, such as a rotation angle vs. vertical movement conversion table which defines the relationship between the angle of rotation of the rotational input portion, i.e., the crown, and the amount of vertical movement of the display screen, a crown horizontal movement vs. cursor horizontal movement conversion table which defines the relationship between the amount of horizontal movement of the crown and the amount of horizontal movement of the cursor, an angular velocity vs. zooming conversion table defining the relationship between the angular velocity and the zoom-in/out of the display image, and so forth. In such a case, the CPU serves as rotation angle-vertical movement converting means, crown movement-cursor movement converting means and angular velocity-zooming converting means.

For instance, the icon is enlarged when the importance has become greater, or when the due time has been approached. In case of the voice memo, the size of the icon is increased when the recording time is long. Therefore, the user can remember the content simply by discriminating the size of the icon.

Third Embodiment

A third embodiment of the display apparatus in accordance with the present invention will be described with reference to FIGS. 34 to 43, while omitting the description with regard to the positions of the second embodiment that are the same or similar to those of the first embodiment. In this embodiment, the display screen is constructed as shown in FIG. 39.

FIG. 38 shows the appearance of a portable device 480. The portable device 480 used in this embodiment is small-sized and light-weight so as to be wearable by a user, e.g., around a user's wrist. More specifically, as shown in FIG. 37, the portable device 480 has a wrist winding portion 484, a display unit 481 connected to the wrist winding portion 484 and having, for example, an LCD device, and an input operation unit 482 having a plurality of operating portions arranged around the display device, including a slider 482A as a first operation button, a recording button 482B as a second operation button, and a track point 482C as a third operation button.

To explain in more detail, the slider 482A which serves as a mode selecting means is disposed on the right side of the display unit 481 and is slidable in the directions of the arrows A and B, as shown in FIG. 38. The recording button 482B for activating a voice input unit is disposed on the left side of the display unit 481. The track point (trademark of IBM) 482C is disposed on the lower side of the display unit 481 and is movable in directions of arrows C, D, E and F so as to move a cursor up and down and to the left and right on the display screen. The user can select, by sliding the slider 482A in the directions of the arrows A, B one or more times, one of a communication display mode (notify mode plus memo mode), a schedule display mode i.e., the calendar mode, and a database display mode, i.e., the directory mode.

(Display Screen on the PC)

One of the characteristic features of this embodiment is that a plurality of icons having their own functions are displayed on the display screen by being "pasted" to a time axis. The size of the display area of the portable device is smaller than that of the PC, so that the maximum length of the time axis displayed on the portable device is correspondingly smaller than that on the PC. Minimum required icons, therefore, can be displayed on the portable device.

As shown in FIG. 34, the display screen displayed on the display unit 430 is broadly divided into three portions: namely, a communication display area 430A, 440. a schedule display area 450(action) and a database display area 460. The communication display area 430A,440 is further divided into a notify area 430A which is used for notification of presence of information, e.g., arrival of an electronic mail, and for setting a notify mode which is of a lower hierarchical level, and a memo area 440 which enables advance to a lower-level memo mode that permits inspection of the content of a memo or the like. The schedule display area 450 is an area which performs a display in a schedule display mode or calendar mode in order to show the user's schedule. The database display area 460 is an area which permits opening of a lower-level directory mode which stores in a sorting manner a list of senders of electronic mails, directory or the like, and a database display mode.

In this embodiment, the communication display area 430A displays a metaphor of the sky as a background image, while the schedule display area 450 displays a metaphor of a landscape or a scenery on the ground. A metaphor of an image under the ground is displayed as the background in the database display area 460.

The communication display area 430A,440 also displays a plurality of carrier pigeon icons 431 of different colors and shapes arranged along an image of an electric wire, birdhouse icons 432, flower icons 441 and vase icons 442.

Each pigeon icon 431 is used as a metaphor of an electronic mail. The user can inspect the content of an electronic mail by clicking operation of the input operation unit 472 after designating the corresponding pigeon icon. A lower-level menu display screen 434 as shown in FIG. 35 appears when the electronic mail is opened. The user can inspect the menu screen 434 by clicking on a "Recognize" tab 433B which is a lower-level pull-down menu of a "Synfo" tab 433A shown in FIG. 35. Another tab "Synchronize" is intended to be used for data synchronization.

The pigeon icons 431 are arrayed in a time sequence along the electric wire which represents lapse of time, in the order of arrival (receipt) time. Functions are assigned to these pigeon icons 431 according to the shape and color. For instance, the black pigeon icons 431D indicate that the contents or information contained in the corresponding electronic mails are urgent, while white pigeon icons 431C indicate that the contents of the electronic mails are important.

The birdhouse icon 432 has a function to sort and store the inspected electronic mails according to their contents. Thus, each birdhouse icon 432 stores a plurality of electronic mails. In this embodiment, there are two types of birdhouse icons: namely, a birdhouse icon 432A which is used for business (work) and a birdhouse icon 432B which is intended for private (personal) use. By using these birdhouse icons, the user can manage and administrate a plurality of business and personal electronic mails. It is possible to implement such a function that, when electronic mails have been received in excess of a predetermined number, i.e., when the number of the pigeon icons 431 exceeds a predetermined number, the electronic mails are stored in the birdhouse icon 432.

The flower icon 441 has a function to store a memo which has been input by hand writing, e.g., by a pen input. Clicking on this flower icon 441 causes a post-it tab 443 carrying the written memo to appear on the display screen. The position of the post-it tab 443 can freely be changed without being restricted in the display areas, by a dragging operation conducted through the input operation unit 472. For instance, if the content of the memo concerns an event scheduled at a certain time, the user can move the post-it tab 443 and paste it to the time axis on the schedule display area 450 at a position corresponding to the above-mentioned time. In contrast, if the content of the memo is information that has no relation to time, e.g., a telephone number, the post-it tab 343 may directly be pasted to, for example, the sky background of the display screen. Clicking again on the post-it tab 443 recovers the original display of the flower icon 441. The hand-writing input to the post-it tab 443 can be conducted by inputting a memo on a memo window 435 shown in FIG. 36 serving as "post-it forming menu". Preferably, "save post-it information" is selected and the post-it tab 443 is pasted at a desired position by, for example, a dragging operation.

The vase icons 442 are sorted according to functions, corresponding to the contents of the memos. A plurality of flower icons, i.e., a plurality of pieces of memo information, are stored in each vase icon 442. In this embodiment, the vase icons 442 are classified into three types: namely, a "New" vase icon 442A which stores pieces of new information headed by "New", received recently, a "To-do-list" vase icon 442B which stores a plurality of pieces of information containing tasks to be done in the future, and an "Urgent" vase icon 442C which stores a plurality of memos carrying urgent information.

The number of flowers in each vase icon 442 represents the number of the memos. In the illustrated display, the number of the memos is classified into three kinds: namely, one, two and three or more, and three characters are prepared corresponding to the three kinds of numbers. When the number of the memos is three or greater, e.g., 10, a "three-flower" icon is displayed on the display unit 430. This technique effectively minimizes the number of the required character patterns, thus saving the storage capacity and, hence, contributing to increase of the processing speed.

The schedule display area 450 synthetically displays a time axis extending in one direction. A schedule list 451 is shown along the time axis such that events or items are shown at positions corresponding to the times of such events or items. In addition, the post-it tab 443 is pasted so as to bridge over the boundary between the schedule display area 450 and the communication display area 430.

The database display area 460 contains input tabs for the respective databases: namely, a "clients" tab 461, a "vendors" tab 462 and a "personal" tab 463. Clicking on any of these tabs enables pull-down to menus under the tab.

As shown in FIG. 35, a display window 434 on the PC has columns or regions for displaying items such as name 434a, title 434b, company name 434c, company address 434d, company phone number 434e, company facsimile number 434f, home phone number 434g, home e-mail address 434h and a comment 434i.

(Display Screen on Portable Device)

FIG. 39 shows an example of a display screen on the display unit 481 of the portable device 480. In this embodiment, the display unit 481 displays an initial display screen serving also as a screen saver. More specifically, as shown in FIG. 38, the initial screen has three kinds of metaphor similar to those used on the display of the PC 470, i.e., sky, landscape and an underground scenery, together with indication of time and date.

The main screen shown in FIG. 39 is obtained through an operation of the slider 482A. This main screen has three areas corresponding to the three areas on the display of the PC 470, i.e., three areas having the same attributes as the communication display area 430A, 440, schedule display area 450 and the database display area 460. These three areas of the main screen displayed on the portable device are: a communication display area 490, 500, a schedule display area 510 and a database display area 520 which are shown in FIG. 39. When one of these three areas is closed up, the operation is switched to a mode corresponding to this area.

In this embodiment, metaphors of natural scenery are used in the respective areas. More specifically, the upper part of the display unit 481 provides the communication display area 490, 500 that displays information sent from the PC 470 or from other information devices via the PC 470. This upper part therefore has a background image constituted by a metaphor of sky which causes the user to image a sudden change of weather, indicating a sudden arrival of information from the exterior. The communication display area 490, 500 is divided into a notify area 490 which, upon receipt of an electronic mail or the like, advances the processing to a lower-level notify mode, and a memory area 500 which advances the process to a lower-level memo mode for enabling inspection of memos.

An intermediate portion of the display area on the display unit 481 is the schedule display area 510 which functions to cause the device to operate in the schedule display mode or calendar mode which shows the user's schedule and so on. Regarding the ground surface as being the time, movement of a person on the ground surface causes the user to image lapse of time. A metaphor of a scenery on the ground surface is therefore used as the background of the schedule display area.

The lower part of the display area on the display unit 481 constitutes the database display area 520 which enables opening of lower-level directory mode or database mode that sorts and stores list of mail senders or directory. Since underground soil gives an impression of a base or something stable, a metaphor of underground soil is used as the background image of this database display area 520.

The display is performed such that the display area which is being used and the screen which is to be activated is displayed in a greater scale. At the same time, images in the display area which is being used are shown at high contrast, while images of other display areas are shown at a low contrast.

Further, a plurality of icons are set on the display area of the display unit 481 as shown in FIGS. 40A and 40C. Similarly to the icons displayed on the display screen on the PC 470 shown in FIG. 37, these icons set on the display screen of the display unit 481 are shown in the form of various animation characters (metaphors) which suggest the functions of programs and which matches the background scenery. For instance, carrier pigeon icons 494A shown against the background sky image in FIG. 40A indicate electronic mails, while flow icons 501A, 501B and 502 shown in FIG. 40C indicate voice memos and hand-written memos. A butterfly icon 526 shown in FIG. 41C indicates a cursor. These icons 494A, 591A, 501B, 502, 526 and so on have attributes similar to those of icons shown in the display screen of the PC 470.

It is to be noted here that, while the display screen on the PC 470 shows various icon characters by means of high-resolution bit map data and shows also letter information, e.g., alphanumeric letters, the display screen on the portable device 470 displays the icon characters with bit map data of comparatively low resolution, i.e., in a simplified manner as compared with the characters shown on the PC. In addition, the display screen on the portable device 480 does not contain letter information. With this feature, the portable device 480 can clearly indicate the meaning of icons by way of the characters, even though the area of display on the portable device 480 is as small as that on a wrist watch. This feature therefore contributes to miniaturization of the portable device. Further, the simplified display of the characters correspondingly reduces the size of the bit map data which is used for synthesizing the character image and, hence, the capacity of the storage unit required. Alternatively, this feature increases the storage area available in the lower-level addresses other than the upper-level addresses allocated for control and actual data. Consequently, the storage unit is capable of storing further information or can operate at a higher processing speed.

When a specific function has been assigned to an icon, a character 494A of an animal or creature, e.g., a carrier pigeon, is displayed to indicate the function. With such an icon, the user can visually and instantaneously understand the function assigned to the icon. The arrangement may also be such that functions allocated to the input operation unit vary according to the screen being displayed.

(Details of Modes)

FIG. 42 schematically shows the hierarchical structure of the display. As will be seen from this Figure, the user can select, by suitably operating the slider 428A, one of the following three modes from the main screen: namely, the communication display mode, the schedule (action) display mode (calendar mode) and the database display mode (directory mode). If the communication display mode is divided into the notify mode and the memo mode, there are four modes selectable by the user.

The communication display area 490, 500 displays carrier pigeon icons 494A indicative of electronic mails or the like automatically transmitted from the PC 470 to the portable device 480. These icons 494A are arrayed in the order of receipt time.

More specifically, when the user operates the slider 482A shown in FIG. 38, the communication display area 490, 500 is displayed at a greater scale than other display areas, as will be seen from FIG. 42A. Clicking on the pigeon icon 494A opens a window 494 in which are displayed principal items of the electronic mail, such as pictorial letter or photograph 494*a* of the sender's portrait, arrival (receipt) time 494*d*, sender's name 494*b*, and an icon 494*c* which indicates that the content of the pigeon icon is an electronic mail. The content of the electronic mail 495 is displayed by a further operation. The photograph 494*a* of the sender's portrait can be automatically obtained by a conversion into pictorial letters (from text data to picture) as required. It is thus possible to automatically convert a plurality of types of data into desired types of media.

When a mail is received by the portable device 480, a voice notification is given by the voice output unit and, at the same time, a notification screen 494, indicating digest of the electronic mail, is displayed on the main screen in an interrupting manner.

The notification of arrival of an electronic mail may be conducted not only by means of voice but also by using any of other types of sign such as tone, vibration, smell, light, electrical shock, and so forth. When such a type of notification sign is used, the portable device has a corresponding output and controlling means such as tone changing/controlling means, vibration controlling means, smell controlling means, light quantity/light color controlling means, electricity controlling means, or the like. Obviously, the magnitude of the sign of notification may be varied in accordance with the state of the user.

The carrier pigeon icon 494 can have various shapes and colors which indicate various kinds of information pertaining to the function represented by this icon.

For instance, a black pigeon icon indicates that the electronic mail is urgent, i.e., that the content of the mail or the message requires a prompt reading by the user, while a white pigeon icon 494 indicates that the content of the electronic mail is urgent. A parrot icon 494B indicates a voice mail.

Referring to FIG. 40D, clicking on the flower icon 502 opens a window 503 which indicates information concerning the memo, e.g., the time at which the memo was written. A further operation by the user causes a window 504 to appear. This window 504 is configured simulating a post-it, and the memo is hand-written in this window, as shown in FIG. 40C. Clicking on the flower icon 502 causes the carrier pigeon icons to be moved to uppermost region of the display screen.

The number of petals of the flower icon 502 indicates the file size, i.e., the volume of the information, of the memo. Greater numbers of the petals mean greater size of the file. There are flower icons 501A, 501B having different shapes from that of the above-mentioned flower icon 502. These flower icons 501A, 501B indicate voice memos. Thus, in this embodiment, the size, color and shape of the icons are varied and, if necessary, icons are moved or made to blink, so as to indicate, for instance, the data size, degree of importance and the degree of urgency and other factor of the icon data.

The schedule display area 510 can be changed over different display modes that have time axes scaled on hour, day, week and month basis. Further, when the schedule (action) display mode is selected through the operation of the slider 482A, the schedule display area 510 is enlarged, while other areas, i.e., the communication display area 490, 500 and the data display area 520 are contracted, as will be seen from FIG. 41A.

In this schedule display mode 510, the time axis scaled by hour appears first at a lower part of the screen and schedule icons 512 for producing a schedule list is pasted at positions corresponding to the time of the scheduled event or action. Fonts indicating the summary of the event or action also are attached to the displayed schedule icon 512.

The time axis 513A has a series of rectangular or square blocks which constitute a schedule occupied/non-occupied display area 514A. The portions of the background image within the blocks are selectively colored, so that the user can recognize at a glance the time of an event or an action on the schedule. It is thus possible to administrate the contents of various display data, based on the time at which the memo was written or the time at which the mail was received, with reference to the time axis which is being displayed. This feature enables the user to easily retrieve the display data using the time as a key, without requiring any complicated hierarchical structure. Further, the display data can be moved to corresponding positions on the time axis, so as to be used as schedule data.

The arrangement also may be such that the background image is divided by a line indicative of the present time, into a future portion and a past portion. For instance, the portion 515 of the background image corresponding to the past is displayed in a suitable color, so that the user can visually and easily recognize the present time, as well as how many events or actions are scheduled in the future, and can confirm whether any specific event or action is a past one. Thus, in this embodiment, the past and future events or actions are distinguished from each other by the color (or black-and-white inversion) of display with reference to the time axis. The present time is displayed by a border line of a specific color. This enables the user to easily recognize at a glance the time in terms of past, future or present. Th time axis displayed on hour basis is accompanied by an indication of the date.

The display of the schedule in the schedule display mode 510 can be performed in any one of the following four modes: a 5 hour view 511 (see FIG. 41B) in which schedule over 5 hours is displayed, a day view 511A (FIG. 41A) which displays the schedule on a day basis, a week view 511C (FIG. 41C) which displays the schedule on a week basis, and a month view 511D (FIG. 41D) which displays the schedule on a month basis.

In the week view 511C which displays the schedule in a week, two types of schedule icons 512 are employed: namely, an icon 512A painted in black and an icon 512B indicated with shadow of hatching. The type of the scheduled item represented by the icon is discriminated by the type of display of the icon.

The user can scroll the display screen in the future or past direction by moving the cursor 526 through an operation of the track point 482C. It is also possible to effect zooming of the time axis in relation to the scrolling, by suitably operating the input operation unit 482, so as to wide-spread the pitch of time scale of the time axis, as shown in FIG. 41B.

It is also possible to effect zooming-in or zooming-out of displayed contents in relation to the change in the time scale of the time axis. Thus, the range shown by the data can automatically be varied in accordance with the scale of the zoom, e.g., 5-hour scale, 12-hour scale, 1-week scale, and so forth. As a result of the magnification (zooming-in) of the time axis, minute data accompanying each schedule item may become visible (see, for example, FIG. 41B), while de-magnification (zooming out) of the time axis may cause minute data to become invisible (see, for example, FIG. 41D). Even when such minute data has become as a result of the de-magnification, the volume of the data is indicated in terms of an area of a bar-shaped image, so that the user can grasp the volume of the data. The described scale adjustment of the time axis can be made in each of the four schedule display modes of month, week, day and time. It is effective to provide means for varying of brightness of a selected time or day to enable such time or day to be distinguished. Since the time axis moves in accordance with the lapse of time, the objective items or events can easily be grasped in terms of time with respect to the present time.

In this embodiment, the schedule display mode includes the calendar mode which employs an image of a butterfly as the cursor image. The display of the cursor is performed such that the butterfly flaps when the cursor is being moved. This facilitates visual recognition of the cursor, even when the background image has a plurality of small blocks or boxes as in the case of a calendar. This display processing is preferably conducted in accordance with a flow which is shown in FIG. 43.

Referring to FIG. 43, determination is made as to whether there is any instruction for displaying the cursor (S160). If no instruction has been confirmed, the program stands still waiting for any cursor moving instruction. If such n instruction exists, the character data control unit and other units cooperate so that the character data of the butterfly, stored in the storage unit, are synthesized to form the image of the butterfly cursor and to display the same on a designated coordinate position (161).

Then, determination is conducted as to whether or not an operation for moving the cursor has been made (S162). The process terminates if no such operation has been made, otherwise Step S163 is executed. In Step S163, a control is performed such that a plurality of butterfly character data set up to indicate different positions of the butterfly's wings are displayed alternately and periodically, so that the image of the butterfly representing the cursor is displayed as if the butterfly is flapping. At the same time, a random-number generating unit (not shown) produces random coordinate instructions for the cursor, so that the cursor is moved in a manner as if the butterfly is flying.

Then, whether or not the operation for moving the cursor has been terminated is determined (S164). If the operation for moving the cursor is being continued, Step S163 is repeatedly executed, otherwise the process is terminated.

In this embodiment, a metaphor of a butterfly is used as the character of the cursor 526, as shown in FIG. 43C, so that the user can visually and vividly recognize the cursor 526. In this case, the arrangement is preferably such that the butterfly metaphor flutters when the input of operation through the input operation unit 582 continues over a certain period. To this end, a movement pattern along which the butterfly metaphor flies is calculated based on the present position of the cursor and random numbers generated by the random number generating unit which is not shown, thereby realizing an irregular movement or fly of the butterfly metaphor. At the same time, in order that the butterfly image of the cursor 526 varies during flying (movement), a display control is performed such that the form of display of the butterfly metaphor of the cursor 526 varies each time of movement, e.g., by turning the display of the butterfly metaphor on and off cyclically. Thus, in the illustrated embodiment, the state of the cursor is varied by movement or flicker, in accordance with the nature of the data. Conversely, the arrangement may be such that the butterfly flaps when there is no operational input has been made through the input operation unit 482 over a certain period, as in the case of a screen saver.

Alphabetic fonts such as A, B, C, D and so on are displayed in the database display area 520. The user can retrieve the database or directory to locate the name of a person, address, company name and so forth, based on the alphabetic expression.

For instance, assuming here that the user has selected the alphabetic character "D", as shown in FIG. 40E, parts of a group of data beginning with the character "D" is displayed in the window 522. Opening of the window 522 causes the database display area 520 to be displayed in a greater scale, while compressing the images of the communication display area 490, 500 and the schedule display area 510 into smaller sizes.

A subsequent operation through the input operation unit 582 causes the information such as the phone number and facsimile number of an office in which a person of a name beginning with Dale to be displayed on the personal data display screen 523.

When none of the described display modes has been activated, i.e., when there is no input through the input operation unit 482 over a predetermined period, the display unit 481 may display any suitable initial screen as a screen saver. Alternatively, the display area may be closed. For instance, the communication display area may be displayed as a black background region, as if an eyelid is progressively closed.

Fourth Embodiment

A fourth embodiment of the display apparatus in accordance with the present invention will be described with reference to FIGS. 44 to 51. Portions of the fourth embodiment which are the same as those of the first to third embodiments are denoted by the same reference numerals and detailed description thereof is omitted. This embodiment has a display screen as shown in FIG. 44.

The portable device 600 used in this embodiment is a pen-input card-type device which permits input of information by hand writing. Therefore, the hardware architecture of the portable device has, a pen-input unit in addition to the components shown in the block diagram of FIG. 2, unlike the first to third embodiments described before. In addition, the CPU incorporated in this portable device has recognition means that recognizes letters (characters) and patterns input by means of a pen, and performs various kinds of processings based on the result of the recognition. The storage unit includes, in addition to the aforesaid RAM and ROM, various other medium such as a non-volatile memory card adapted to be inserted into the portable device, a PCMCIA card, and an ID card that is used exclusively for the user of the portable device. Text data can be input through the input operation unit.

The display unit includes an active-matrix liquid crystal display panel having both a displaying function and an electrostatic induction tablet function. The display unit further has a coordinate detection circuit that detects the coordinates of the tip end of a pen-input unit on the display panel, upon receipt of a signal from the pen-input unit, and a control circuit that controls the image displaying operation and the coordinate detecting operation.

The pen-input unit is provided at its end with a region detecting electrode coupled by a stray capacitance to line and column electrodes on the display panel and having high input impedance. In operation, voltage is induced in the detection electrode in response to a scanning pulse applied to the line electrodes or a scanning pulse applied to the column electrode. The coordinate detection circuit operates in accordance with a coordinate detection timing signal coming from the control circuit so as to detect the timing of induction of the voltage at the detection electrode of the pen-input unit, thereby detecting the coordinates of the tip end of the pen-input unit.

The display unit is switchable between a function or mode in which the content of a menu pointed by the pen-input unit among various menus displayed is determined by an instruction determining means and various processings are performed in accordance with the result of the determination and a function or mode in which various processings are conducted in accordance with the result of recognition performed by the recognition means capable of recognizing pen-input characters and patterns.

The pen-input unit may be connected to the portable device by means of a cable. When such a connection by a cable is not employed, it is preferred that the pen-input unit has various functional sections such as an information collecting section, a code information generating section, a temporary storage section, a position detecting section, and a signal generating code transmitting section which transmits code information and a position pointing signal, so that the pen-input unit can input information both by hand writing and bar codes. In such a case, the display unit has a sense matrix section, a position detecting section (pointed coordinates sensing section), code information extracting section and a position detection processing section.

Thus, the portable device 600 used in this embodiment has an input operation unit 602 which includes the pen-input unit 603 and various buttons 0 to 9.

FIG. 44 shows the layout of the main screen. As will be seen from this Figure, the main screen has a date display area 610 which is formed at an upper portion of the display surface of the display unit 606 and which indicates the present time and date, an electronic mail display area 620, a schedule display area 630 and a database display area 640.

The date display area 610 displays the data and time such as "AM 10:05 59 Thursday October 12" 601. The electronic mail display area 620 is positioned at a "distant" location as viewed along a time axis metaphorically expressed by an image of a street, enabling the user to image an electronic mail which is sent from a sender who is "far-off" the user of the portable device. The electronic mail display area 620 displays various kinds of information such as a sender mail box icons 621 and the number of such icons, send-waiting mail box icons 623 and the number of such icons, and opened-mail box icons 624 and the number of such icons.

The schedule display area 630 displays a perspective landscape metaphor including a time axis display area 633 symbolizing a street. Schedules events are shown by building icons 636, 637 at the right side of the time axis display are 633, while a "To do" list is displayed in the form of a billboard 638 at the left side of the same.

The time axis shown in the time axis display area 633, shown by the perspective street metaphor, indicates time such that the proximal end of the street, i.e., the lower end of the time axis, shows time close to the present time, while the distal end of the street, i.e., the upper end of the time axis show future time. The GUI is set up as object images which are arranged along the street. Thus, in this embodiment, the street metaphor is used as the time axis, while building metaphors are used to indicate scheduled events. Billboard metaphor indicates "To do" information and a manhole metaphor indicates a memo. A non-colored schedule occupied/non-occupied display area 634 is set up along the time axis display area 633. Portions of the schedule occupied/non-occupied display area 634 corresponding to the times of scheduled events are colored. At the same time, a colored background image display area 632 is formed to indicate the "past" time region backward from the present time.

The street metaphor of the time axis provides a feel of perspective. An object which is scheduled to occur in the future is shown in a smaller scale at a far position along the street. As the present time approaches the time of the schedule, the object progressively move downward, i.e., towards the proximal end, and is displayed at a progressively enlarging scale, so that summary of the content of this object becomes recognizable.

The scheduled events are shown by building metaphors at the right side, while the "To do" list is shown in the form of billboards at the left side of the street. Turning icons 644, 645 serve to enable the user to change the viewing direction. Namely, by using these icons, the user on the street can turn to the right or left, thus entering each function mode.

The building icons 636, 637 are constituted by different types of three-dimensional animation icons having different shapes and attributes. Each icon indicates a certain type of scheduled event. Namely, different building icons have different meanings of schedule. In this embodiment, official events are assigned to the building icon 636, while private events are assigned to the ordinary house icon 637.

There are two types of billboard icons 638. A first type of billboard icon 638A, which has support legs, is fixed to a certain point of the street, i.e., at a certain time along the time axis, thus indicating that the data contained therein is related to time. A second type of billboard icon 638B is devoid of supporting leg and, hence, floats in the air. This type of billboard icon 638B is used for information which has no relation to time. In the "past" time region of the time axis display area 633, there is shown a manhole icon 639 that is used for writing a memo. The "past" time region of the time axis is darkened to facilitate recognition of the present time.

A scrolling function is available to vary the time scale of the time axis (one day or one week basis) so as to give a feel of perspective, with future objects being compressed into smaller sizes and shown at distant position along the street metaphor of the time axis. For instance, when the time scale is progressively increased to reduce the size of the displayed object, the viewing point of the three-dimensional display from which the street metaphor of the time axis is looked down upon is progressively elevated, whereby a bird view display mode 750 as shown in FIG. 46A is obtained which shows the displayed objects as if they are looked down upon by a bird. In this case, the time axis display area 752 is scaled by day, and icons in the schedule display area 754 are shown in small sizes. The length of such small-sized icon as measured in the direction perpendicular to the time axis indicates the degree of tightness of the schedule on the day designated by the time position of this icon.

In order to generate the display screen as illustrated, types of buildings are changed in accordance with the type of information, by using character data for each type of building and changing the bit map of the character data in relation to time. When minute control is not necessary, the street metaphor of the time axis is updated by shifting the numerals indicating the day or time.

Preferably, the display of the bird view is conducted by determining the position of each icon based on information concerning the start time of the scheduled event and information concerning the duration of the scheduled event, and selecting character data according to the duration thereby determining the shape of the icon, and pasting the icon along the time axis.

Processing is undesirably complicated and becomes troublesome when there are too many characters each having a duration of 10 minutes or so. It is therefore preferred that the types of the characters are limited. In case of a three-dimensional character of a building icon, it is preferred that only the right and left ends of the three-dimensional object are stored as picture data, and the three-dimensional image is formed by interconnecting these picture data by straight lines based on the time of start and time of ending of the event, with the shadow portion shown by dot data.

The database display area 640 preserved at a lower portion of the display unit 606 which is used for the database of the user's own. Thus, the database display area 640 may contain a telephone directory icon 641, a future scrolling icon 643 for scrolling the display screen toward a future time along the time axis, a past scrolling icon 642 for scrolling the display screen toward a past time along the time axis, a viewing direction turning icon 644 which enables the viewing direction of the user to view the front face of the building by changing the three-dimensional image of the building into a two-dimensional image showing the front side of the building, and another viewing direction turning icon 645 which turns the viewing direction of the user to view the front face of the billboard icon 638 by changing the three-dimensional image of the billboard into a two-dimensional image which shows the front face of the billboard.

The display mode is changeable over a month display mode, a week display mode and a day display mode, by operating a scale change-over buttons 604A, 604B and 604C, respectively. Thee buttons are arranged on one side of the card. The day display mode provides a display screen of a scenery of a street which is looked down from a level close to the ground level. The week display mode provides a display screen in which the scenery is shown in a bird view perspective. The month display mode sets up a display screen corresponding to a view from a satellite. Thus, the day mode display screen zooms up the week mode display screen which in turn zooms up the month display screen.

FIG. 51D shows the display screen in the month display mode. Unlike the display in the day display mode or the week display mode, upper portion of the display corresponds to current time, while lower potion of the display area corresponds to future time. Each bar of the bar graph shows the total volume of the events scheduled to be held on the day designated by this bar.

The user can scroll the time axis by keeping the pen-input unit in contact with the scroll icon as shown in FIG. 54E. Scrolling is ceased when the pen-input device is moved apart from the scroll icon.

Referring to FIG. 51F, a double touch on the area 844 at the date of November 14 causes the display screen to be changed to a mode which displays one-day time axis for November the 14th. A double touch at the building icon 736 as shown in FIG. 53A causes the content of the schedule to be displayed as shown in FIG. 53B. In order to change the day of the display, the user simply touches the building icon on the time axis by the pen-input device and drags the same to a desired time position along the time axis.

As shown in FIG. 51A, a double touching at a received mail in the list opens the mail. Namely, a window is opened to show the name of the sender, theme and so on in the form of a list as shown in FIG. 51A, and a double touch at a desired mail icon opens a lower-level menu as shown in FIG. 54B.

A touching by the pen-input device at the uppermost time display area as shown in FIG. 51D causes the display to be reset to the ordinary time axis displaying mode showing the present time.

A double-touching at a close box which is shown at a left upper portion of the display screen causes the window to close.

Touching at a desired key of the keyboard with the pen-input unit 603 as shown in FIG. 50D causes a memo input screen of a memo mode to open as shown in FIG. 50E. It is assumed here that the user selects, by means of the input-pen unit 603, a scheduling input format selection icon 686 among various icons displayed at uppermost portion (in the title bar of the memo screen) of the window of the memo input screen shown in FIG. 50E.

A double-touch at this icon 686 opens a schedule display screen 690 which is shown in FIG. 53F. The schedule time can be set by tracing the scale in the display screen by the pen-input display unit 603. When a name is input, if the input name has a relation to the database, an icon indicative of the database is displayed following the displayed name.

The user then sets as desired an alarming mode, by means of an alarm setting icon 696. At the same time, the user selects one of a plurality of types of the building, by touching one of the building icons 694A to 694D.

The user then closes the schedule input screen, so that the selected building icon 636 indicative of the scheduled event is automatically pasted on the time axis, as shown in FIG. 52A.

In order to form an electronic mail, the user opens the memo input display screen 680 of the memo mode, as shown in FIG. 52B. The user then selects, by means of the input-pen unit 603, a mail input format selection icon 682 from among various icons shown at the uppermost portion (title bar) of the window of the memo input screen 680 shown in FIG. 52B.

A double-touching at this selected icon 682 causes an electronic mail display screen 700 to open as shown in FIG. 49C. Input of information to this electronic mail display screen 700 is conducted by using the keyboard. When the user inputs a name, address of the mail is automatically extracted from the database and is displayed in the electronic mail display screen. The user then drafts the electronic ail by means of the keyboard. The electronic mail display screen 700 is then closed as the user touches, by means of the pen-input unit 603, at the close box icon 602 which is at the left end of the title bar shown in the uppermost part of the electronic mail display screen 700.

The electronic mail display screen 700 is thus closed after the drafting of the electronic mail.

The electronic mail thus prepared is stored in a waiting mail box icon 622, and is automatically transmitted when the card of this portable device is connected to a telephone line.

In order to input an event or task to be executed in the future, i.e., to form a "To do" list, the user touches the keyboard with the pen-input unit 603, as shown in FIG. 49D. This causes the memo input display screen 680 of the memo mode to open as shown in FIG. 49E. The user then selects, from among various icons shown in the uppermost portion (title bar) of the memo input screen 680 of FIG. 49D, a "To do" list input format selection icon 684 by means of the pen-input unit 603, and double-touches this icon with the same. As a result, the display is switched to a return mail drafting screen.

As a result, a "To do" list display screen 710 as shown in FIG. 49F is displayed. The user then hand-writes letters (characters) as ink data in a hand-write area 712 of the "To do" list display screen 710, by means of the pen-input unit 603.

In the example shown in FIG. 52F, a task "BUY WINE" is hand-written. In this case, the letters are displayed in the form of hand-written characters using hand-write font data, rather than Mincho or Gothick fonts. The message or task can also be input as text data, by using the keyboard. In such a case, font data such as of Mincho or Gothick appears in the hand-write area 712, although not shown in the drawings.

Characters are thus input and written in the hand-write area 710. When the input of these characters is finished, the hand-write area 710 as it is pasted to the time axis.

There are two types of "To do" lists: namely, a first type of "To do" list that is related to the time axis and a second type of "To do" list that is independent from the time axis. When time is designated, the information is regarded as being an item to be contained in a "To do" list that is related to time, and a billboard icon with supporting legs is used to paste the information to the time axis. In contrast, information having no designated time is displayed at an arbitrary position along the time axis in a floating manner, in the form of a billboard icon having no supporting leg.

The billboard icons usually disappears from the display screen as the time elapses. In case of the "To do" list which has been pasted to the time axis, however, the billboard icon remains at the lower end of the display screen regardless of the lapse of time, unless an operation is conducted to delete this billboard icon. When a plurality of billboard icons are stagnant at the lower end of the display screen, these icons are displayed in an alternately stacked from.

The billboard icon 638B representing the "To do" list is automatically erased, when it is checked by the pen-input unit 603, as shown in FIG. 48A.

For the purpose of retrieving the database, the user double-touches the database box icon 641 with the pen-input unit 603, so that the display is switched to a database retrieval mode.

As shown in FIG. 48C, a retrieval mode display screen 650 has a retrieval word input tab 652. The user then inputs initial characters, e.g., "ya" of the name to be searched out, by means of the keyboard and, at the same time, touches a binocular icon 654 by the pen-input unit 603, whereby the retrieving operation is commenced. The target data that is hit through the retrieval is displayed after the completion of the retrieval.

As a consequence, the hit data searched out through the retrieval is displayed in the form of a list in a hit data list display screen 660 as shown in FIG. 48D. The user then double-touches a selection tab 662 of a desired item from among the items shown in the hit data list display screen 660, so that detailed data are displayed in a data display screen 670 as shown in FIG. 48E.

The operation for forming a memo will now be described. The user touches the keyboard with the pen-input unit 603 as shown in FIG. 48F. Consequently, a memo input screen 680 of the memo mode is opened as shown in FIG. 47A. Characters (letters) are hand-written as ink data in the memo input display screen 680 shown in FIG. 47A by means of the pen-input unit 603.

In the example shown in FIG. 47A, a memo reading "TAXI 120 yen" is hand-written. In this case, the letters are displayed in the form of hand-written characters using hand-write font data, rather than Mincho or Gothick fonts. The message or task can also be input as text data, by using the keyboard. In such a case, font data such as of Mincho or Gothick appears in the memo input screen 680, although not shown in the drawings.

The memo input screen 780 is closed when the user touches the close box icon by means of the pen-input unit 603. The memo in the from of a manhole icon 639 is then pasted to the time axis according to the time of writing of the memo. A display screen showing the content of the memo is opened when the user double-touches the manhole icon 639.

Fifth Embodiment

A fifth embodiment of the display apparatus of the present invention will now be described with reference to FIGS. 52 to 55. In the following description of the fifth embodiment, portions which are the same or equivalent to those of the first to fourth embodiments are denoted by the same reference numerals as those used in the foregoing description, and detailed description of such portions is omitted. The fifth embodiment employs a display screen structure as shown in FIG. 55C.

Referring first to FIG. 52A, a display screen 802 which is now being displayed on the portable device is displayed as a window in a display screen 800 of the PC. The PC can make access to another server on the internet to display on its display screen literatures, photographs and descriptions and to load them down into the storage unit of the portable device. In this embodiment, a camera tool is selected for example, by means of a tool such as the software (PIM software) concerning the display available on the PC. The camera tool appoints the area of the image of interest, i.e., the portion of the displayed image which is to be downloaded. Then, the image within the appointed area is taken into a memo which is used in the memo mode operation of the display apparatus.

It is also possible to take this image into a "To do" list memo which is used in the "To do" list mode of the display apparatus, as shown in FIG. 52B.

The PC and the portable device in this embodiment are so arranged as to perform data synchronization only for preselected kinds of information. In this case, the portable device can be synchronized with the PIM software itself, memos on the PIM and downloaded electronic mails. Thus, portable device can be data, synchronized with the images which is being displayed on the display screen of the PC. It is therefore possible for the user carrying the portable device with him to handle the PIM software itself, memos on PIM and downloaded electronic mail, in the same way as that of the handling of these information on the PC.

FIG. 52C shows the detail of the display screen on the portable device. Unlike the display screen used in the fourth embodiment, the display screen shown in FIG. 52C shows the date time axis 812 in terms of a metaphor of signboard disposed along a street. This display screen is distinguished from that of the fourth embodiment also by the fact that the total size of the scheduled events is expressed in terms of the height of a building icon.

Referring now to FIG. 54A showing a direction turning mode, the image taken into the "To do" list as described above is displayed as a billboard 818. It is thus possible to use the taken up image as the character data of a "To do" list icon.

Referring to FIG. 54C, in the case where the information notification function has been set beforehand, the voice output unit of the portable device produces a voice or sound information such as a melody when the designated time has come and, at the same time, a pop-up menu 842 indicating the outline of the schedule appears at a position adjacent to the building icon 840. Thus, notification to the user is given both by way of audio information and visual information.

FIG. 54B shows a display screen that is used when the schedule is written in the "To do" list. The user opens the mode of the "To do" list 810 and then opens the window of character input interface 830 which is displayed by the image of the keyboard. Then, various keyboard tabs on the character input interface 830 are selected by the pen-input unit or by means of a finger, whereby character data are written in the "To do" list 810.

FIG. 55A shows a note display mode 850. This node display mode also permits rearrangement of the items and addition of new items. The rearrangement of the items can be effected by a touch with a finger or the pen-input operation unit. Addition of new items can be conducted by operating the aforethe character input interface 830 in the form of a keyboard image, by a finger or by means of the pen-input unit.

FIG. 55B shows a balloon icon 816 which, when touched, opens an electronic mail so as to display a lower-level display screen which shows the content of the electronic mail. This lower-level display screen is shown in FIG. 55C. This electronic mail display screen 820 also enables the user to write and edit a responding electronic mail, through operation of the character input interface 830.

It is also possible to send the mail thus prepared to a desired destination. To this end, the user attaches the card of this portable device to a docking station which incorporates a MODEM and an extension battery, thereby connecting the card to a telephone line. Then, the user can send the mail simply by moving the balloon icon 816 indicative of the electronic mail to the position of a mail post icon 814 displayed on the screen, as shown in FIG. 63A. As a result, the electronic mail is automatically connected to the telephone line so as to be transmitted. The portable device is automatically disconnected from the telephone line when the sending of the message is ceased.

FIG. 53B shows a display screen in which balloon icons 1116 representing the received mails are drifting over the road surface.

FIG. 53C shows an electronic mail display screen 820 showing the content of the electronic mail has been displayed as a result of clocking on any of the balloon icon 816. In the illustrated case, when the electronic mail has a schedule attached thereto, an icon 822 for confirming the schedule is displayed on the electronic mail display screen 820. Selection of this icon 822 opens a further lower-level menu screen which shows the schedule of the data and time of the schedule attached to the electronic mail.

FIG. 53D shows a case where an electronic mail is sent together with a schedule attached thereto. Clicking on a "schedule OK" button causes the items of the schedule to be automatically registered and, at the same time, the display screen of the responding electronic mail is opened. Then, the user clicks on the mail post icon 814, whereby the electronic mail is sent.

Although the apparatus of the present invention has been described through illustration of various embodiments, it will be clear to those skilled in the art that various changes and modifications may be imparted thereto without departing from the spirit and scope of the present invention. For instance, the portable device having the display apparatus of the present invention may be incorporated in a network as shown in conceptual drawings FIGS. 56A to 56C. Thus, a network system can be implemented such that communication is performed between the PC 1 and each of a plurality of portable devices 2-1, 2-2, and so forth.

Further, although the portable device has been described as being of the type which is worn by the user by being wound around a wrist, this is only illustrative and the portable device having the displaying apparatus of the invention can be implemented in various other forms according to the use. The number and arrangement of the keys on the portable device are also illustrative, and the portable device can have any other suitable number of keys arranged at positions different from those in the described embodiments.

The use of an LCD device also is not exclusive and the display apparatus of the present invention can be implemented by using various types of display devices such as a miniaturized TV unit using a thin cathode ray tube or a liquid crystal shutter or a plasma display unit. Furthermore, it is not essential that the images displayed on the display apparatus are three-dimensional.

The arrangement also may be such that the icon character is changeable from, for example, a pigeon to an animal on the display unit of the PC, and the same change of character is effected automatically in the image displayed on the portable device, thus achieving synchronization of data between the portable device and the PC. This can be achieved by arranging such that the view icon information can also be downloaded from the PC to the portable device, together with ordinary information.

The arrangement also may be such that the PC 1 is connected to another server on the internet via the internet, LAN, WAN, intra-net circuit and so forth, so that the portable device 2 can make access to a different server on the internet via the PC 1. It is also possible to arrange such that information is exchanged between a portable device 2 and another portable device 2 via the PC 1.

In the embodiments described hereinbefore, the second information processing apparatus is constituted by a PC, while a portable device is used as the first information processing apparatus which incorporates the display apparatus of the present invention. This, however, is not exclusive and a PDA, MCC, server or the like may be used as the first information processing apparatus. Further, a work station, main frame, wordprocessor or the like may be used as the second information processing apparatus.

The fifth and fourth embodiments also may be modified such that the device having the display screen of these embodiments are wearable on, for example, a user's wrist.

What is claimed is:

1. A display apparatus, comprising:
   display means for displaying, on a display screen, a display image containing a time axis formed so as to extend at least in a first direction, said display screen being divided into a plurality of display regions;
   input operation means for moving at least said time axis in said first direction, said input operation means being further effective for selectively enlarging a predetermined one of said plurality of display regions; and
   controlling means for controlling said display screen based on an operational input given by an operation of said input operation means;
   wherein said input operation means includes a rotational operating means having an axis of rotation extending in a second direction that crosses said first direction;
   wherein said rotational operating means is arranged such that a rotational operation of said rotational operation means by a first amount causes a movement of at least said time axis by a second amount corresponding to said first amount;
   wherein said rotational operation means is further movable at least in said second direction along its axis of rotation, and causes said enlarging of the predetermined one of said plurality of display regions when moved in said second direction; and
   wherein said input operation means is located at one end of said display screen as viewed in said first direction, and said predetermined one of said plurality of display regions is positioned at one end of said display screen as viewed in said second directions.

2. A display apparatus according to claim 1, wherein said rotational operation means is arranged such that a direction of rotation of said rotational operation means coincides with said first direction.

3. A display apparatus comprising:
   display means for displaying, on a display screen, a display image containing a time axis formed so as to extend at least in a first direction, said display screen being divided into a plurality of display regions;
   input operation means for moving at least said time axis in said first direction, said input operation means being further effective for optionally enlarging selected display regions among said plurality of display regions; and
   controlling means for controlling said display screen based on an operational input given by an operation of said input operation means, wherein:
   said input operation means includes a rotational operating means having an axis of rotation extending in a second direction that crosses said first direction, and said rotational operation means supports a back-and-forth shifting movement along its axis of rotation in said second direction;
   said rotational operating means is arranged such that a rotational operation of said rotational operation means by a first amount causes a movement of at least said time axis by a second amount corresponding to said first amount;
   said input operation means is located at one end of said display screen as viewed in said first direction; and
   moving said rotational operation means in a first shifting direction along its axis of rotation causes enlargement of the display region positioned at one end of said display screen as viewed in said second direction, and moving said rotational operation means in a second shifting direction opposite said first shifting direction along its axis of rotation causes the enlargement of the display region positioned at the other end of said display screen as viewed in said second direction.

4. A display apparatus according to claim 1, wherein said input operation means is further movable at least in said first direction, and moving said input operation means in said first direction causes the position of a cursor on said display screen to be moved at least in said first direction.

5. A display apparatus according to claim 1, wherein said input operation means includes a first operating portion positioned at one end of said display screen as viewed in said second direction.

6. A display apparatus, comprising:
   display means for displaying, on a display screen, a display image containing a time axis formed so as to extend at least in a first direction, said display screen being divided into a plurality of display regions;
   input operation means for moving at least said time axis in said first direction, said input operation means being further effective for selectively enlarging a predetermined one of said plurality of display regions; and
   controlling means for controlling said display screen based on an operational input given by an operation of said input operation means;
   wherein said input operation means includes a rotational operating means having an axis of rotation extending in a second direction that crosses said first direction;
   wherein said rotational operating means is arranged such that a rotational operation of said rotational operation means by a first amount causes a movement of at least said time axis by a second amount corresponding to said first amount; and
   wherein said first operating portion is movable in said second direction along the axis of rotation of said rotational operation means, moving said first operating portion in said second direction causes the position of a cursor on the display screen to be moved in said first direction, and rotating said rotational operation means after said first operating portion is moved in said second direction causes the position of said cursor on said display screen to be moved in said second direction.

7. A display apparatus, comprising:
   display means for displaying, on a display screen, a display image containing a time axis formed so as to extend at least in a first direction, said display screen being divided into a plurality of display regions;
   input operation means for moving at least said time axis in said first direction, said input operation means being further effective for selectively enlarging a predetermined one of said plurality of display regions;
   controlling means for controlling said display screen based on an operational input given by an operation of said input operation means; and
   a second operating portion;
   wherein said input operation means includes a rotational operating means having an axis of rotation extending in a second direction that crosses said first direction;

wherein said rotational operating means is arranged such that a rotational operation of said rotational operation means by a first amount causes a movement of at least said time axis by a second amount corresponding to said first amount; and wherein said controlling means performs, based on the operation of said second operating portion, control of the display screen so as to enlarge the pitch of a time scale of said time axis in said first direction.

8. A display apparatus comprising:

display means for displaying, on a display screen, a display image containing a time axis formed so as to extend at least in a first direction, said display screen being divided into a plurality of display regions;

input operation means for moving at least said time axis in said first direction, said input operation means being further effective for selectively enlarging a predetermined one of said plurality of display regions;

controlling means for controlling said display screen based on an operational input given by an operation of said input operation means; and a third operating portion;

wherein said input operation means includes a rotational operating means having an axis of rotation extending in a second direction that crosses said first direction;

wherein said rotational operating means is arranged such that a rotational operation of said rotational operation means by a first amount causes a movement of at least said time axis by a second amount corresponding to said first amount; and wherein said controlling means performs, based on the operation of said third operating portion, control of the display screen so as to contract the pitch of a time scale of said time axis in said first direction.

9. A display apparatus according to claim 1;

wherein said controlling means is further effective for switching between a first display mode in which all of said display regions are displayed substantially at an equal scale and a second display mode in which at least one of said display regions is displayed at a greater scale than others; and wherein said display apparatus further includes a fourth operating portion for providing a switching instruction to said controlling means for effecting the switching of said display modes.

10. A display comprising:

display means for displaying, on a display screen, a display image containing a time axis formed so as to extend at least in a first direction, said display screen being divided into a plurality of display regions;

input operation means for moving at least said time axis in said first direction, said input operation means being further effective for selectively enlarging a predetermined one of said plurality of display regions; and controlling means for controlling said display screen based on an operational input given by an operation of said input operation means;

wherein said input operation means includes a rotational operating means having an axis of rotation extending in a second direction that crosses said first direction;

wherein said rotational operating means is arranged such that a rotational operation of said rotational operation means by a first amount causes a movement of at least said time axis by a second amount corresponding to said first amount;

wherein:
said display apparatus maintains a database having a plurality of first category entries, each of said first category entries being associated with a plurality of second category entries;

said rotational operation means supports a back-and-forth shifting movement along its axis of rotation in said second direction;

said display means is further effective for providing a database-display area in said display screen for displaying selective content of said database;

said database-display area being initially divided into showing only a plurality of first display segment regions, with each of said first display segment regions displaying a corresponding one of said first category entries, and a separate one of said first display segment regions is targeted with rotation of said rotational operating means;

wherein said rotational operating means when operated in said second direction causes a targeted first display segment region to be selected; and in response to a targeted first display segment region being selected by said rotational operation means, said controlling means splits said database-display area into at least a first hierarchical display region and a second hierarchical display region, said first display segment regions being restricted to said first hierarchical display region, and said second hierarchical display region being divided into a plurality of second display segment regions each showing a separate one of the plurality of second category entries associated with the selected first display segment.

11. A display apparatus according to claim 10, wherein each said plurality of first category entries has a different hierarchical structure linking it to its associated plurality of second category entries.

12. A display apparatus comprising:

display means for displaying, on a display screen, a display image containing a time axis formed so as to extend at least in a first direction, said display screen being divided into a plurality of display regions;

input operation means for moving at least said time axis in said first direction, said input operation means being further effective for selectively enlarging a predetermined one of said plurality of display regions;

controlling means for controlling said display screen based on an operational input given by an operation of said input operation means; and posture angle detecting means for detecting the posture angle of said display means with respect to a horizontal plane;

wherein said input operation means includes a rotational operating means having an axis of rotation extending in a second direction that crosses said first direction;

wherein said rotational operating means is arranged such that a rotational operation of said rotational operation means by a first amount causes a movement of at least said time axis by a second amount corresponding to said first amount; and wherein said controlling means includes a posture switch control unit which controls, based on the result of detection of said posture angle detecting means, a power supply such as to turn on the power supply when the detected posture angle falls within a predetermined range, and to turn off the power supply when the detected posture angle does not fall within the predetermined range.

13. A display apparatus, comprising:
- display means for displaying, on a display screen, a display image containing a time axis formed so as to extend at least in a first direction;
- input operation means for enabling operational input of said display image at least on said display screen; and
- controlling means for controlling said display screen based on an operational input given by an operation of said input operation means;
- wherein said display means displays display segment regions defined by dividing said display screen in a second direction perpendicularly crossing said time axis; and
- wherein said controlling means includes a first operating portion which when moved to one end as viewed in said second direction causes a display segment region adjacent to said end to be enlarged on the display and, when further moved again to said one end, causes one of other display segment regions to be enlarged.

14. A display apparatus according to claim 13, wherein said input operation means has a second operating portion which, when moved to one end as viewed in said first direction, enlarges the pitch of time scale of said time axis.

15. A display apparatus according to claim 14, wherein said second operating portion when moved to said one end causes a lower-level menu of icons to be displayed.

16. A display apparatus according to claim 15, wherein said second operating portion comprises a pointing device which moves and sets the position of a cursor on said display screen, thereby designating the position where an icon is to be displayed.

17. A display apparatus according to claim 13, further comprising posture angle detecting means for detecting the posture angle of said display means with respect to a horizontal plane;
- wherein said controlling means includes a posture switch control unit which controls, based on the result of detection of said posture angle detecting means, a power supply such as to turn on the power supply when the detected posture angle falls within a predetermined range, and to turn off the power supply when the detected posture angle does not fall within the predetermined range.

18. A portable information processing apparatus comprising a display apparatus set forth in any one of claims 1, 2, 3 to 10, and 11 to 17.

19. A portable information processing apparatus according to claim 18, further comprising a wrist-wearing portion connected to said display apparatus so that said portable information processing apparatus can be worn on a user's wrist.

20. A display apparatus according to claim 6, wherein said rotational operation means is an integral part of said first operating portion.

* * * * *